(12) United States Patent
Shih et al.

(10) Patent No.: US 6,399,535 B1
(45) Date of Patent: Jun. 4, 2002

(54) COORDINATION CATALYST SYSTEMS EMPLOYING AGGLOMERATED METAL OXIDE/CLAY SUPPORT-ACTIVATOR AND METHOD OF THEIR PREPARATION

(75) Inventors: Keng-Yu Shih, Columbia; Michael John Carney, Eldersburg; Dean Alexander Denton, Baltimore, all of MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/431,771

(22) Filed: Nov. 1, 1999

(51) Int. Cl.[7] ............ B01J 31/00; B01J 37/00; B01J 21/16; C08F 4/02; C08F 4/60
(52) U.S. Cl. ............ 502/167; 502/81; 502/118; 502/119; 502/120; 502/132; 502/133
(58) Field of Search ............ 502/81, 118, 119, 502/120, 132, 133, 167

(56) References Cited

U.S. PATENT DOCUMENTS

| | | | |
|---|---|---|---|
| 4,176,090 A | 11/1979 | Vaughan et al. | 252/455 |
| 4,216,188 A | 8/1980 | Shabria et al. | 423/118 |
| 4,238,364 A | 12/1980 | Shabtai | 252/455 |
| 4,248,739 A | 2/1981 | Vaughan et al. | 252/455 |
| 4,271,043 A | 6/1981 | Vaughan et al. | 252/455 |
| 4,367,163 A | 1/1983 | Pinnavaia et al. | 252/455 |
| 4,375,406 A | 3/1983 | Santilli | 208/251 |
| 4,629,712 A | 12/1986 | Pinnavaia et al. | 502/63 |
| 4,637,992 A | 1/1987 | Lewis et al. | 502/84 |
| 4,761,391 A | 8/1988 | Occelli | 502/63 |
| 4,859,648 A | 8/1989 | Landis et al. | 502/242 |
| 4,981,825 A | 1/1991 | Pinnavaia et al. | 502/63 |
| 4,995,964 A | 2/1991 | Gortsema et al. | 208/112 |
| 5,064,802 A | 11/1991 | Stevens et al. | 502/155 |
| 5,225,500 A | 7/1993 | Elder et al. | 526/127 |
| 5,238,892 A | 8/1993 | Chang | 502/111 |
| 5,241,025 A | 8/1993 | Hlatky et al. | 526/129 |
| 5,243,002 A | 9/1993 | Razavi | 526/170 |
| 5,250,277 A | 10/1993 | Kresge et al. | 423/329.1 |
| 5,308,811 A | 5/1994 | Suga et al. | 502/62 |
| 5,321,106 A | 6/1994 | LaPointe | 526/126 |
| 5,360,775 A | 11/1994 | Suda et al. | 502/84 |
| 5,362,825 A | 11/1994 | Hawley et al. | 526/125 |

(List continued on next page.)

FOREIGN PATENT DOCUMENTS

| | | | |
|---|---|---|---|
| DE | 2 061 290 | * 6/1972 | 502/133 |
| EP | 0 426 637 | 5/1991 | |
| EP | 0 426 638 | 5/1991 | |

(List continued on next page.)

OTHER PUBLICATIONS

Nakamura, Yuji et al., "Clay Column Chromatography for Optical Resolution: Partial Resolution of 1, 1'–Binaphthol on Optically Active [Co(phen)3–x(am)x]n+–Montmorillonite Columns"; Clay Sci. (1990), 8(1), 17–23, XP000983072, p. 18.

(List continued on next page.)

*Primary Examiner*—Mark L. Bell
*Assistant Examiner*—J. Pasterczyk
(74) *Attorney, Agent, or Firm*—Robert A. Maggio

(57) ABSTRACT

The present invention is directed to a coordinating catalyst system comprising at least one bidentate or tridentate ligand containing pre-catalyst transition metal compound, (e.g., 2,6-bis (2,4,6-trimethylarylamino)pyridyl iron dichloride), at least one support-activator (e.g., spray dried silica/clay agglomerate), and optionally at least one organometallic compound (e.g., triisobutyl aluminum), in controlled amounts, and methods for preparing the same. The resulting catalyst system exhibits enhanced activity for polymerizing olefins and yields polymer having very good morphology.

64 Claims, 7 Drawing Sheets

U.S. PATENT DOCUMENTS

| | | | |
|---|---|---|---|
| 5,395,808 A | 3/1995 | Miller et al. .................... | 502/7 |
| 5,399,636 A | 3/1995 | Alt et al. ..................... | 526/129 |
| 5,403,799 A | 4/1995 | Miller et al. ................... | 502/64 |
| 5,403,809 A | 4/1995 | Miller et al. ................ | 502/413 |
| 5,427,991 A | 6/1995 | Turner ........................ | 502/103 |
| 5,569,634 A | 10/1996 | Miller et al. ................... | 502/64 |
| 5,633,419 A | 5/1997 | Spencer et al. ............. | 585/522 |
| 5,643,847 A | 7/1997 | Walzer, Jr. .................. | 502/117 |
| 5,753,577 A | 5/1998 | Hamura et al. ............. | 502/113 |
| 5,807,800 A | 9/1998 | Shamshoum et al. ....... | 502/104 |
| 5,807,938 A | 9/1998 | Kaneko et al. ............. | 526/160 |
| 5,817,724 A * | 10/1998 | Aoki et al. .................. | 526/127 |
| 5,830,820 A * | 11/1998 | Yano et al. .................. | 502/120 |
| 5,866,663 A | 2/1999 | Brookhart et al. .......... | 526/170 |
| 5,880,241 A | 3/1999 | Brookhart ................... | 526/348 |
| 5,880,323 A | 3/1999 | Brookhart, III et al. ..... | 585/527 |
| 5,886,224 A | 3/1999 | Brookhart et al. .......... | 564/272 |
| 5,891,963 A | 4/1999 | Brookhart et al. ....... | 525/326.1 |
| 5,928,982 A * | 7/1999 | Suga et al. ................. | 502/118 |
| 5,955,555 A | 9/1999 | Bennett ...................... | 526/133 |
| 5,973,084 A * | 10/1999 | Suga et al. .................. | 526/129 |
| 6,110,858 A * | 8/2000 | Kaneko et al. ............. | 502/118 |

FOREIGN PATENT DOCUMENTS

| | | |
|---|---|---|
| EP | 0 490 226 | 6/1992 |
| EP | 0 849 292 | 6/1998 |
| EP | 0 881 232 | 12/1998 |
| EP | 0 849 288 | 2/1999 |
| JP | 2-78663 | 3/1990 |
| JP | HEI 10-338516 | 2/1999 |
| WO | WO 96/23010 | 8/1996 |
| WO | PCT/US96/17140 | 10/1996 |
| WO | WO 98/27124 | 6/1998 |
| WO | WO 98/30612 | 7/1998 |
| WO | WO 98/56832 | 12/1998 |
| WO | WO 97/48743 | 2/1999 |
| WO | WO 99/46302 | 9/1999 |
| WO | WO 99/46303 | 9/1999 |
| WO | WO 99/46304 | 9/1999 |
| WO | WO 01/25149 | 4/2001 |

OTHER PUBLICATIONS

Yoshinori Suga, Eiji Isobe, Toru Suzuki, Kiyotoshi Fujioka, "Novel Clay Mineral–Supported Metallocene Catalysts For Olefin Polymerization," Publication Presentation at MetCon 99: "Polymers in Transition," Jun. 9–10, 1999, Houston, Texas, United States of America.

Thomas J. Pinnavaia "Intercalated Clay Catalysts", Science, Apr. 22, 1983, vol. 220, No. 4595, pp. 365–371.

Brooke L. Small, Maurice Brookhart, and Alison M.A. Bennett, "Highly Active Iron and Cobalt Catalysts for the Polymerization of Ethylene", Journal American Chemical Society 1998, 120, 4049–4050.

Rip A. Lee, Rene J. Lachicotte, and Guillermo C. Bazan, "Zirconium Complexes of 9–Phenyl–9–borataanthracene. Synthesis, Structural Characterization, and Reactivity", Journal American Chemical Society 1998, 120, 6037–6046.

George J.P. Britovsek, Vernon C. Gibson, and Duncan F. Wass, Agnew. Chem. Int. Ed 1999, vol. 38, pp 428–447 "The Search for New–Generation Olefin Polymerization Catalysts: Life Beyond Metallocenes".

"New Catalysts to Polymerize Olefins", C&EN, Apr. 13, 1998, pp. 11–12.

"Move Over Metallocenes", Chemical Week, Apr. 29, 1998, p. 72.

"Novel polymerization reactions catalyzed by homogeneous Pd(II) and Ni(ii) a–diimino complexes", Caltech Highlights, Mar. 1997.

Lynda K. Johnson, Christopher M. Killian, and Maurice Brookhart, "New Pd(II)– and Ni(II)–Based Catalysts for Polymerization of Ethylene and a–olefins", Journal American Chemical Society 1995, 177, 6414–6415.

Lynda K. Johnson, Stefan Mecking, and Maurice Brookhart, "Copolymerization of Ethylene and Propylene with Functionalized Vinyl Monomers by Palladium (II) Catalysts", 1996 American Chemical Society, vol. 118, No. 1, 1996.

Pasquale Longo, Fabia Grisi, Antonio Proto, Adolfo Zambelli, "New Ni(II) based catalysts in the polymerization of olefins", Macromol. Rapid Commun. 19, 31–34 (1998).

* cited by examiner

Uncalcined
Activity = Kg PE/g Cat/Hr

Calcination Temperature = 100°C
Activity = Kg PE/g Cat/Hr

Calcination Temperature = 150°C
Activity = Kg PE/g Cat/Hr

Calcination Temperature = 200°C
Activity = Kg PE/g Cat/Hr

Calcination Temperature = 250°C
Activity = Kg PE/g Cat/Hr

Calcination Temperature = 300°C
Activity = Kg PE/g Cat/Hr

Calcination Temperature = 400°C
Activity = Kg PE/g Cat/Hr

Calcination Temperature = 500°C
Activity = Kg PE/g Cat/Hr

Calcination Temperature = 600°C
Activity = Kg PE/g Cat/Hr

Calcination Temperature = 700°C
Activity = Kg PE/g Cat/Hr

COORDINATION CATALYST SYSTEMS EMPLOYING AGGLOMERATED METAL OXIDE/CLAY SUPPORT-ACTIVATOR AND METHOD OF THEIR PREPARATION

FIELD OF THE INVENTION

The invention relates to coordination catalyst systems, which comprise a support-activator in agglomerate form and a coordination catalyst component and methods of their preparation.

BACKGROUND OF THE INVENTION

Coordination catalyst systems, which are usually based on transition metal compounds of Groups 3 to 10 and organometallic compounds of Group 13 of the Periodic Table of the Elements, are exceptionally diverse catalysts which are employed in chemical reactions of and with olefinically unsaturated compounds. Such reactions are embodied in processes for the preparation of olefin polymers by coordination polymerization.

The preparation of polyethylene of increased density (high-density polyethylene, HDPE) and of polymers and copolymers of ethylene, propylene or other 1-alkenes is of considerable industrial importance.

The prevailing belief on the reaction mechanism of coordination catalysts is that a transition metal compound forms a catalytically active center to which the olefinically unsaturated compound bonds by coordination in a first step. Olefin polymerization takes place via coordination of the monomers and a subsequent insertion reaction into a transition metal-carbon or a transition metal-hydrogen bond.

The presence of organometallic compounds (e.g., organoaluminum compounds such as methylalumoxane) in the coordination catalyst systems or during the catalyzed reaction is thought to be necessary in order to activate the catalyst, or maintain its activity, by reduction and, where appropriate, alkylation or formation of a complex system. These compounds were therefore also called cocatalysts. The compound containing the transition metal atom, which is eventually activated, is typically called the pre-catalyst and after activation, the primary catalyst.

The best known industrially used catalyst systems for coordination polymerization are those of the "Ziegler-Natta catalyst" type and the "Phillips catalyst" type. The former comprise the reaction product of a metal alkyl or hydride of elements of the first three main groups of the Periodic Table and a reducible compound of a transition metal element of Groups 4 to 7 the combination used most frequently comprising an aluminum alkyl, such as diethylaluminum chloride, and titanium (IV) chloride. More recent highly active Ziegler-Natta catalysts are systems in which the titanium compound is fixed chemically to the surface of magnesium compounds, such as, in particular, magnesium chloride.

More recent developments have focused on single-site catalyst systems. Such systems are characterized by the fact that their metal centers behave alike during polymerization thus making very uniform polymers.

Catalysts are judged to behave in a single-site manner when the polymer they make meets some basic criteria (e.g., narrow molecular weight distribution, or uniform comonomer distribution). Thus, the metal can have any ligand set around it and be classified as "single-site" as long as the polymer that it produces has certain properties.

Includable within single-site catalyst systems are metallocene catalysts and constrained geometry catalysts.

A "metallocene" is conventionally understood to mean a metal (e.g., Zr, Ti, Hf, Sc, Y, Vi or La) complex that is bound to two cyclopentadienyl (Cp) rings, or derivatives thereof, such as indenyl, tetrahydroindenyl, fluorenyl and mixtures. In addition to the two Cp ligands, other groups can be attached to the metal center, most commonly halides and alkyls. The Cp rings can be linked together (so-called "bridged metallocene" structure), as in most polypropylene catalysts, or they can be independent and freely rotating, as in most (but not all) metallocene-based polyethylene catalysts. The defining feature is the presence of two Cp ligands or derivatives.

Metallocene catalysts can be employed either as so-called "neutral metallocenes" in which case an alumoxane, such as methylalumoxane, is used as a co-catalyst, or they can be employed as so-called "cationic metallocenes" which incorporate a stable and loosely bound non-coordinating anion as a counter ion to a cationic metal metallocene center. Cationic metallocenes are disclosed in U.S. Pat. Nos. 5,064,802; 5,225,500; 5,243,002; 5,321,106; 5,427,991; and 5,643,847; and EP 426 637 and EP 426 638.

"Constrained geometry" is a term that refers to a particular class of organometallic complexes in which the metal center is bound by only one modified Cp ring or derivative. The Cp ring is modified by bridging to a heteroatom such as nitrogen, phosphorus, oxygen, or sulfur, and this heteroatom also binds to the metal site. The bridged structure forms a fairly rigid system, thus the term "constrained geometry". By virtue of its open structure, the constrained geometry catalyst can produce resins (long chain branching) that are not possible with normal metallocene catalysts.

Still more recently, late transitional metal (e.g., Fe, Co, Ni, or Pd) bidentate and tridentate catalyst systems have been developed. Representative disclosures of such late transition metal catalysts are found in U.S. Pat. No. 5,880,241 and its divisional counterparts U.S. Pat. Nos. 5,880,323; 5,866,663; 5,886,224; and 5,891,963, and PCT International Application Nos. PCT/US98/00316; PCT/US97/23556; PCT/GB99/00714; PCT/GB99/00715; and PCT/GB99/00716.

Both the single site and late transition metal pre-catalysts typically require activation to form a cationic metal center by an organometal Lewis acid (e.g., methyl alumoxane (MAO)) (characterized as operating through a hydrocarbyl abstraction mechanism). Such activators or cocatalysts are pyrophoric (or require pyrophoric reagents to make the same), and are typically employed in quantities which are multiples of the catalyst. Attempts to avoid such disadvantages have led to the development of borane (e.g., trispentaflurophenylborane) and borate (e.g., ammonium tetrakispentaflurophenylborate) activators which are non-pyrophoric but more expensive to manufacture. These factors complicate the development of heterogeneous versions of such catalyst systems in terms of meeting cost and performance targets.

Use of these catalysts and related types in various polymerization processes can give products with sometimes extremely different properties. In the case of olefin polymers, which are generally known to be important as materials, the suitability for particular applications depends, on the one hand, on the nature of the monomers on which they are based and on the choice and ratio of comonomers and the typical physical parameters which characterize the polymer, such as average molecular weight, molecular weight distribution, degree of branching, degree of crosslinking, crystallinity, density, presence of functional groups in the polymer and the like, and on the other hand, on properties resulting from the process, such as content of low molecular weight impurities and presence of catalyst residues, and last but not least on costs.

In addition to realization of the desired product properties, other factors are decisive for evaluating the efficiency of a coordination catalyst system, such as the activity of the catalyst system, that is to say the amount of catalyst required for economic conversion of a given amount of olefin, the product conversion per unit time and the product yield. Catalyst systems such as the Fe or Co catalysts described herein, which exhibit high productivity and high specificity in favor of a low degree of branching of the polymer, are sought for certain applications. Catalyst systems utilizing the Ni and Pd catalysts described herein seek to achieve highly branched polymers with reasonable productivity.

The stability and ease of handling of the catalyst or its components is another factor which affects the choice of commercial embodiments thereof. Practically all known coordination catalysts are extremely sensitive to air and moisture to varying degrees. Coordination catalysts are typically reduced in their activity or irreversibly destroyed by access to (atmospheric) oxygen and/or water. Most Ziegler-Natta and metallocene catalysts, for example, deactivate spontaneously on access to air and become unusable. Most coordination catalysts must therefore typically be protected from access of air and moisture during preparation, storage and use, which of course makes handling difficult and increases the expenditure required. The bi-end tri-dentate catalysts described herein are known to be more tolerant toward oxygen.

A still further factor to be considered is the ability to utilize the coordination catalyst as a heterogeneous catalyst system. The advantages of a heterogeneous catalyst system are more fully realized in a slurry polymerization process. More specifically, slurry polymerizations are often conducted in a reactor wherein monomer, catalysts, and diluent are continuously fed into the reactor. The solid polymer that is produced is not dissolved in the diluent and is allowed to settle out before being periodically withdrawn form the reactor. In this kind of polymerization, factors other than activity and selectivity, which are always present in solution processes, become of paramount importance.

For example, in the slurry process it is desired to have a supported catalyst which produces relatively high bulk density polymer. If the bulk density is too low, the handling of the solid polymer becomes impractical. It is also an advantage to have the polymer formed as uniform, spherical particles that are relatively free of fines. Although fines can have a high bulk density, they also do not settle as well as larger particles and they present additional handling problems with the later processing of the polymer fluff.

Furthermore, slurry polymerization processes differ in other fundamental ways from the typical solution polymerization processes. The latter requires higher reaction temperatures (>130° C.) and pressures (>450 psi) and often results in lower molecular weight polymers. The lower molecular weight is attributed to the rapid chain-termination rates under such reaction conditions. Although lowering the reaction temperature and/or pressure, or changing molecular structure of the metallocene catalyst can produce higher molecular weight polymer in a solution process, it becomes impractical to process the resulting high molecular weight polymers in the downstream equipment due to the high viscosity.

In contrast, a slurry reaction process overcomes many of the above disadvantages by simply operating at lower temperature (<100° C.). As a result, a higher molecular weight polymer with a uniform particle size and morphology can be routinely obtained. It is also advantageous to carry out slurry reactions with sufficiently high polymerization efficiencies such that residues from the polymerization catalysts do not have to be removed from the resulting polymers. The above-discussed advantages of slurry polymerization processes provides incentive for developing coordination catalysts in heterogeneous form. Thus far, gas phase polymerization processes are only practical with a heterogeneous catalyst system Finally, evaluation of a coordination catalyst system must include process considerations which influence the morphology (e.g., bulk density) of the resulting polymer, the environmental friendliness of the process, and avoidance of reactor fouling.

Thus, there has been a continuing search to develop a coordination catalyst system, preferably a heterogeneous coordination catalyst system, which demonstrates high catalyst activity, is free of reactor fouling, produces polymer products having good resin morphology while simultaneously being very process friendly (e.g., easy to make) and inexpensive to make.

There has also been a particular need to discover compounds which are less sensitive to deactivation and/or less hazardous and still suitable as activating components in coordination catalyst systems.

The present invention was developed in response to these searches.

International application No. PCT/US97/11953 (International Publication No. WO 97/48743) is directed to frangible, spray dried agglomerate catalyst supports of silica gel, which possess a controlled morphology of microspheroidal shape, rough scabrous appearance, and interstitial void spaces which penetrate the agglomerate surface and are of substantially uniform size and distribution. The agglomerates also possess a 1–250 micron particle size, 1–1000 $m^2/g$ surface area, and an Attrition Quality Index (AQI) of at least 10. The agglomerates are derived from a mixture of dry milled inorganic oxide particles, e.g., silica gel and optionally but preferably wet milled inorganic oxide particles, e.g., silica gel particles (which preferably contain a colloidal content of less than 1 micron particle), slurried in water for spray drying. The high AQI assures that the agglomerates are frangible and that the polymerization performance is improved. The controlled morphology is believed to permit the constituent particles of the agglomerates to be more uniformly impregnated or coated with conventional olefin polymerization catalysts. Clay is not disclosed as suitable metal oxide.

U.S. Pat. No. 5,633,419 discloses the use of spray dried silica gel agglomerates as supports for Ziegler-Natta catalyst systems.

U.S. Pat. No. 5,395,808 discloses bodies made by preparing a mixture of ultimate particles of bound clay, with one or more optional ingredients such as inorganic binders, extrusion or forming aids, burnout agents or forming liquid, such as water. Preferably the ultimate particles are formed by spray drying. Suitable binders include silica when Kaolin clay is used as the inorganic oxide. The bodies are made from the ultimate particles and useful methods for forming the bodies include extrusion, pelletization, balling, and granulating. Porosity is introduced into the bodies during their assembly from the ultimate particles, and results primarily from spaces between the starting particles. The porous bodies are disclosed to be useful as catalyst supports.

See also U.S. Pat. Nos. 5,569,634; 5,403,799; and 5,403,809; and EP 490 226 for similar disclosures.

U.S. Pat. No. 5,362,825 discloses olefin polymerization catalysts produced by contacting a pillared clay with a Ziegler-Natta catalyst, i.e., a soluble complex produced from the mixture of a metal dihalide with at least one transition metal compound in the presence of a liquid diluent. The resulting mixture is in turn contacted with an organoaluminum halide to produce the catalyst.

U.S. Pat. No. 5,807,800 is directed to a supported metallocene catalyst comprising a particulate catalyst support, such as a molecular sieve zeolite, and a stereospecific metallocene, supported on the particulate support and incorporating a metallocene ligand structure having two sterically dissimilar cyclopentadienyl ring structures coordinated with a central transition metal atom. At column 4 of the background discussion, it is disclosed that cationic metallocenes which incorporate a stable non-coordinating anion normally do not require the use of alumoxane.

U.S. Pat. No. 5,238,892 discloses the use of undehydrated silica as a support for metallocene and trialkylaluminum compounds.

U.S. Pat. No. 5,308,811 discloses an olefin polymerization catalyst obtained by contacting (a) a metallocene-type transition metal compound, (b) at least one member selected from the group consisting of clay, clay minerals, ion exchanging layered compounds, diatomaceous earth, silicates and zeolites, and (c) an organoaluminum compound. Component (b) may be subjected to chemical treatment, which, for example, utilizes ion exchangeability to substitute interlaminar exchangeable ions of the clay with other large bulky ions to obtain a layered substance having the interlaminar distance enlarged. Such bulky ions play the role of pillars, supporting the layered structure, and are therefore called pillars. Guest compounds, which can be intercalated, include cationic inorganic compounds derived from such materials as titanium tetrachloride and zirconium tetrachloride. $SiO_2$ may be present during such intercalation of guest compounds. The preferred clay is montmorillonite. Silica gel is not disclosed as a suitable component (b).

U.S. Pat. No. 5,753,577 discloses a polymerization catalyst comprising a metallocene compound, a co-catalyst such as proton acids, ionized compounds, Lewis acids and Lewis acidic compounds, as well as clay mineral. The clay can be modified by treatment with acid or alkali to remove impurities from the mineral and possibly to elute part of the metallic cations from the crystalline structure of the clay. Examples of acids which can effect such modification include Bronsted acids such as hydrochloric, sulfuric, nitric and acetic acids. The preferred modification of the clay is accomplished by exchanging metallic ions originally present in the clay with specific organic cations such as aliphatic ammonium cations, oxonium ions, and onium compounds such as aliphatic amine hydrochloride salts. Such polymerization catalysts may optionally be supported by fine particles of $SiO_2$, $Al_2O_3$, $ZrO_2$, $B_2O_3$, CaO, ZnO, $MgCl_2$, $CaCl_2$, and mixtures thereof. (Col. 3, line 48; Col. 21, line 10 et seq.). The fine particle support may be of any shape preferably having a particle size in the range of 5–200 microns, and pore size ranges of from 20–100 Å. Use of metal oxide support is not described in the examples.

U.S. Pat. No. 5,399,636 discloses a composition comprising a bridged metallocene which is chemically bonded to an inorganic moiety such as clay or silica. Silica is illustrated in the working examples as a suitable support, but not clay.

EP 849 292 discloses an olefin polymerization catalyst consisting essentially of a metallocene compound, a modified clay compound, and an organoaluminum compound. The modification of the clay is accomplished by reaction with specific amine salts such as a proton acid salt obtained by the reaction of an amine with a proton acid (hydrochloric acid). The specifically disclosed proton acid amine salt is hexylamine hydrochloride. The modification of the clay results in exchange of the ammonium cation component of the proton acid amine salt with the cations originally present in the clay to form the mineral/organic ion complex.

U.S. Pat. No. 5,807,938 discloses an olefin polymerization catalyst obtained by contacting a metallocene compound, an organometallic compound, and a solid catalyst component comprising a carrier and an ionized ionic compound capable of forming a stable anion on reaction with the metallocene compound. Suitable carriers disclosed include inorganic compounds or organic polymeric compounds. The inorganic compounds include inorganic oxides, such as alumina, silica, silica-alumina, silica magnesia; clay minerals; and inorganic halides. The ionized ionic compound contains an anionic component and a cationic component. The cationic component preferably comprises a Lewis Base functional group containing an element of the Group 15 or 16 of the Periodic Table such as ammonium, oxionium, sulfonium, and phosphonium, cations. The cation component may also contain a functional group other than Lewis Base function groups, such as carbonium, tropinium, and a metal cation. The anion component includes those containing a boron, aluminum, phosphorous or antimony atom, such as an organoboron, organoaluminum, organophosphorous, and organoantimony anions. The cationic component is fixed on the surface of the carrier. Only silica or chlorinated silica are employed in the working examples as a carrier. In many examples, the silica surface is modified with a silane.

U.S. Pat. No. 5,830,820 discloses an olefin polymerization catalyst comprising a modified clay mineral, a metallocene compound, and an organoaluminum compound. The clay mineral is modified with a compound capable of introducing a cation into the layer interspaces of the clay mineral. Suitable cations which are inserted into the clay include those saving a proton, namely, Bronsted acids such as trimethylammonium, as well as carbonium ions, oxonium ions, and sulfonium ions. Representative anions include chlorine ion, bromide ion, and iodide ion.

EP 881 232 is similar to U.S. Pat. No. 5,830,820, except that the average particle size of the clay is disclosed as being less than 10 microns.

EP 849 288 discloses an olefin polymerization catalyst consisting essentially of a metallocene compound, an organoaluminum compound, and a modified clay compound. The clay is modified by contact with a proton acid salt of certain specific amine compounds, such as hexylamine chloride.

JP Kokai Patent HEI 10-338516 discloses a method for producing a metallic oxide intercalated in a clay mineral which comprises swelling and diluting the clay mineral, having a laminar structure, with water to form a sol; adding an organometallic compound to an aqueous solution containing organic acid to form a sol that contains the metallic compound; mixing the swelling clay mineral sol with the metallic compound containing sol and agitating to intercalate the metallic compound between the layers in the swollen clay mineral; and washing, dehydrating, drying and roasting the clay mineral that has the metallic compound intercalated therein. Suitable metallic oxides include those of titanium, zinc, iron, and tin.

U.S. Pat. No. 4,981,825 is directed to a dried solid composition comprising clay particles and inorganic metal oxide particles substantially segregated from the clay particles. More specifically, the metal oxide particles are sol particles which tend to fuse upon sintering. Consequently, by segregating the sol particles with smectite-type clay particles, fusion of the sol particles is reduced under sintering conditions thereby preventing a loss of surface area. The preferred metal oxide is colloidal silica having an average particle size between 40 and 800 angstroms (0.004 and 0.08 microns), preferably 40 and 80 angstroms. The ratio of the metal oxide to clay is between about 1:1 to 20:1, preferably 4:1 to 10:1. The end product is described at Column 3, line 50 et seq. as sol particle-clay composites in which the clay platelets inhibit aggregation of the sol particles. Such products are made up entirely of irregular sol-clay networks in which the clay platelets are placed between the sol particles. The result is a composite with very high surface area, and ability to retain such high surface area at elevated temperatures. This arrangement is also distinguished from intercalation of the clay by the silica. The subject compositions are disclosed in the abstract to be useful for catalytic gaseous reactions and removal of impurities from gas streams. Specific catalysts systems are not disclosed.

U.S. Pat. No. 4,761,391 discloses delaminated clays whose x-ray defraction patterns do not contain a distinct first order reflection. Such clays are made by reacting synthetic or natural swelling clays with a pillaring agent selected from the group consisting of polyoxymetal cations, mixtures of polyoxymetal cations, colloidal particles comprising alumina, silica, titania, chromia, tin oxide, antimony oxide or mixtures thereof, and cationic metal clusters comprising nickel, molybdenum, cobalt, or tungsten. The resulting reaction product is dried in a gaseous medium, preferable by spray drying. The resulting acidic delaminated clays may be used as the active component of cracking and hydroprocessing catalysts. The ratio of clay to pillaring agent is disclosed to be between about 0.1 and about 10. To obtain the delminated clay, a suspension of swelling clay, having the proper morphology, e.g., colloidal particle size, is mixed with a solution or a suspension of the pillaring agent at the aforedescribed ratios. As the reactants are mixed, the platelets of clay rapidly sorb the pillaring agent producing a flocculated mass comprised of randomly oriented pillared platelet aggregates. The flocculated reaction product or gel is then separated from any remaining liquid by techniques such as centrifugation filtration and the like. The gel is then washed in warm water to remove excess reactants and then preferably spray dried. The pillaring agent upon heating is converted to metal oxide clusters which prop apart the platelets of the clay and impart the acidity which is responsible for the catalytic activity of the resultant delaminated clay. The x-ray defraction pattern of such materials contains no distinct first order of reflection which is indicative of platelets randomly oriented in the sense that, in addition to face-to-face linkages of platelets, there are also face-to-edge and edge-to-edge linkages. The utilities described at Column 8, Lines 55 et seq. include use as components of catalyst, particularly hydrocarbon conversion catalysts, and most preferably as components of cracking and hydrocracking catalysts. This stems from the fact that the because the clay contains macropores as well as micropores, large molecules that normally cannot enter the pores of zeolites will have access to the acid sites in the delaminated clays making such materials more efficient in cracking of high molecular weight hydrocarbon constituents. (See also U.S. Pat. No. 5,360,775.)

U.S. Pat. No. 4,375,406 discloses compositions containing fibrous clays and precalcined oxides prepared by forming a fluid suspension of the clay with the precalcined oxide particles, agitating the suspension to form a co-dispersion, and shaping and drying the co-dispersion. Suitable fibrous clays include aluminosilicates, magnesium silicates, and aluminomagnesium silicates. Examples of suitable fibrous clays are attapulgite, playgorskite, sepiolite, haloysite, endellite, chrysotile asbestos, and imogolite. Suitable oxides include silica. The ratio of fibrous clay to precalcined oxide is disclosed to vary from 20:1 to 1:5 by weight. In contrast, the presently claimed invention does not employ fibrous clays but does not exclude their presence.

Additional patents which disclose intercalated clays are U.S. Pat. Nos. 4,629,712 and 4,637,992. Additional patents which disclose pillared clays include U.S. Pat. Nos. 4,995,964 and 5,250,277.

A paper presented at the MetCon '99 Polymers in Transition Conference in Houston, Tex., on Jun. 9–10, 1999, entitled "Novel Clay Mineral-Supported Metallocene Catalysts for Olefin Polymerization" by Yoshinor Suga, Eiji Isobe, Toru Suzuki, Kiyotoshi Fujioka, Takashi Fujita, Yoshiyuki Ishihama, Takehiro Sagae, Shigeo Go, and Yumito Uehara discloses olefin polymerization catalysts comprising metallocene compounds supported on dehydrated clay minerals optionally in the presence of organoaluminum compounds. At page 5 it is disclosed that catalysts prepared with fine clay mineral particles has had operational difficulties such as fouling which make them unsuitable for slurry and gas phase processes. Thus, a granulation method was developed to give the clay minerals a uniform spherical shape. The method for producing this spherical shape is not disclosed.

PCT International Application No. PCT/US96/17140, corresponding to U.S. Ser. No. 562,922, discloses a support for metallocene olefin polymerizations comprising the reaction product of an inorganic oxide comprising a solid matrix having reactive hydroxyl groups or reactive silane functionalized derivatives of hydroxyl groups on the surface thereof, and an activator compound. The activator compound comprises a cation which is capable of reacting with the metallocene compound to form a catalytically active transition metal complex and a compatible anion containing at least one substituent able to react with the inorganic oxide matrix through residual hydroxyl functionalities or through the reactive silane moiety on the surface thereof. The representative example of a suitable anion activator is tris (pentafluorophenyl)(4-hydroxyphenyl)borate. Suitable inorganic oxides disclosed include silica, alumina, and aluminosilicates.

U.S. Pat. No. 5,880,241 discloses various late transition metal bidentate catalyst compositions. At column 52, lines 18 et seq., it is disclosed that the catalyst can be heterogenized through a variety of means including the use of heterogeneous inorganic materials as non-coordinating counter ions. Suitable inorganic materials disclosed include aluminas, silicas, silica/aluminas, cordierites, clays, and $MgCl_2$ but mixtures are not disclosed. Spray drying the catalyst with its associated non-coordinating anion onto a polymeric support is also contemplated. Examples 433 and 434 employ montmorillonite clay as a support but polymer morphology is not disclosed for these examples.

PCT International Application No. PCT/US97/23556 discloses a process for polymerizing ethylene by contact with Fe or Co tridentate ionic complex formed either through alkylation or abstraction of the metal alkyl by a strong Lewis acid compound, e.g., MAO, or by alkylation with a weak Lewis acid, e.g., triethylaluminum and, subsequent abstraction of the resulting alkyl group on the metal center with a stronger Lewis acid, e.g., $B(C_6F_5)_3$. The Fe or Co tridentate compound may be supported by silica or alumina and activated with a Lewis or Bronsted acid such as an alkyl aluminum compound (pg. 19, line 1 et seq.). Acidic clay (e.g., montmorillonite) may function as the support and replace the Lewis or Bronsted acid. Examples 43–45 use silica supported MAO, and Example 56 employs dehydrated silica as a support for the Co complex. Polymer morphology is not discussed.

PCT International Application No. PCT/US98/00316 discloses a process for polymerizing propylene using catalysts similar to the above discussed PCT-23556 application.

U.S. Ser. No. 09/166,545, filed Oct. 5, 1998, by Keng-Yu Shih, an inventor of the present application, discloses a supported late transition metal bidentate or tridentate catalyst system containing anion and cation components wherein the anion component contains boron, aluminum, gallium, indium, tellurium and mixtures thereof covalently bonded to an inorganic support (e.g. $SiO_2$) through silane derived intermediates such as a silica-tethered anilinium borate.

U.S. Ser. No. 09/431,803 filed on an even date herewith by Keng-Yu Shih discloses the use of silica agglomerates as a support for transition metal catalyst systems employing specifically controlled (e.g., very low) amounts of non-abstracting aluminum alkyl activators.

SUMMARY OF THE INVENTION

The present invention relies on the discovery that certain agglomerate composite particles of an inorganic oxide (e.g., silica) and an ion exchanging layered compound (e.g., clay) are believed to possess enhanced Lewis acidity dispersion and accessibility which renders them extremely proficient support-activators for certain non-metallocene and non-constrained geometry bi- and tridentate containing transition metal compound pre-catalysts. More specifically, it is believed that the agglomerate particles incorporate the ionizable clay particles in such a way that their known Lewis acidity is more uniformly dispersed throughout the particle while simultaneously being made more accessible for interaction with the pre-catalyst. It is believed that this permits the support-activator to effectively and simultaneously activate, e.g., ionize, the pre-catalyst when in a pre-activated (e.g., ionizable) state as well as support the active catalyst during polymerization. This eliminates the need to use additional ionizing agents which are expensive, and introduce added complexity to the system. In contrast, the support-activator is inexpensive, environmentally friendly, and easy to manufacture.

The present invention relies on the further discovery that pre-activation of the pre-catalyst is very sensitive to the level of certain organometallic compounds and is induced by extremely low amounts of the same. This further reduces the catalyst system costs, and eliminates the need for expensive MAO or borate activators of the prior art while simultaneously achieving extremely high activity.

A still further aspect of the discovery of the present invention is that the support-activator apparently immobilizes the pre-catalyst by adsorption and/or absorption, preferably by chemadsorption and/or chemabsorption from a slurry of the same without any special impregnation steps, which slurry can actually be used directly for the slurry polymerization of olefins. The resulting polymer morphology is indicative of a heterogeneous polymerization which is consistent with the observation (based on x-ray powder diffraction, cross-section microprobe elemental analysis and the color induced in the support-activator) that the support-activator is readily impregnated by the pre-catalyst such that it is believed to react with the same. Moreover, the microspheroidal morphology of the catalyst system coupled with the immobilization of the active catalyst therein is believed to contribute to the extremely desirable observed polymer morphology because it prevents reactor fouling, eliminates polymer fines and exhibits a high bulk density. The catalyst system can be employed as a slurry or dry powder.

A still even further aspect of the discovery of the present invention is the functional interrelationship which exists between the inorganic oxide: layered material weight ratio, the calcination temperature, and the amount of organoaluminum compound on the one hand, and the catalyst activity on the other hand, such that these variables can be controlled to exceed the activity of the same pre-catalyst supported and/or activated by the inorganic oxide alone, or the layered material (e.g., clay) alone, while simultaneously producing good polymer morphology.

Accordingly, in one aspect of the invention there is provided a coordinating catalyst system, preferably a heterogeneous coordinating catalyst system, capable of polymerizing olefins comprising:

(I) as a pre-catalyst, at least one non-metallocene, non-constrained geometry, bidentate transition metal compound or tridentate transition metal compound capable of (A) being activated upon contact with the support-activator, or (B) being converted, upon contact with an organometallic compound, to an intermediate capable of being activated upon contact with the support-activator, wherein the transition metal is at least one member selected from Groups 3 to 10 of the Periodic table; in intimate contact with (II) support-activator agglomerate comprising a composite of (A) at least one inorganic oxide component selected from $SiO_2$, $Al_2O_3$, MgO, $AlPO_4$, $TiO_2$, $ZrO_2$, $Cr_2O_3$ and (B) at least one ion containing layered material having interspaces between the layers and sufficient Lewis acidity, when present within the support-activator, to activate the pre-catalyst when the pre-catalyst is in contact with the support-activator, said layered material having a cationic component and an anionic component, wherein said cationic component is present within the interspaces of the layered material, said layered material being intimately associated with said inorganic oxide component within the agglomerate in an amount sufficient to improve the activity of the coordinating catalyst system for the polymerization of ethylene monomer, expressed as Kg polyethylene/g of catalyst system/hour, relative to the activity of a corresponding coordination catalyst system employing the same pre-catalyst but in the absence of either component A (inorganic oxide) or B (layered material) of the support activator, wherein the amount of the pre-catalyst and support-activator which is in intimate contact is sufficient to provide a ratio of micromoles of pre-catalyst to grams of support-activator of from about 5:1 to about 500:1.

In another aspect of the present invention, there is provided a process for making the above catalyst system which comprises:

(I) agglomerating to form a support-activator:
(A) at least one inorganic oxide component selected from $SiO_2$, $Al_2O_3$, MgO, $AlPO_4$, $TiO_2$, $ZrO_2$, $Cr_2O_3$ with (B) at least one ion containing layered material having interspaces between the layers and sufficient Lewis acidity, when present within the support-activator, to activate the transition metal of the pre-catalyst compound of (II) when in contact with the support-activator, said layered material having a cationic component and an anionic component, wherein said cationic component is present within the interspaces of the layered material, said layered material being intimately associated with said inorganic oxide component within said agglomerate in an amount sufficient to improve the activity of the coordinating catalyst system for the polymerization of ethylene monomer, expressed as Kg polyethylene per gram of catalyst system per hour, relative to the activity of a corresponding coordination catalyst system employing the same pre-catalyst but in the absence of either component A or B of the support-activator;

(II) providing as a pre-catalyst at least one non-metallocene, non-constrained geometry pre-catalyst transition metal compound selected from bidentate transition metal compound, and tridentate transition metal compound, capable of (A) being activated upon contact with the support-activator, or (B) being converted, upon contact with an organometallic compound, to an intermediate capable of being activated upon contact with the support-activator, wherein the transition metal is at least one member selected from Groups 3 to 10 of the Periodic Table;

(III) contacting the support-activator and pre-catalyst in the presence of at least one inert liquid hydrocarbon in a manner sufficient to provide in the liquid hydrocarbon, a ratio of micromoles of pre-catalyst to grams of support-activator of from about 5:1 to about 500:1 and to cause at least one of absorption and adsorption of the pre-catalyst by the support-activator.

BRIEF DESCRIPTION OF THE DRAWINGS

FIGS. 3 to 14 are contour maps of the activity (KgPE/g of catalyst system per hour) of coordination catalyst systems prepared and tested in accordance with Example 8. Each individual plot line of each Figure is associated with a number which expresses the expected catalyst activity at the coordinate conditions of wt. % clay in the support-activator (based on the weight of silica+clay) (y-axis) and the millimoles of triisobutyl aluminum per gram of support-activator (x-axis).

DESCRIPTION OF PREFERRED EMBODIMENTS

Figure 1:
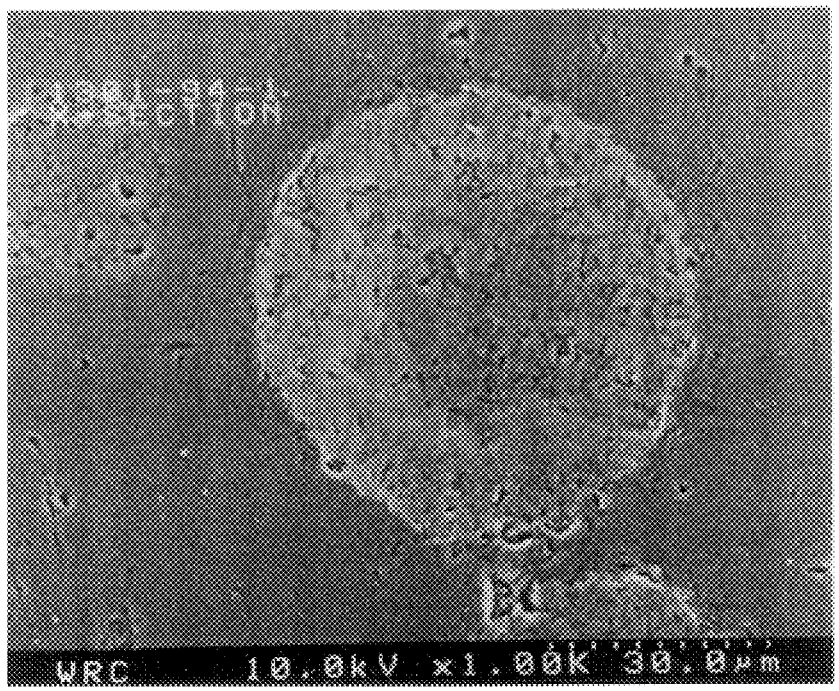
FIG. 1 is a scanning electron micrograph of a cross-section of an agglomerate particle prepared in accordance with Example 1, Run No. 4. The photograph was taken with a scanning electron microscope and represents a 1000-fold magnification of the actual agglomerate particle.

As indicated above, the present invention employs a non-metallocene non-constrained geometry neutral transition metal compound as a pre-catalyst which can be activated by contact with the support-activator and optionally an organometallic compound described hereinafter. An activated transition metal compound is one (a) in which the central transition metal atom such as that, represented by Z in the following formulas, is changed, such as by transforming into a state of full or partial positive charge, that is, the transition metal compound becomes a cation or cation-like, in its association with a stable anion or anion-like moiety and (b) that is capable of catalyzing the polymerization of olefins under polymerization conditions.

More specifically, the transition metal pre-catalyst can be at least one bidentate transition metal compound, at least one tridentate transition metal compound or mixtures thereof capable of (A) being activated upon contact with the support-activator or (B) being converted upon contact with an organometallic compound, to an intermediate which is capable of being activated upon contact with the support-activator.

The bidentate pre-catalyst compounds can be generically represented by the formula:

I and the tridentate pre-catalyst compounds can be generically represented by the formula:

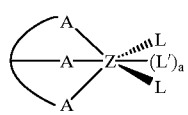

II wherein in each of formulas I and II above:

each A independently represents an at least one of oxygen, sulfur, phosphorous or nitrogen, and preferably represents oxygen or nitrogen or a combination thereof, and most preferably each A in I and at least two A's of II represent nitrogen;

"a" is an integer of 0, 1 or 2 which represents the number of (L') groups bound to Z, the value of "a" being dependent on the oxidation state of Z and whether a particular A—Z bond is dative or covalent, and if covalent whether it is a single or double bond;

Z represents at least one of Group 3 to 10 transition metals of the Periodic Table, preferably transition metals selected from Fe, Co, Ni, Ru, Rh, Pd, Os, Ir, Pt in the +2(a=0) or +3 (a=1) oxidation state or Ti, V, Cr, Mn, Zr, Hf in the +2 (a=0), +3 (a=1) or +4 (a=2) oxidation states, more preferably a Group 4 to 7 late transition metal selected from iron, cobalt, nickel or palladium and most preferably iron or cobalt; and each L and L' (when present) independently represents a ligand selected from the group of hydrogen, halo, and hydrocarbon based radical or group associated through a covalent or dative bond to Z, or both L groups together represent a hydrocarbon based radical, preferably a $C_3$ to $C_{24}$ hydrocarbylene group, associated through a covalent or dative bond to Z, and which, together with Z, constitute a ring or fused ring structure, typically a 3 to 7, preferably 4 to 7 member heterocyclic ring structure when the line joining A to Z represents a covalent bond.

As used herein, the term "hydrocarbon-based radical or group" denotes a radical or group having a carbon atom directly attached to the remainder of the molecule and having a predominantly hydrocarbon character within the context of this invention. Moreover, in this context the terms "group" and "radical" are used interchangeably. Such radicals include the following:

(1) Hydrocarbon radicals; that is, aliphatic radicals, aromatic- and alicyclic-substituted radicals, and the like, of the type known to those skilled in art.

(2) Substituted hydrocarbon radicals; that is, radicals containing pendant non-hydrocarbon substituents, that in the context of this invention, do not alter the predominantly hydrocarbon character of the radical or constitute a poison for the pre-catalyst. Those skilled in the art will be aware of suitable substituents; examples are halo, nitro, hydroxy, alkoxy, carbalkoxy, and alkythio.

(3) Hetero radicals; that is, radicals which, while predominantly hydrocarbon in character within the context of this invention, contain atoms other than carbon present as a member of the linear structure of a chain or ring otherwise composed of carbon atoms. Suitable hetero atoms will be apparent to those skilled in the art and include, for example, nitrogen, oxygen and sulfur.

In general, no more than three substituents or hetero atoms, and preferably no more than one, will be present for each 10 carbon atoms in the hydrocarbon based radical.

More specifically, the hydrocarbon based radical or group of L and L' can be substituted or unsubstituted, cyclic or non-cyclic, linear or branched, aliphatic, aromatic, or mixed aliphatic and aromatic including hydrocarbylene, hydrocarbyloxy, hydrocarbylsilyl, hydrocarbylamino, and hydrocarbylsiloxy radicals having up to 50 non-hydrogen atoms. The preferred L and L' groups are independently selected from halo, hydrocarbyl, and substituted hydrocarbyl radicals. The hydrocarbon based radical may typically contain from 1 to about 24 carbon atoms, preferably from 1 to about 12 carbon atoms and the substituent group is preferably a halogen atom.

The lines joining each A to each other A represent a hydrocarbon based radical, (typically a $C_2$ to $C_{90}$ (e.g., $C_2$ to $C_{20}$) preferably $C_3$ to $C_{30}$ (e.g., $C_3$ to $C_{12}$) hydrocarbon based radical, such as a hydrocarbylene radical providing a ring or fused ring hydrocarbylene structure or substituted hydrocarbylene structure. Portions of the structure may be comprised of carbon-carbon double bonds, carbon-carbon single bonds, carbon-A atom double bonds and carbon-A atom single bonds.

Typically, for the bidentate and tridentate transition metal compounds, A, Z and the carbons includable in the lines connecting the (A) groups collectively can be joined to typically make a 4 to 7, preferably 5 to 7 member ring structures.

The bonds between each A atom of the pre-catalyst and the transition metal Z and between L and Z can be either dative or covalent. Dative bonds merely represent a relationship between an electron rich A atom and the metal Z whereby the electron density of the metal is increased by providing electrons to the empty orbitals of the metal and do not induce any change in the oxidation state of the metal Z. Similar considerations apply to the relationship between Z and L.

The above described bidentate and tridentate pre-catalyst compounds from which the subject catalyst is derived are known. The disclosure of such components and the methods of forming the same have been described in various publications, including PCT Pub. Nos. WO 96/23010; WO 99/46302; WO 99/46303; and WO 99/46304; U.S. Pat. Nos. 5,880,241; 5,880,323; 5,866,663; 5,886,224; and 5,891,963;

Journal of the American Chemical Society (JACS) 1998, 120, 6037–6046, JACS 1995, 117, 6414–6415 and Supplemental Teachings; JACS 1996, 118, 1518; Macromol. Rapid Commun. 19, 31–34 (1998); Caltech Highlights 1997, 65–66; Chem Week Apr. 29, 1998, 72; C&EN Apr. 13, 1998 11–12; JACS 1998, 120, 4049–4050; Japanese Patent Application 02-078,663, and Angew. Chem. Int. Ed. 1999, vol 38, pp 428–447, The Search for New-Generation Olefin Polymerization Catalysts: Life Beyond Metallocenes. The teaching of each of the above cited references are incorporated herein in its entirety by reference.

In formulas I and II, each L and L' group is preferably a halogen atom, an unsubstituted hydrocarbyl or a hydrocarbyloxy group. The most preferred compounds are those having each L being halogen.

Preferred bidentate pre-catalyst compounds may, for example be represented as compounds of the formula:

Ia

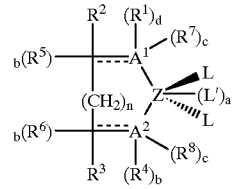

wherein n is an integer which can vary from 0 to 3, preferably 0 or 1;

a, b, c, and d each independently represents a 1 or 0 to indicate whether its associated R group is present (1) or not (0);

$R^1$ and $R^4$ are each independently selected from an unsubstituted or substituted $C_1$–$C_{20}$, preferably $C_3$–$C_{20}$ hydrocarbyl, such as alkyl, aryl, alkaryl or aralkyl group, as for example, i-propyl; t-butyl; 2,4,6-trimethylphenyl; 2-methylphenyl; 2,6-diisopropylphenyl; their fluorinated derivatives and the like; or with adjacent groups, together, may represent a $C_3$–$C_{20}$ hydrocarbylene group;

$R^2, R^3, R^5, R^6, R^7$, and $R^8$ are each independently selected from hydrogen, an unsubstituted or substituted $C_1$–$C_{20}$ hydrocarbyl group such as an alkyl, aryl, alkaryl or aralkyl group, as for example, methyl, ethyl, i-propyl, butyl (all isomers), phenyl, toluyl, 2,6-diisopropylphenyl and the like; or any R groups and adjacent carbon atoms, such as $R^2$ and $R^3$, taken together can provide an unsubstituted or substituted $C_3$–$C_{20}$ ring forming hydrocarbylene group, such as hexylene, 1,8-naphthylene and the like.

Z, A and each L and L' are as defined above in connection with Formula I. It is preferred that Z be selected from nickel or palladium and that each L and L' be independently selected from chlorine, bromine, iodine or a $C_1$–$C_8$ (more preferably $C_1$–$C_4$) alkyl. The bonds depicted by a dotted line signify the possibility that the atoms bridged by said dotted line may be bridged by a single or double bond.

It will be understood that the particular identity of b, c, and d in Formula I will be dependent on (i) the identity of Z, (ii) the identity of heteroatom A, (iii) whether the bond between heteroatom A and its adjacent ring carbon is single or double, and (iv) whether the bond between heteroatom A and Z is dative or covalent.

More specifically, when $A^1$ in Formula Ia is nitrogen it will always have at least 3 available vacancies for bonding.

If the bond between such N and its adjacent ring carbon is a double covalent bond, the b for $R^5$ will be zero, and only one further vacancy will be available in the N for either a covalent bond with Z, in which case c and d are zero, or if the bond with Z is dative, the N can covalently bond with its associated $R^1$ or $R^7$ group in which case either d or c is 1. Similarly, if the bonds between the N and the adjacent ring carbon and between N and Z are single covalent, the b of $R^5$ can be 1, and either d or the c of $R^7$ will be 1. Alternatively if the bond between N and Z is dative in this scenario, both d, and the c of $R^7$ can be 1.

The above rules are modified when $A^1$ in Formula Ia is oxygen because oxygen has only 2 available vacancies rather than the 3 vacancies for N. Thus, when $A^1$ is oxygen and is double covalently bonded to the adjacent ring carbon, the bond between $A^1$ and Z will be dative and b of $R^5$, c of $R^7$ and d will be 0. If such double bond is replaced by a single bond, the b of $R^5$ can be 1 and either the bond between $A^1$ and Z is single covalent, in which case c of $R^2$ and d are both 0, or if dative, either c of $R^7$ or d can be 1.

The vacancy rules when $A^1$ is sulfur are the same as for $A^1$ being oxygen. Phosphorous typically has 3 available vacancies for 3 single covalent bonds or 1 double covalent bond and 1 single covalent bond. Phosphorous will typically not covalently bond with Z, its association with Z being that of a dative bond.

Similar considerations to those described above for $A^1$ apply in respect to $A^2$ of Formula Ia and in respect to all A groups and a, b, c, of Formula IIa discussed hereinafter.

Illustrative of bidentate pre-catalyst compounds which are useful in providing the catalyst composition of the present invention are compounds of Ia having the following combination of groups:

TABLE I

Ia

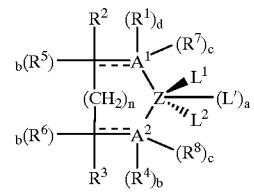

| # | n | $R^1/R^4$ | $R^2/R^3$ | $R^5/R^6$ | $A^1$ | $A^2$ | $L^1$ | $L^2$ | a | b | c | d | Z |
|---|---|---|---|---|---|---|---|---|---|---|---|---|---|
| 1 | 0 | 2,6-iPr$_2$Ph | Me | N/A | N | N | Me | e | 0 | 0 | 0 | 1 | Pd |
| 2 | 0 | 2,6-iPr$_2$Ph | Me | N/A | N | N | Me | Me | 0 | 0 | 0 | 1 | Pd |
| 3 | 0 | 2,6-iPr$_2$Ph | Me | N/A | N | N | Me | Br | 0 | 0 | 0 | 1 | Pd |
| 4 | 0 | 2,6-iPr$_2$Ph | Me | N/A | N | N | Me | Cl | 0 | 0 | 0 | 1 | Pd |
| 5 | 0 | 2,6-iPr$_2$Ph | Me | N/A | N | N | Br | Br | 0 | 0 | 0 | 1 | Pd |
| 6 | 0 | 2,6-iPr$_2$Ph | Me | N/A | N | N | Cl | Cl | 0 | 0 | 0 | 1 | Pd |
| 7 | 0 | 2,6-iPr$_2$Ph | Me | N/A | N | N | Br | Br | 0 | 0 | 0 | 1 | Ni |
| 8 | 0 | 2,6-iPr$_2$Ph | Me | N/A | N | N | Cl | Cl | 0 | 0 | 0 | 1 | Ni |
| 9 | 0 | 2,6-iPr$_2$Ph | Me | N/A | N | N | Me | Me | 0 | 0 | 0 | 1 | Ni |
| 10 | 0 | 2,6-iPr$_2$Ph | Me | N/A | N | N | Me | Br | 0 | 0 | 0 | 1 | Ni |
| 11 | 0 | 2,6-iPr$_2$Ph | Me | N/A | N | N | Me | Cl | 0 | 0 | 0 | 1 | Ni |
| 12 | 0 | 2,6-Me$_2$Ph | Me | N/A | N | N | Me | e | 0 | 0 | 0 | 1 | Pd |
| 13 | 0 | 2,6-Me$_2$Ph | Me | N/A | N | N | Me | Me | 0 | 0 | 0 | 1 | Pd |
| 14 | 0 | 2,6-Me$_2$Ph | Me | N/A | N | N | Me | Br | 0 | 0 | 0 | 1 | Pd |
| 15 | 0 | 2,6-Me$_2$Ph | Me | N/A | N | N | Me | Cl | 0 | 0 | 0 | 1 | Pd |
| 16 | 0 | 2,6-Me$_2$Ph | Me | N/A | N | N | Br | Br | 0 | 0 | 0 | 1 | Pd |
| 17 | 0 | 2,6-Me$_2$Ph | Me | N/A | N | N | Cl | Cl | 0 | 0 | 0 | 1 | Pd |
| 18 | 0 | 2,6-iPr$_2$Ph | H | N/A | N | N | Me | e | 0 | 0 | 0 | 1 | Pd |
| 19 | 0 | 2,6-iPr$_2$Ph | H | N/A | N | N | Me | Me | 0 | 0 | 0 | 1 | Pd |
| 20 | 0 | 2,6-iPr$_2$Ph | H | N/A | N | N | Me | Br | 0 | 0 | 0 | 1 | Pd |
| 21 | 0 | 2,6-iPr$_2$Ph | H | N/A | N | N | Me | Cl | 0 | 0 | 0 | 1 | Pd |
| 22 | 0 | 2,6-iPr$_2$Ph | H | N/A | N | N | Br | Br | 0 | 0 | 0 | 1 | Pd |
| 23 | 0 | 2,6-iPr$_2$Ph | H | N/A | N | N | Cl | Cl | 0 | 0 | 0 | 1 | Pd |
| 24 | 0 | 2,6-iPr$_2$Ph | H | N/A | N | N | Br | Br | 0 | 0 | 0 | 1 | Ni |
| 25 | 0 | 2,6-iPr$_2$Ph | H | N/A | N | N | Cl | Cl | 0 | 0 | 0 | 1 | Ni |
| 26 | 0 | 2,6-iPr$_2$Ph | H | N/A | N | N | Me | Me | 0 | 0 | 0 | 1 | Ni |
| 27 | 0 | 2,6-iPr$_2$Ph | H | N/A | N | N | Me | Br | 0 | 0 | 0 | 1 | Ni |
| 28 | 0 | 2,6-iPr$_2$Ph | H | N/A | N | N | Me | Cl | 0 | 0 | 0 | 1 | Ni |
| 29 | 0 | 2,6-iPr$_2$Ph | An | N/A | N | N | Me | e | 0 | 0 | 0 | 1 | Pd |
| 30 | 0 | 2,6-iPr$_2$Ph | An | N/A | N | N | Me | Me | 0 | 0 | 0 | 1 | Pd |
| 31 | 0 | 2,6-iPr$_2$Ph | An | N/A | N | N | Me | Br | 0 | 0 | 0 | 1 | Pd |
| 32 | 0 | 2,6-iPr$_2$Ph | An | N/A | N | N | Me | Cl | 0 | 0 | 0 | 1 | Pd |
| 33 | 0 | 2,6-iPr$_2$Ph | An | N/A | N | N | Br | Br | 0 | 0 | 0 | 1 | Pd |
| 34 | 0 | 2,6-iPr$_2$Ph | An | N/A | N | N | Cl | Cl | 0 | 0 | 0 | 1 | Pd |
| 35 | 0 | 2,6-iPr$_2$Ph | An | N/A | N | N | Br | Br | 0 | 0 | 0 | 1 | Ni |
| 36 | 0 | 2,6-iPr$_2$Ph | An | N/A | N | N | Cl | Cl | 0 | 0 | 0 | 1 | Ni |
| 37 | 0 | 2,6-iPr$_2$Ph | An | N/A | N | N | Me | Me | 0 | 0 | 0 | 1 | Ni |
| 38 | 0 | 2,6-iPr$_2$Ph | An | N/A | N | N | Me | Br | 0 | 0 | 0 | 1 | Ni |
| 39 | 0 | 2,6-iPr$_2$Ph | An | N/A | N | N | Me | Cl | 0 | 0 | 0 | 1 | Ni |
| 40 | 0 | 2,6-Me$_2$Ph | An | N/A | N | N | Me | e | 0 | 0 | 0 | 1 | Pd |
| 41 | 0 | 2,6-Me$_2$Ph | An | N/A | N | N | Me | Me | 0 | 0 | 0 | 1 | Pd |
| 42 | 0 | 2,6-Me$_2$Ph | An | N/A | N | N | Me | Br | 0 | 0 | 0 | 1 | Pd |
| 43 | 0 | 2,6-Me$_2$Ph | An | N/A | N | N | Me | Cl | 0 | 0 | 0 | 1 | Pd |

TABLE I-continued

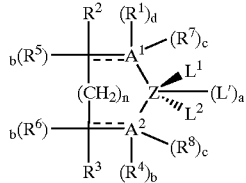

Ia

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 44 | 0 | 2,6-Me₂Ph | An | N/A | N | N | Br | Br | 0 | 0 | 0 | 1 | Pd |
| 45 | 0 | 2,6-Me₂Ph | An | N/A | N | N | Cl | Cl | 0 | 0 | 0 | 1 | Pd |
| 46 | 0 | 2,6-Me₂Ph | H | N/A | N | N | Me | e | 0 | 0 | 0 | 1 | Pd |
| 47 | 0 | 2,6-Me₂Ph | H | N/A | N | N | Me | Me | 0 | 0 | 0 | 1 | Pd |
| 48 | 0 | 2,6-Me₂Ph | H | N/A | N | N | Me | Br | 0 | 0 | 0 | 1 | Pd |
| 49 | 0 | 2,6-Me₂Ph | H | N/A | N | N | Me | Cl | 0 | 0 | 0 | 1 | Pd |
| 50 | 0 | 2,6-Me₂Ph | H | N/A | N | N | Br | Br | 0 | 0 | 0 | 1 | Pd |
| 51 | 0 | 2,6-Me₂Ph | H | N/A | N | N | Cl | Cl | 0 | 0 | 0 | 1 | Pd |
| 52 | 0 | 2,6-Me₂Ph | Me | N/A | N | N | Br | Br | 0 | 0 | 0 | 1 | Ni |
| 53 | 0 | 2,6-Me₂Ph | Me | N/A | N | N | Cl | Cl | 0 | 0 | 0 | 1 | Ni |
| 54 | 0 | 2,6-Me₂Ph | Me | N/A | N | N | Me | Me | 0 | 0 | 0 | 1 | Ni |
| 55 | 0 | 2,6-Me₂Ph | Me | N/A | N | N | Me | Br | 0 | 0 | 0 | 1 | Ni |
| 56 | 0 | 2,6-Me₂Ph | Me | N/A | N | N | Me | Cl | 0 | 0 | 0 | 1 | Ni |
| 57 | 0 | 2,4,6-Me₃Ph | Me | N/A | N | N | Me | e | 0 | 0 | 0 | 1 | Pd |
| 58 | 0 | 2,4,6-Me₃Ph | Me | N/A | N | N | Me | Me | 0 | 0 | 0 | 1 | Pd |
| 59 | 0 | 2,4,6-Me₃Ph | Me | N/A | N | N | Me | Br | 0 | 0 | 0 | 1 | Pd |
| 60 | 0 | 2,4,6-Me₃Ph | Me | N/A | N | N | Me | Cl | 0 | 0 | 0 | 1 | Pd |
| 61 | 0 | 2,4,6-Me₃Ph | Me | N/A | N | N | Br | Br | 0 | 0 | 0 | 1 | Pd |
| 62 | 0 | 2,4,6-Me₃Ph | Me | N/A | N | N | Cl | Cl | 0 | 0 | 0 | 1 | Pd |
| 63 | 0 | 2,4,6-Me₃Ph | Me | N/A | N | N | Br | Br | 0 | 0 | 0 | 1 | Ni |
| 64 | 0 | 2,4,6-Me₃Ph | Me | N/A | N | N | Cl | Cl | 0 | 0 | 0 | 1 | Ni |
| 65 | 0 | 2,4,6-Me₃Ph | Me | N/A | N | N | Me | Me | 0 | 0 | 0 | 1 | Ni |
| 66 | 0 | 2,4,6-Me₃Ph | Me | N/A | N | N | Me | Br | 0 | 0 | 0 | 1 | Ni |
| 67 | 0 | 2,4,6-Me₃Ph | Me | N/A | N | N | Me | Cl | 0 | 0 | 0 | 1 | Ni |
| 68 | 0 | 2,4,6-Me₃Ph | H | N/A | N | N | Me | e | 0 | 0 | 0 | 1 | Pd |
| 69 | 0 | 2,4,6-Me₃Ph | H | N/A | N | N | Me | Me | 0 | 0 | 0 | 1 | Pd |
| 70 | 0 | 2,4,6-Me₃Ph | H | N/A | N | N | Me | Br | 0 | 0 | 0 | 1 | Pd |
| 71 | 0 | 2,4,6-Me₃Ph | H | N/A | N | N | Me | Cl | 0 | 0 | 0 | 1 | Pd |
| 72 | 0 | 2,4,6-Me₃Ph | H | N/A | N | N | Br | Br | 0 | 0 | 0 | 1 | Pd |
| 73 | 0 | 2,4,6-Me₃Ph | H | N/A | N | N | Cl | Cl | 0 | 0 | 0 | 1 | Pd |
| 74 | 0 | 2,4,6-Me₃Ph | H | N/A | N | N | Br | Br | 0 | 0 | 0 | 1 | Ni |
| 75 | 0 | 2,4,6-Me₃Ph | H | N/A | N | N | Cl | Cl | 0 | 0 | 0 | 1 | Ni |
| 76 | 0 | 2,4,6-Me₃Ph | H | N/A | N | N | Me | Me | 0 | 0 | 0 | 1 | Ni |
| 77 | 0 | 2,4,6-Me₃Ph | H | N/A | N | N | Me | Br | 0 | 0 | 0 | 1 | Ni |
| 78 | 0 | 2,4,6-Me₃Ph | H | N/A | N | N | Me | Cl | 0 | 0 | 0 | 1 | Ni |
| 79 | 0 | 2,4,6-Me₃Ph | An | N/A | N | N | Me | e | 0 | 0 | 0 | 1 | Pd |
| 80 | 0 | 2,4,6-Me₃Ph | An | N/A | N | N | Me | Me | 0 | 0 | 0 | 1 | Pd |
| 81 | 0 | 2,4,6-Me₃Ph | An | N/A | N | N | Me | Br | 0 | 0 | 0 | 1 | Pd |
| 82 | 0 | 2,4,6-Me₃Ph | An | N/A | N | N | Me | Cl | 0 | 0 | 0 | 1 | Pd |
| 83 | 0 | 2,4,6-Me₃Ph | An | N/A | N | N | Br | Br | 0 | 0 | 0 | 1 | Pd |
| 84 | 0 | 2,4,6-Me₃Ph | An | N/A | N | N | Cl | Cl | 0 | 0 | 0 | 1 | Pd |
| 85 | 0 | 2,4,6-Me₃Ph | An | N/A | N | N | Br | Br | 0 | 0 | 0 | 1 | Ni |
| 86 | 0 | 2,4,6-Me₃Ph | An | N/A | N | N | Cl | Cl | 0 | 0 | 0 | 1 | Ni |
| 87 | 0 | 2,4,6-Me₃Ph | An | N/A | N | N | Me | Me | 0 | 0 | 0 | 1 | Ni |
| 88 | 0 | 2,4,6-Me₃Ph | An | N/A | N | N | Me | Br | 0 | 0 | 0 | 1 | Ni |
| 89 | 0 | 2,4,6-Me₃Ph | An | N/A | N | N | Me | Cl | 0 | 0 | 0 | 1 | Ni |
| 90 | 0 | Ph | j | N/A | N | N | Me | Me | 0 | 0 | 0 | 1 | Pd |
| 91 | 0 | Ph | Me | N/A | N | N | Me | Me | 0 | 0 | 0 | 1 | Pd |
| 92 | 0 | Ph | H | N/A | N | N | Me | Me | 0 | 0 | 0 | 1 | Pd |
| 93 | 0 | Ph | An | N/A | N | N | Me | Me | 0 | 0 | 0 | 1 | Pd |
| 94 | 0 | Ph | j | N/A | N | N | Me | Cl | 0 | 0 | 0 | 1 | Pd |
| 95 | 0 | Ph | Me | N/A | N | N | Me | Cl | 0 | 0 | 0 | 1 | Pd |
| 96 | 0 | Ph | H | N/A | N | N | Me | Cl | 0 | 0 | 0 | 1 | Pd |
| 97 | 0 | Ph | An | N/A | N | N | Me | Cl | 0 | 0 | 0 | 1 | Pd |
| 98 | 0 | 2-PhPh | j | N/A | N | N | Me | Me | 0 | 0 | 0 | 1 | Pd |
| 99 | 0 | 2-PhPh | Me | N/A | N | N | Me | Me | 0 | 0 | 0 | 1 | Pd |
| 100 | 0 | 2-PhPh | H | N/A | N | N | Me | Me | 0 | 0 | 0 | 1 | Pd |
| 101 | 0 | 2-PhPh | An | N/A | N | N | Me | Me | 0 | 0 | 0 | 1 | Pd |
| 102 | 0 | 2-PhPh | j | N/A | N | N | Me | Cl | 0 | 0 | 0 | 1 | Pd |
| 103 | 0 | 2-PhPh | Me | N/A | N | N | Me | Cl | 0 | 0 | 0 | 1 | Pd |
| 104 | 0 | 2-PhPh | H | N/A | N | N | Me | Cl | 0 | 0 | 0 | 1 | Pd |
| 105 | 0 | 2-PhPh | An | N/A | N | N | Me | Cl | 0 | 0 | 0 | 1 | Pd |
| 106 | 0 | 2,6-EtPh | j | N/A | N | N | Me | Me | 0 | 0 | 0 | 1 | Pd |
| 107 | 0 | 2,6-EtPh | Me | N/A | N | N | Me | Me | 0 | 0 | 0 | 1 | Pd |
| 108 | 0 | 2,6-EtPh | H | N/A | N | N | Me | Me | 0 | 0 | 0 | 1 | Pd |

TABLE I-continued

Ia $$\begin{array}{c}
R^2 \quad (R^1)_d \\
{}_b(R^5)\text{---}A^1\text{---}(R^7)_c \\
\quad\quad\quad\quad L^1 \\
(CH_2)_n\quad Z\text{---}(L')_a \\
\quad\quad\quad\quad L^2 \\
{}_b(R^6)\text{---}A^2\text{---}(R^8)_c \\
R^3 \quad (R^4)_b
\end{array}$$

| # | n | R¹/R⁴ | R²/R³ | R⁵/R⁶ | A¹ | A² | L¹ | L² | a | b | c | d | Z |
|---|---|-------|-------|-------|----|----|-----|-----|---|---|---|---|---|
| 109 | 0 | 2,6-EtPh | An | N/A | N | N | Me | Me | 0 | 0 | 0 | 1 | Pd |
| 110 | 0 | 2,6-EtPh | j | N/A | N | N | Me | Cl | 0 | 0 | 0 | 1 | Pd |
| 111 | 0 | 2,6-EtPh | Me | N/A | N | N | Me | Cl | 0 | 0 | 0 | 1 | Pd |
| 112 | 0 | 2,6-EtPh | H | N/A | N | N | Me | Cl | 0 | 0 | 0 | 1 | Pd |
| 113 | 0 | 2,6-EtPh | An | N/A | N | N | Me | Cl | 0 | 0 | 0 | 1 | Pd |
| 114 | 0 | 2-t-BuPh | j | N/A | N | N | Me | Me | 0 | 0 | 0 | 1 | Pd |
| 115 | 0 | 2-t-BuPh | Me | N/A | N | N | Me | Me | 0 | 0 | 0 | 1 | Pd |
| 116 | 0 | 2-t-BuPh | H | N/A | N | N | Me | Me | 0 | 0 | 0 | 1 | Pd |
| 117 | 0 | 2-t-BuPh | An | N/A | N | N | Me | Me | 0 | 0 | 0 | 1 | Pd |
| 118 | 0 | 2-t-BuPh | j | N/A | N | N | Me | Cl | 0 | 0 | 0 | 1 | Pd |
| 119 | 0 | 2-t-BuPh | Me | N/A | N | N | Me | Cl | 0 | 0 | 0 | 1 | Pd |
| 120 | 0 | 2-t-BuPh | H | N/A | N | N | Me | Cl | 0 | 0 | 0 | 1 | Pd |
| 121 | 0 | 2-t-BuPh | An | N/A | N | N | Me | Cl | 0 | 0 | 0 | 1 | Pd |
| 122 | 0 | 1-Np | j | N/A | N | N | Me | Me | 0 | 0 | 0 | 1 | Pd |
| 123 | 0 | 1-Np | Me | N/A | N | N | Me | Me | 0 | 0 | 0 | 1 | Pd |
| 124 | 0 | 1-Np | H | N/A | N | N | Me | Me | 0 | 0 | 0 | 1 | Pd |
| 125 | 0 | 1-Np | An | N/A | N | N | Me | Me | 0 | 0 | 0 | 1 | Pd |
| 126 | 0 | PhMe | j | N/A | N | N | Me | Cl | 0 | 0 | 0 | 1 | Pd |
| 127 | 0 | PhMe | Me | N/A | N | N | Me | Cl | 0 | 0 | 0 | 1 | Pd |
| 128 | 0 | PhMe | H | N/A | N | N | Me | Cl | 0 | 0 | 0 | 1 | Pd |
| 129 | 0 | PhMe | An | N/A | N | N | Me | Cl | 0 | 0 | 0 | 1 | Pd |
| 130 | 0 | PhMe | j | N/A | N | N | Me | Me | 0 | 0 | 0 | 1 | Pd |
| 131 | 0 | PhMe | Me | N/A | N | N | Me | Me | 0 | 0 | 0 | 1 | Pd |
| 132 | 0 | PhMe | H | N/A | N | N | Me | Me | 0 | 0 | 0 | 1 | Pd |
| 133 | 0 | PhMe | An | N/A | N | N | Me | Me | 0 | 0 | 0 | 1 | Pd |
| 134 | 0 | PhMe | j | N/A | N | N | Me | Cl | 0 | 0 | 0 | 1 | Pd |
| 135 | 0 | PhMe | Me | N/A | N | N | Me | Cl | 0 | 0 | 0 | 1 | Pd |
| 136 | 0 | PhMe | H | N/A | N | N | Me | Cl | 0 | 0 | 0 | 1 | Pd |
| 137 | 0 | PhMe | An | N/A | N | N | Me | Cl | 0 | 0 | 0 | 1 | Pd |
| 138 | 0 | Ph₂Me | j | N/A | N | N | Me | Me | 0 | 0 | 0 | 1 | Pd |
| 139 | 0 | Ph₂Me | Me | N/A | N | N | Me | Me | 0 | 0 | 0 | 1 | Pd |
| 140 | 0 | Ph₂Me | H | N/A | N | N | Me | Me | 0 | 0 | 0 | 1 | Pd |
| 141 | 0 | Ph₂Me | An | N/A | N | N | Me | Me | 0 | 0 | 0 | 1 | Pd |
| 142 | 0 | Ph₂Me | j | N/A | N | N | Me | Cl | 0 | 0 | 0 | 1 | Pd |
| 143 | 0 | Ph₂Me | Me | N/A | N | N | Me | Cl | 0 | 0 | 0 | 1 | Pd |
| 144 | 0 | Ph₂Me | H | N/A | N | N | Me | Cl | 0 | 0 | 0 | 1 | Pd |
| 145 | 0 | Ph₂Me | An | N/A | N | N | Me | Cl | 0 | 0 | 0 | 1 | Pd |
| 146 | 0 | 2,6-t-BuPh | j | N/A | N | N | Me | Me | 0 | 0 | 0 | 1 | Pd |
| 147 | 0 | 2,6-t-BuPh | Me | N/A | N | N | Me | Me | 0 | 0 | 0 | 1 | Pd |
| 148 | 0 | 2,6-t-BuPh | H | N/A | N | N | Me | Me | 0 | 0 | 0 | 1 | Pd |
| 149 | 0 | 2,6-t-BuPh | An | N/A | N | N | Me | Me | 0 | 0 | 0 | 1 | Pd |
| 150 | 0 | 2,6-t-BuPh | j | N/A | N | N | Me | Cl | 0 | 0 | 0 | 1 | Pd |
| 151 | 0 | 2,6-t-BuPh | Me | N/A | N | N | Me | Cl | 0 | 0 | 0 | 1 | Pd |
| 152 | 0 | 2,6-t-BuPh | H | N/A | N | N | Me | Cl | 0 | 0 | 0 | 1 | Pd |
| 153 | 0 | 2,6-t-BuPh | An | N/A | N | N | Me | Cl | 0 | 0 | 0 | 1 | Pd |
| 154 | 0 | 2,6-t-BuPh | H | N/A | N | N | Br | Br | 0 | 0 | 0 | 1 | Ni |
| 155 | 0 | 2,6-t-Bu₂Ph | Me | N/A | N | N | Br | Br | 0 | 0 | 0 | 1 | Ni |
| 156 | 0 | 2,6-t-Bu₂Ph | An | N/A | N | N | Br | Br | 0 | 0 | 0 | 1 | Ni |
| 157 | 0 | 2,6-t-Bu₂Ph | H | N/A | N | N | Br | Br | 0 | 0 | 0 | 1 | Ni |
| 158 | 0 | 2,6-t-Bu₂Ph | Me | N/A | N | N | Br | Br | 0 | 0 | 0 | 1 | Ni |
| 159 | 0 | 2-6-t-Bu₂Ph | An | N/A | N | N | Br | Br | 0 | 0 | 0 | 1 | Ni |
| 160 | 0 | Ph | H | N/A | N | N | Br | Br | 0 | 0 | 0 | 1 | Ni |
| 161 | 0 | Ph | Me | N/A | N | N | Br | Br | 0 | 0 | 0 | 1 | Ni |
| 162 | 0 | Ph | An | N/A | N | N | Br | Br | 0 | 0 | 0 | 1 | Ni |
| 163 | 0 | 2-PhPh | H | N/A | N | N | Br | Br | 0 | 0 | 0 | 1 | Ni |
| 164 | 0 | 2-PhPh | Me | N/A | N | N | Br | Br | 0 | 0 | 0 | 1 | Ni |
| 165 | 0 | 2-PhPh | An | N/A | N | N | Br | Br | 0 | 0 | 0 | 1 | Ni |
| 166 | 0 | 2-iPr-6-MePh | H | N/A | N | N | Br | Br | 0 | 0 | 0 | 1 | Ni |
| 167 | 0 | 2-iPr-6-MePh | Me | N/A | N | N | Br | Br | 0 | 0 | 0 | 1 | Ni |
| 168 | 0 | 2-iPr-6-MePh | An | N/A | N | N | Br | Br | 0 | 0 | 0 | 1 | Ni |
| 169 | 0 | 2,5-t-BuPh | H | N/A | N | N | Br | Br | 0 | 0 | 0 | 1 | Ni |
| 170 | 0 | 2,5-t-BuPh | Me | N/A | N | N | Br | Br | 0 | 0 | 0 | 1 | Ni |
| 171 | 0 | 2,5-t-BuPh | An | N/A | N | N | Br | Br | 0 | 0 | 0 | 1 | Ni |
| 172 | 0 | 2,6-EtPh | H | N/A | N | N | Br | Br | 0 | 0 | 0 | 1 | Ni |
| 173 | 0 | 2,6-EtPh | Me | N/A | N | N | Br | Br | 0 | 0 | 0 | 1 | Ni |

TABLE I-continued

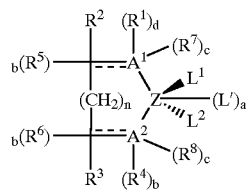

Ia

| # | n | $R^1/R^4$ | $R^2/R^3$ | $R^5/R^6$ | $A^1$ | $A^2$ | $L^1$ | $L^2$ | a | b | c | d | Z |
|---|---|---|---|---|---|---|---|---|---|---|---|---|---|
| 174 | 0 | 2,6-EtPh | An | N/A | N | N | Br | Br | 0 | 0 | 0 | 1 | Ni |
| 175 | 0 | 1-Np | H | N/A | N | N | Br | Br | 0 | 0 | 0 | 1 | Ni |
| 176 | 0 | 1-Np | Me | N/A | N | N | Br | Br | 0 | 0 | 0 | 1 | Ni |
| 177 | 0 | 1-Np | An | N/A | N | N | Br | Br | 0 | 0 | 0 | 1 | Ni |
| 178 | 0 | Ph | Ph | N/A | N | N | Br | Br | 0 | 0 | 0 | 1 | Ni |
| 179 | 0 | 2,4,6-Me$_3$Ph | H | N/A | N | N | Br | Br | 0 | 0 | 0 | 1 | Ni |
| 180 | 0 | 2,4,6-Me$_3$Ph | Me | N/A | N | N | Br | Br | 0 | 0 | 0 | 1 | Ni |
| 181 | 0 | 2,4,6-Me$_3$Ph | An | N/A | N | N | Br | Br | 0 | 0 | 0 | 1 | Ni |
| 182 | 0 | 2,4,6-Me$_3$Ph | Ph | N/A | N | N | Br | Br | 0 | 0 | 0 | 1 | Ni |
| 183 | 1 | 2,6-Pr$_2$Pr | H | H | N | N | Cl | Cl | 0 | 0 | 0 | 1 | SY |
| 184 | 2 | 2,6-Pr$_2$Pr | H | H | N | N | Cl | Cl | 0 | 0 | 0 | 1 | SY |
| 185 | 3 | 2,6-Pr$_2$Pr | H | H | N | N | Cl | Cl | 0 | 0 | 0 | 1 | SY |
| 186 | 1 | 2,6-Pr$_2$Pr | Me | Me | N | N | Cl | Cl | 0 | 0 | 0 | 1 | SY |
| 187 | 2 | 2,6-Pr$_2$Pr | Me | Me | N | N | Cl | Cl | 0 | 0 | 0 | 1 | SY |
| 188 | 3 | 2,6-Pr$_2$Pr | Me | Me | N | N | Cl | Cl | 0 | 0 | 0 | 1 | SY |
| 189 | 1 | 2,6-Me$_2$Ph | H | H | N | N | Cl | Cl | 0 | 0 | 0 | 1 | SY |
| 190 | 2 | 2,6-Me$_2$Ph | H | H | N | N | Cl | Cl | 0 | 0 | 0 | 1 | SY |
| 191 | 3 | 2,6-Me$_2$Ph | H | H | N | N | Cl | Cl | 0 | 0 | 0 | 1 | SY |
| 192 | 1 | 2,6-Me$_2$Ph | Me | Me | N | N | Cl | Cl | 0 | 0 | 0 | 1 | SY |
| 193 | 2 | 2,6-Me$_2$Ph | Me | Me | N | N | Cl | Cl | 0 | 0 | 0 | 1 | SY |
| 194 | 3 | 2,6-Me$_2$Ph | Me | Me | N | N | Cl | Cl | 0 | 0 | 0 | 1 | SY |
| 195 | 1 | 2,4,6-Me$_3$Ph | H | H | N | N | Cl | Cl | 0 | 0 | 0 | 1 | SY |
| 196 | 2 | 2,4,6-Me$_3$Ph | H | H | N | N | Cl | Cl | 0 | 0 | 0 | 1 | SY |
| 197 | 3 | 2,4,6-Me$_3$Ph | H | H | N | N | Cl | Cl | 0 | 0 | 0 | 1 | SY |
| 198 | 1 | 2,4,6-Me$_3$Ph | Me | Me | N | N | Cl | Cl | 0 | 0 | 0 | 1 | SY |
| 199 | 2 | 2,4,6-Me$_3$Ph | Me | Me | N | N | Cl | Cl | 0 | 0 | 0 | 1 | SY |
| 200 | 3 | 2,4,6-Me$_3$Ph | Me | Me | N | N | Cl | Cl | 0 | 0 | 0 | 1 | SY |
| *201 | 1 | 2,6-iPr$_2$Ph | H | H | N | N | Cl | Cl | 1 | 0 | 0 | 1 | CMW |
| 202 | 2 | 2,6-iPr$_2$Ph | H | H | N | N | Cl | Cl | 1 | 0 | 0 | 1 | CMW |
| 203 | 3 | 2,6-iPr$_2$Ph | H | H | N | N | Cl | Cl | 1 | 0 | 0 | 1 | CMW |
| 204 | 1 | 2,6-iPrPh | Me | Me | N | N | Cl | Cl | 1 | 0 | 0 | 1 | CMW |
| 205 | 2 | 2,6-iPrPh | Me | Me | N | N | Cl | Cl | 1 | 0 | 0 | 1 | CMW |
| 206 | 3 | 2,6-iPrPh | Me | Me | N | N | Cl | Cl | 1 | 0 | 0 | 1 | CMW |
| 207 | 1 | 2,6-Me$_2$Ph | H | H | N | N | Cl | Cl | 1 | 0 | 0 | 1 | CMW |
| 208 | 2 | 2,6,Me$_2$Ph | H | H | N | N | Cl | Cl | 1 | 0 | 0 | 1 | CMW |
| 209 | 3 | 2,6,Me$_2$Ph | H | H | N | N | Cl | Cl | 1 | 0 | 0 | 1 | CMW |
| 210 | 1 | 2,6,Me$_2$Ph | Me | Me | N | N | Cl | Cl | 1 | 0 | 0 | 1 | CMW |
| 211 | 2 | 2,6,Me$_2$Ph | Me | Me | N | N | Cl | Cl | 1 | 0 | 0 | 1 | CMW |
| 212 | 3 | 2,6,Me$_2$Ph | Me | Me | N | N | Cl | Cl | 1 | 0 | 0 | 1 | CMW |
| 213 | 1 | 2,4,6-Me$_3$Ph | H | H | N | N | Cl | Cl | 1 | 0 | 0 | 1 | CMW |
| 214 | 2 | 2,4,6-Me$_3$Ph | H | H | N | N | Cl | Cl | 1 | 0 | 0 | 1 | CMW |
| 215 | 3 | 2,4,6-Me$_3$Ph | H | H | N | N | Cl | Cl | 1 | 0 | 0 | 1 | CMW |
| 216 | 1 | 2,4,6-Me$_3$Ph | Me | Me | N | N | Cl | Cl | 1 | 0 | 0 | 1 | CMW |
| 217 | 2 | 2,4,6-Me$_3$Ph | Me | Me | N | N | Cl | Cl | 1 | 0 | 0 | 1 | CMW |
| 218 | 3 | 2,4,6-Me$_3$Ph | Me | Me | N | N | Cl | Cl | 1 | 0 | 0 | 1 | CMW |
| 219 | 1 | 2,6 iPr$_2$Ph | H | H | N | N | Cl | Cl | 1 | 0 | 0 | 1 | TZH |
| 220 | 2 | 2,6 iPr$_2$Ph | H | H | N | N | Cl | Cl | 1 | 0 | 0 | 1 | TZH |
| 221 | 3 | 2,6 iPr$_2$Ph | H | H | N | N | Cl | Cl | 1 | 0 | 0 | 1 | TZH |
| 222 | 1 | 2,6 iPr$_2$Ph | Me | Me | N | N | Cl | Cl | 1 | 0 | 0 | 1 | TZH |
| 223 | 2 | 2,6 iPr$_2$Ph | Me | Me | N | N | Cl | Cl | 1 | 0 | 0 | 1 | TZH |
| 224 | 3 | 2,6 iPr$_2$Ph | Me | Me | N | N | Cl | Cl | 1 | 0 | 0 | 1 | TZH |
| 225 | 1 | 2,6-Me$_2$Ph | H | H | N | N | Cl | Cl | 1 | 0 | 0 | 1 | TZH |
| 226 | 2 | 2,6-Me$_2$Ph | H | H | N | N | Cl | Cl | 1 | 0 | 0 | 1 | TZH |
| 227 | 3 | 2,6-Me$_2$Ph | H | H | N | N | Cl | Cl | 1 | 0 | 0 | 1 | TZH |
| 228 | 1 | 2,6-Me$_2$Ph | Me | Me | N | N | Ci | Cl | 1 | 0 | 0 | 1 | TZH |
| 229 | 2 | 2,6-Me$_2$Ph | Me | Me | N | N | Cl | Cl | 1 | 0 | 0 | 1 | TZH |
| 230 | 3 | 2,6-Me$_2$Ph | Me | Me | N | N | Cl | Cl | 1 | 0 | 0 | 1 | TZH |
| 231 | 1 | 2,4,6-Me$_3$Ph | H | H | N | N | Cl | Cl | 1 | 0 | 0 | 1 | TZH |
| 232 | 2 | 2,4,6-Me$_3$Ph | H | H | N | N | Cl | Cl | 1 | 0 | 0 | 1 | TZH |
| 233 | 3 | 2,4,6-Me$_3$Ph | H | H | N | N | Cl | Cl | 1 | 0 | 0 | 1 | TZH |
| 234 | 1 | 2,4,6-Me$_3$Ph | Me | Me | N | N | Cl | Cl | 1 | 0 | 0 | 1 | TZH |
| 235 | 2 | 2,4,6-Me$_3$Ph | Me | Me | N | N | Cl | Cl | 1 | 0 | 0 | 1 | TZH |
| 236 | 3 | 2,4,6-Me$_3$Ph | Me | Me | N | N | Cl | Cl | 1 | 0 | 0 | 1 | TZH |

TABLE I-continued

Ia

| # | n | $R^1/R^4$ | $R^2/R^3$ | $R^5/R^6$ | $A^1$ | $A^2$ | $L^1$ | $L^2$ | a | b | c | d | Z |
|---|---|-----------|-----------|-----------|-------|-------|-------|-------|---|---|---|---|---| e = the group $(CH_2)_3CO_2Me$
*L' is Cl for #'s 201 to 236

Note—In Table I, above, the following convention and abbreviations are used. For $R^1$ and $R^4$, when a substituted phenyl ring is present, the amount of substitution is indicated by the number of numbers indicating positions on the phenyl ring, as, for example, 2,6-iPr$_2$Ph represents 2,6-diisopropyl phenyl; iPr=isopropyl; Pr=propyl; Me=methyl; Et=ethyl; t-Bu=tert-butyl; Ph=phenyl; Np=naphthyl; An=1,8-naphthalene; j is the group —C(Me)$_2$—CH$_2$—C(Me)$_2$—; and e is the group (CH$_2$)$_3$CO$_2$Me-, SY=Sc or Y; CMW=Cr, Mo or W; TZH=Ti, Zr, or Hf and N/A=not applicable.

The typical tridentate pre-catalyst compounds may, for example, be represented by the formula:

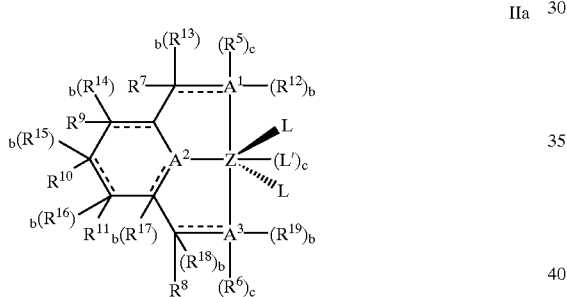

IIa wherein:
- $R^5$ and $R^6$ are each independently selected from hydrogen, or an unsubstituted or substituted aryl group wherein said substitution is an alkyl or a functional hetero group which is inert with respect to the contemplated polymerization;
- $R^7$ and $R^8$ are each independently selected from hydrogen, an unsubstituted or substituted $C_1$–$C_{20}$ (preferably $C_1$–$C_6$) hydrocarbyl as, for example, alkyl (methyl, ethyl, propyl, pentyl and the like); aryl (phenyl, toluyl and the like) or a functional group which is inert with respect to the polymerization (e.g., nitro, halo and the like);
- $R^9$ to $R^{19}$ are each independently selected from hydrogen, an unsubstituted or substituted $C_1$–$C_{20}$ hydrocarbyl or an inert functional group, all as described above for $R^7$;
- a, b and c are each independently 0 or 1 and represent whether their associated R group is present or not;
- Z is a transition metal as defined above, preferably Fe(II), Co(II) or Fe(III);
- each $A^1$ to $A^3$ is independently selected as defined in connection with A of Formula I;
- and each L and L' is independently selected from a halogen such as chlorine, bromine, iodine or a $C_1$–$C_8$ (preferably $C_1$–$C_5$) alkyl, or any two L groups, together in combination, represent an unsubstituted or substituted, saturated or unsaturated, hydrocarbylene group which together with Z forms a cyclic group, preferably a 3 to 7, most preferably 3 to 5 member ring cyclic group.

Preferred compounds of II(a) are those wherein each $R^9$, $R^{10}$ and $R^{11}$ are hydrogen; b is 0, c is 1, and $R^7$ and $R^8$ are each independently selected from halogen, hydrogen or a $C_1$–$C_6$ alkyl, preferably each is independently selected from methyl or hydrogen; and wherein $R^5$ and $R^6$ of IIa are each an aryl or substituted aryl group, preferably wherein the aryl contains substitution in the 2 position, the 2,6 positions or the 2,4,6 positions which is selected from a $C_1$–$C_6$ (most preferably $C_1$–$C_3$) alkyl and the remaining positions are each independently selected from hydrogen (most preferred), halogen or a $C_1$–$C_6$ (preferably $C_1$–$C_3$) alkyl.

Illustrative examples of tridentate pre-catalyst compounds which are useful in providing the catalyst composition of the present invention are compounds of Formula IIa having the following combination of groups shown in Table II below:

TABLE II

IIa

| # | R5/R6 | R7/R8 | R9 | R10 | R11 | A1 | A2 | A3 | a | b | c | L | L' | Z |
|---|---|---|---|---|---|---|---|---|---|---|---|---|---|---|
| 1 | 2,6-di-iPrPh | Me | H | H | H | N | N | N | 0 | 0 | 1 | * | NA | Fe |
| 2 | 2,6-di-iPrPh | Me | H | H | H | N | N | N | 0 | 0 | 1 | * | NA | Fe |
| 3 | 2-t-BuPh | Me | H | H | H | N | N | N | 0 | 0 | 1 | * | NA | Fe |
| 4 | Ph | Me | H | H | H | N | N | N | 0 | 0 | 1 | * | NA | Fe |
| 5 | 2,6-di-iPrPh | Me | H | Me | H | N | N | N | 0 | 0 | 1 | * | NA | Fe |
| 6 | 2,6-di-iPrPh | Me | H | Me | H | N | N | N | 0 | 0 | 1 | * | NA | Fe |
| 7 | 2-t-BuPh | Me | H | Me | H | N | N | N | 0 | 0 | 1 | * | NA | Fe |
| 8 | Ph | Me | H | Me | H | N | N | N | 0 | 0 | 1 | * | NA | Fe |
| 9 | 2,6-di-iPrPh | Me | Me | Me | Me | N | N | N | 0 | 0 | 1 | * | NA | Fe |
| 10 | 2,6-di-iPrPh | Me | Me | Me | Me | N | N | N | 0 | 0 | 1 | * | NA | Fe |
| 11 | 2-t-BuPh | Me | Me | Me | Me | N | N | N | 0 | 0 | 1 | * | NA | Fe |
| 12 | Ph | Me | Me | Me | Me | N | N | N | 0 | 0 | 1 | * | NA | Fe |
| 13 | 2,4,6-Me3Ph | Me | H | H | H | N | N | N | 0 | 0 | 1 | * | NA | Fe |
| 14 | 2,3,4,5,6-Me5Ph | Me | H | H | H | N | N | N | 0 | 0 | 1 | * | NA | Fe |
| 15 | (2-t-BuMe2Sil)Bz | Me | H | H | H | N | N | N | 0 | 0 | 1 | * | NA | Fe |
| 16 | (2-Me3Sil)Bz | Me | H | H | H | N | N | N | 0 | 0 | 1 | * | NA | Fe |
| 17 | (2-PhMe2Sil)Bz | Me | H | H | H | N | N | N | 0 | 0 | 1 | * | NA | Fe |
| 18 | (2-PhMeSil)Bz | Me | H | H | H | N | N | N | 0 | 0 | 1 | * | NA | Fe |
| 19 | (2-Me2Sil)Bz | Me | H | H | H | N | N | N | 0 | 0 | 1 | * | NA | Fe |
| 20 | 2,6-di-iPrPh | Me | H | H | H | N | N | N | 0 | 0 | 1 | * | NA | Co |
| 21 | 2,6-di-iPrPh | Me | H | H | H | N | N | N | 0 | 0 | 1 | * | NA | Co |
| 22 | 2-t-BuPh | Me | H | H | H | N | N | N | 0 | 0 | 1 | * | NA | Co |
| 23 | Ph | Me | H | H | H | N | N | N | 0 | 0 | 1 | * | NA | Co |
| 24 | 2,6-di-iPrPh | Me | H | Me | H | N | N | N | 0 | 0 | 1 | * | NA | Co |
| 25 | 2,6-di-iPrPh | Me | H | Me | H | N | N | N | 0 | 0 | 1 | * | NA | Co |
| 26 | 2-t-BuPh | Me | H | Me | H | N | N | N | 0 | 0 | 1 | * | NA | Co |
| 27 | Ph | Me | H | Me | H | N | N | N | 0 | 0 | 1 | * | NA | Co |
| 28 | 2,6-di-iPrPh | Me | Me | Me | Me | N | N | N | 0 | 0 | 1 | * | NA | Co |
| 29 | 2,6-di-iPrPh | Me | Me | Me | Me | N | N | N | 0 | 0 | 1 | * | NA | Co |
| 30 | 2-t-BuPh | Me | Me | Me | Me | N | N | N | 0 | 0 | 1 | * | NA | Co |
| 31 | Ph | Me | Me | Me | Me | N | N | N | 0 | 0 | 1 | * | NA | Co |
| 32 | 2,4,6-(Me)3Ph | Me | H | H | H | N | N | N | 0 | 0 | 1 | * | NA | Co |
| 33 | 2,3,4,5,6-(Me)5Ph | Me | H | H | H | N | N | N | 0 | 0 | 1 | * | NA | Co |
| 34 | (2-t-BuMe2Sil)Bz | Me | H | H | H | N | N | N | 0 | 0 | 1 | * | NA | Co |
| 35 | 2-MePh | Me | H | H | H | N | N | N | 0 | 0 | 1 | * | NA | Fe |
| 36 | (2-Me3Sil)Bz | Me | H | H | H | N | N | N | 0 | 0 | 1 | * | NA | Co |
| 37 | (2-PhMe2Sil)Bz | Me | H | H | H | N | N | N | 0 | 0 | 1 | * | NA | Co |
| 38 | (2-PhMeSil)Bz | Me | H | H | H | N | N | N | 0 | 0 | 1 | * | NA | Co |
| 39 | (2-Me3Sil)Bz | Me | H | H | H | N | N | N | 0 | 0 | 1 | * | NA | Co |
| 40 | NA | Me | H | H | H | O | N | | 0 | 0 | 0 | * | NA | Fe |
| 41 | NA | Me | H | Me | H | O | N | | 0 | 0 | 0 | * | NA | Fe |
| 42 | NA | i-Pr | H | H | H | O | N | | 0 | 0 | 0 | * | NA | Fe |
| 43 | NA | i-Pr | H | Me | H | O | N | | 0 | 0 | 0 | * | NA | Fe |
| 44 | NA | i-Pr | Me | Me | Me | O | N | | 0 | 0 | 0 | * | NA | Fe |
| 45 | NA | Ph | H | H | H | O | N | | 0 | 0 | 0 | * | NA | Fe |
| 46 | NA | Ph | H | Me | H | O | N | | 0 | 0 | 0 | * | NA | Fe |
| 47 | NA | Me | H | H | H | O | N | | 0 | 0 | 0 | * | NA | Co |
| 48 | NA | Me | H | Me | H | O | N | | 0 | 0 | 0 | * | NA | Co |
| 49 | NA | i-Pr | H | H | H | O | N | | 0 | 0 | 0 | * | NA | Co |
| 50 | NA | i-Pr | H | Me | H | O | N | | 0 | 0 | 0 | * | NA | Co |
| 51 | NA | i-Pr | Me | Me | Me | O | N | | 0 | 0 | 0 | * | NA | Co |
| 52 | NA | Ph | H | H | H | O | N | | 0 | 0 | 0 | * | NA | Co |
| 53 | NA | Ph | H | Me | H | O | N | | 0 | 0 | 0 | * | NA | Co |
| 54 | 2,6-iPr2Ph | Me | H | F | H | N | N | N | 1 | 0 | 1 | Cl | Cl | VNT |
| 55 | 2,6-iPr2Ph | Me | H | Cl | H | N | N | N | 1 | 0 | 1 | Cl | Cl | VNT |
| 56 | 2,6-iPr2Ph | Me | H | Br | H | N | N | N | 1 | 0 | 1 | Cl | Cl | VNT |
| 57 | 2,6-iPr2Ph | Me | H | I | H | N | N | N | 1 | 0 | 1 | Cl | Cl | VNT |
| 58 | 2,6-iPr2Ph | Me | H | H | H | N | N | N | 1 | 0 | 1 | Cl | Cl | VNT |
| 59 | 2,6-iPr2Ph | Me | H | H | H | N | N | N | 1 | 0 | 1 | Cl | Cl | VNT |
| 60 | 2,6-iPr2Ph | H | H | F | H | N | N | N | 1 | 0 | 1 | Cl | Cl | VNT |
| 61 | 2,6-iPr2Ph | H | H | Cl | H | N | N | N | 1 | 0 | 1 | Cl | Cl | VNT |
| 62 | 2,6-iPr2Ph | H | H | Br | H | N | N | N | 1 | 0 | 1 | Cl | Cl | VNT |

TABLE II-continued

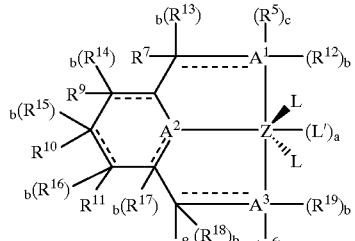

IIa

| # | $R^5/R^6$ | $R^7/R^8$ | $R^9$ | $R^{10}$ | $R^{11}$ | $A^1$ | $A^2$ | $A^3$ | a | b | c | L | L' | Z |
|---|---|---|---|---|---|---|---|---|---|---|---|---|---|---|
| 63 | 2,6-iPr$_2$Ph | H | H | I | H | N | N | N | 1 | 0 | 1 | Cl | Cl | VNT |
| 64 | 2,6-Me$_2$Ph | Me | H | H | H | N | N | N | 1 | 0 | 1 | Cl | Cl | VNT |
| 65 | 2,6-Me$_2$Ph | Me | H | F | H | N | N | N | 1 | 0 | 1 | Cl | Cl | VNT |
| 66 | 2,6-Me$_2$Ph | Me | H | Cl | H | N | N | N | 1 | 0 | 1 | Cl | Cl | VNT |
| 67 | 2,6-Me$_2$Ph | Me | H | B | H | N | N | N | 1 | 0 | 1 | Cl | Cl | VNT |
| 68 | 2,6-Me$_2$Ph | Me | H | I | H | N | N | N | 1 | 0 | 1 | Cl | Cl | VNT |
| 69 | 2,6-Me$_2$Ph | H | H | H | H | N | N | N | 1 | 0 | 1 | Cl | Cl | VNT |
| 70 | 2,6-Me$_2$Ph | H | H | F | H | N | N | N | 1 | 0 | 1 | Cl | Cl | VNT |
| 71 | 2,6-Me$_2$Ph | H | H | Cl | H | N | N | N | 1 | 0 | 1 | Cl | Cl | VNT |
| 72 | 2,6-Me$_2$Ph | H | H | Br | H | N | N | N | 1 | 0 | 1 | Cl | Cl | VNT |
| 73 | 2,6-Me$_2$Ph | H | H | I | H | N | N | N | 1 | 0 | 1 | Cl | Cl | VNT |
| 74 | 2,4,6-Me$_3$Ph | Me | H | H | H | N | N | N | 1 | 0 | 1 | Cl | Cl | VNT |
| 75 | 2,4,6-Me$_3$Ph | Me | H | F | H | N | N | N | 1 | 0 | 1 | Cl | Cl | VNT |
| 76 | 2,4,6-Me$_3$Ph | Me | H | Cl | H | N | N | N | 1 | 0 | 1 | Cl | Cl | VNT |
| 77 | 2,4,6-Me$_3$Ph | Me | H | Br | H | N | N | N | 1 | 0 | 1 | Cl | Cl | VNT |
| 78 | 2,4,6-Me$_3$Ph | H | H | I | H | N | N | N | 1 | 0 | 1 | Cl | Cl | VNT |
| 79 | 2,4,6-Me$_3$Ph | H | H | H | H | N | N | N | 1 | 0 | 1 | Cl | Cl | VNT |
| 80 | 2,4,6-Me$_3$Ph | H | H | F | H | N | N | N | 1 | 0 | 1 | Cl | Cl | VNT |
| 81 | 2,4,6-Me$_3$Ph | H | H | Cl | H | N | N | N | 1 | 0 | 1 | Cl | Cl | VNT |
| 82 | 2,4,6-Me$_3$Ph | H | H | Br | H | N | N | N | 1 | 0 | 1 | Cl | Cl | VNT |
| 83 | 2,4,6-Me$_3$Ph | H | H | I | H | N | N | N | 1 | 0 | 1 | Cl | Cl | VNT |
| 84 | 2,6-iPr$_2$Ph | H | H | H | H | N | N | N | 1 | 0 | 1 | Cl | Cl | MTR |
| 85 | 2,6-iPr$_2$Ph | H | H | F | H | N | N | N | 1 | 0 | 1 | Cl | Cl | MTR |
| 86 | 2,6-iPr$_2$Ph | H | H | Cl | H | N | N | N | 1 | 0 | 1 | Cl | Cl | MTR |
| 87 | 2,6-iPr$_2$Ph | H | H | B | H | N | N | N | 1 | 0 | 1 | Cl | Cl | MTR |
| 88 | 2,6-iPr$_2$Ph | H | H | I | H | N | N | N | 1 | 0 | 1 | Cl | Cl | MTR |
| 89 | 2,6-iPr$_2$Ph | Me | H | H | H | N | N | N | 1 | 0 | 1 | Cl | Cl | MTR |
| 90 | 2,6-iPr$_2$Ph | Me | H | F | H | N | N | N | 1 | 0 | 1 | Cl | Cl | MTR |
| 91 | 2,6-iPr$_2$Ph | Me | H | Cl | H | N | N | N | 1 | 0 | 1 | Cl | Cl | MTR |
| 92 | 2,6-iPr$_2$Ph | Me | H | Br | H | N | N | N | 1 | 0 | 1 | Cl | Cl | MTR |
| 93 | 2,6-iPr$_2$Ph | Me | H | I | H | N | N | N | 1 | 0 | 1 | Cl | Cl | MTR |
| 94 | 2,6-Me$_2$Ph | H | H | H | H | N | N | N | 1 | 0 | 1 | Cl | Cl | MTR |
| 95 | 2,6-Me$_2$Ph | H | H | F | H | N | N | N | 1 | 0 | 1 | Cl | Cl | MTR |
| 96 | 2,6-Me$_2$Ph | H | H | Cl | H | N | N | N | 1 | 0 | 1 | Cl | Cl | MTR |
| 97 | 2,6-Me$_2$Ph | H | H | B | H | N | N | N | 1 | 0 | 1 | Cl | Cl | MTR |
| 98 | 2,6-Me$_2$Ph | H | H | I | H | N | N | N | 1 | 0 | 1 | Cl | Cl | MTR |
| 99 | 2,6-Me$_2$Ph | Me | H | H | H | N | N | N | 1 | 0 | 1 | Cl | Cl | MTR |
| 100 | 2,6-Me$_2$Ph | Me | H | F | H | N | N | N | 1 | 0 | 1 | Cl | Cl | MTR |
| 101 | 2,6-Me$_2$Ph | Me | H | Cl | H | N | N | N | 1 | 0 | 1 | Cl | Cl | MTR |
| 102 | 2,6-Me$_2$Ph | Me | H | Br | H | N | N | N | 1 | 0 | 1 | Cl | Cl | MTR |
| 103 | 2,6-Me$_2$Ph | Me | H | I | H | N | N | N | 1 | 0 | 1 | Cl | Cl | MTR |
| 104 | 2,4,6-Me$_3$Ph | H | H | H | H | N | N | N | 1 | 0 | 1 | Cl | Cl | MTR |
| 105 | 2,4,6-Me$_3$Ph | H | H | F | H | N | N | N | 1 | 0 | 1 | Cl | Cl | MTR |
| 106 | 2,4,6-Me$_3$Ph | H | H | Cl | H | N | N | N | 1 | 0 | 1 | Cl | Cl | MTR |
| 107 | 2,4,6-Me$_3$Ph | H | H | B | H | N | N | N | 1 | 0 | 1 | Cl | Cl | MTR |
| 108 | 2,4,6-Me$_3$Ph | H | H | I | H | N | N | N | 1 | 0 | 1 | Cl | Cl | MTR |
| 109 | 2,4,6-Me$_3$Ph | Me | H | H | H | N | N | N | 1 | 0 | 1 | Cl | Cl | MTR |
| 110 | 2,4,6-Me$_3$Ph | Me | H | F | H | N | N | N | 1 | 0 | 1 | Cl | Cl | MTR |
| 111 | 2,4,6-Me$_3$Ph | Me | H | Cl | H | N | N | N | 1 | 0 | 1 | Cl | Cl | MTR |
| 112 | 2,4,6-Me$_3$Ph | Me | H | Br | H | N | N | N | 1 | 0 | 1 | Cl | Cl | MTR |
| 113 | 2,4,6-Me$_3$Ph | Me | H | I | H | N | N | N | 1 | 0 | 1 | Cl | Cl | MTR |

NA = Not Applicable
VNT = V, Nb, or Ta
MTR = Mn, Tc, or Re

The asterisk (*) in Table II above represents both anionic ligand groups (L) of the above preferred tridentate compounds II(a) and for each of the above compounds both L groups are, respectively, chlorine; bromine; methyl (—CH$_3$); ethyl (—C$_2$H$_5$); propyl (—C$_3$H$_5$, each of the isomers); butyl (—C$_4$H$_9$, each of the isomers); dimethylamine; 1,3-butadiene-1,4 diyl; 1,4-pentadiene-1,5 diyl; C$_4$ alkylene; and C$_5$ alkylene. Also in Table II B$_z$=benzyl; Sil=siloxyl; iPrPh=isopropylphenyl; t-Bu=tert-butyl; Me$_2$= dimethyl, Me$_3$=trimethyl, etc.

It will be understood that the identity of L will determine the nature of the process steps needed to form the ultimate catalyst composition which is believed to exist, during polymerization, as an activated pair of a cation, or cation like (referred to herein collectively as Cationic) component and an anion or anion like (referred to herein collectively as Anionic) component. The Cationic component is the pre-catalyst which has undergone activation typically by imparting a full or partial positive charge to the metal center Z and the Anionic component is a full or partial negatively charged component derived from the support-activator and is believed to be in close proximity to, and provides charge balance for, the activated metal center Z under conventional polymerization reaction conditions while remaining labile. The term "labile" is used herein to mean that under polymerization conditions, the anionic component is only loosely associated at the site of the catalyst activity so as to permit displacement by a polymerizable monomer at the point of monomer addition.

Thus, the manner in which the pre-catalyst is activated typically depends on the identity of L.

From a generic standpoint, activation of pre-catalyst is believed to result from removal of at least one L group from the metal center in a manner sufficient to generate an open coordination site at said metal center.

A variety of mechanisms and materials are known or possible for accomplishing activation. Depending on the identity of L and the support-activator, such mechanisms may be induced in 1 or 2 stages (relative to a designated molecule). Activation in a single stage typically involves separately synthesizing a pre-catalyst that can be activated directly by the support-activator (e.g., wherein L is initially selected as hydrocarbyl in the synthesis of the pre-catalyst). Activation in 2 stages typically involves a pre-activation first stage wherein at least one electronic withdrawing L group (e.g. Cl) is replaced with at least one less electronic withdrawing L group (e.g., alkyl) which is more easily displaced in the second stage by the support-activator to cause activation at the metal center Z. Accordingly, pre-activation can be induced via known alkylation reactions with organometallic compounds, such as organolithium or preferably organoaluminum hydrides or alkyls. Pre-activation permits one to use the support-activator in all instances for activation and eliminate use of expensive methylalumoxane or ionizing agents such as boron containing activators (or co-catalysts).

Thus, while activation mechanisms by which conventional coordination catalyst systems operate include, but are not limited to (a) abstraction of at least one L group by a Lewis acid by an abstracting moiety such as carbonium, tropylium, carbenium, ferrocenium and mixtures, and (b) protonation (by a Bronstead acid) of the L group, when L constitutes a hydride or hydrocarbyl (e.g. alkyl) group, such mechanisms typically require materials additional to the support for implementation. The same is not true for the present invention.

It is a particular advantage of the present invention that such conventional ionizing agents used to produce ionic catalysts can be eliminated and replaced with the support-activator of the present invention which performs the dual function of activation and supporting agent.

From a practical standpoint, it is preferred that L be halogen, e.g., Cl, in the pre-catalyst. This stems from the fact that when L is halogen (highly electron withdrawing) the pre-catalyst is very stable and can be easily transported. However, because L in this instance is highly electron withdrawing, it may be more difficult to induce activation thereof by the support-activator. Thus, as indicated above, it is possible to pre-activate the pre-catalyst, by replacement of the halogens constituting L with less electron withdrawing groups such as hydrocarbyl groups, e.g., alkyl groups, using organometallic compounds. The particular point in time when the organometallic compound contacts the pre-catalyst is at the option of the manufacturer and can be (a) before, during or after contact of the support-activator with pre-catalyst prior to entry into the polymerization zone and/or (b) upon or during polymerization by direct addition to the polymerization zone. However, because pre-activated catalysts are less stable than the halogenated precursors thereof, organometallic compound addition, when employed, is preferably conducted in the presence of the support-activator. It is a further particular advantage of the present invention that activation of the pre-catalyst (having L=halogen) can be delayed by avoiding the use of the organometallic compound to induce pre-activation until polymerization occurs. Thus, such pre-catalyst can be impregnated into the support activator and the same recovered without activation until used for polymerization. Since it is possible to employ lower total amounts of organometallic compound by adding it only to the reactor during polymerization, this is the preferred approach.

Thus, one preferred embodiment comprises using pre-catalyst transition metal compound I or II wherein each L group is a halogen atom. In this embodiment the pre-catalyst and support-activator are separately mixed. In another embodiment said pre-catalyst, support-activator and at least one organometallic compound (represented by Formula III below) are admixed simultaneously prior to polymerization. In this embodiment, at least one of the halogens constituting L becomes a new hydrocarbyl L group derived from the organometallic, i.e., compound during pre-activation. More specifically, when used as a scavenging and alkylating agent, the organometallic compound is typically added directly to the polymerization zone, whereas when employed as an alkylating agent alone it is desirably added to the mixture of support-activator and pre-catalyst.

Organometallic compounds suitable for use in pre-activation include those represented by Formula (III):

$$M(R^{12})_s \qquad \text{III}$$

wherein M represents an element of the Group 1, 2 or 13 of the Periodic Table, a tin atom or a zinc atom; each $R^{12}$ independently represents a hydrogen atom, a halogen atom, a hydrocarbon based radical such as hydrocarbyl, typically $C_1$ to $C_{24}$ hydrocarbyl, including $C_1$ to $C_{24}$ alkyl or alkoxy and aryl, aryloxy, arylalkyl, arylalkoxy, alkylaryl or alkylaryloxy group having 6 to 24 carbon atoms (such as a hydrogen atom, halogen atom (e.g., chlorine fluorine, bromine, iodine and mixtures thereof), alkyl groups (e.g., methyl, ethyl, propyl, pentyl, hexyl, heptyl, decyl, isopropyl, isobutyl, s-butyl, t-butyl), alkoxy groups (e.g., methyoxy, ethoxy, propoxy, butoxy, isopropoxy), aryl groups (e.g., phenyl, biphenyl, naphthyl), aryloxy groups (e.g., phenoxy), arylalkyl groups (e.g., benzyl, phenylethyl), arylalkoxy groups (benzyloxy), alkylaryl groups (e.g., tolyl, xylyl, cumenyl, mesityl), and alkylaryloxy groups (e.g., methylphenoxy) and s is the oxidation number of M. Preferably at least one $R^{12}$ is hydrocarbyl, e.g., an alkyl group having 1 to 24 carbon atoms or an aryl, arylalkyl or alkylaryl group having 6 to 24 carbon atoms, e.g., to provide a source of hydrocarbyl groups for alkylation of the pre-catalyst when L is non-hydrocarbyl.

The preferred organometallic compounds are those wherein M is aluminum.

Representative examples of organometallic compounds include alkyl aluminum compounds, preferably trialkyl aluminum compounds, such as trimethyl aluminum, triethyl aluminum, triisopropyl aluminum, triisobutyl aluminum, tri-n-propylaluminum, triisobutylaluminum, tri-n-butylaluminum, triamylaluminum, and the like; alkyl aluminum alkoxides such as ethyl aluminum diethoxide, diisobutyl aluminum ethoxide, di(tert-butyl) aluminum butoxide, diisopropyl aluminum ethoxide, dimethyl aluminum ethoxide, diethyl aluminum ethoxide, di-n-propyl aluminum ethoxide, di-n-butyl aluminum ethoxide, and the like; aluminum alkoxides such as aluminum ethoxide, aluminum propoxide, aluminum butoxide and the like; alkyl or aryl aluminum halides such as diethyl aluminum chloride, ethyl aluminum dichloride, diisopropyl aluminum chloride and the like; aluminum aryloxides such as aluminum phenoxide, and the like; and mixed aryl, alkyl or aryloxy, alkyl aluminum compounds and aluminum hydrides such as dimethylaluminum hydride, diethylaluminum hydride, diisopropylaluminum hydride, di-n-propylaluminum hydride, diisobutylaluminum hydride, and di-n-butylaluminum hydride. The most preferred organometallic compounds are the trialkyl aluminum compounds.

When at least one L of the transition metal compounds is halogen, the pre-catalyst and/or the organometallic compound can be mixed in an inert diluent prior to, simultaneously with, or after contact (of either one) with the support-activator. The pre-catalyst, when two L groups are halogen, is more stable to materials which are poisons to the activated catalyst.

In a second preferred embodiment wherein each L of the pre-catalyst is a hydrocarbyl, a hydrocarbylene or a hydrocarbyloxy group, there is no need for the addition or handling of the organometallic compound. Thus, the catalyst composition can be readily formed and used without pre-activation. However, even in this instance, it is still preferred to employ at least some organometallic compound as a scavenger during polymerization to deactivate potential poisons to the activated catalyst.

The support-activator is a composite in the form of agglomerates of at least two components, namely, (A) at least one inorganic oxide component and (B) at least one ion-containing layered component.

In addition, the morphology of the support-activator is believed to significantly influence the performance of the catalyst composition.

The inorganic oxide Component-A of the support-activator agglomerate particles of the present invention are derived from porous inorganic oxides including $SiO_2$, $Al_2O_3$, $AlPO_4$, $MgO$, $TiO_2$, $ZrO_2$; mixed inorganic oxides including $SiO_2.Al_2O_3$, $MgO.SiO_2.Al_2O_3$, $SiO_2.TiO_2.Al_2O_3$, $SiO_2.Cr_2O_3.TiO_2$ and $SiO_2.Cr_2O_3.TiO_2$ based on the weight of the catalyst support. Where the inorganic oxide (including mixed inorganic oxides) is capable of forming a gel by known commercial procedures, it is preferred to utilize the same in a gel configuration for the milling procedures described herein. If the inorganic oxide is not susceptible to gel formation, the free oxide or mixed oxides derived from other conventional techniques such as precipitation, coprecipitation, or just admixing, can be utilized directly for the milling procedures after washing.

Most preferably, Component-A of the support-activator contains typically at least 80, preferably at least 90, and most preferably at least 95%, by weight, silica gel (e.g., hydrogel, aerogel, or xerogel) based on the weight of the catalyst support.

Silica hydrogel, also known as silica aquagel, is a silica gel formed in water which has its pores filled with water. A xerogel is a hydrogel with the water removed. An aerogel is a type of xerogel from which the liquid has been removed in such a way as to minimize any collapse or change in the structure as the water is removed.

Silica gel is prepared by conventional means such as by mixing an aqueous solution of an alkali metal silicate (e.g., sodium silicate) with a strong acid such as nitric or sulfuric acid, the mixing being done under suitable conditions of agitation to form a clear silica sol which sets into a hydrogel in less than about one-half hour. The resulting gel is then washed. The concentration of the $SiO_2$ in the hydrogel which is formed is usually in the range of typically between about 15 and about 40, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 5° C.

Washing is accomplished simply by immersing the newly formed hydrogel in a continuously moving stream of water which leaches out the undesirable salts, leaving about 99.5 wt. % pure silica ($SiO_2$) behind.

The pH, temperature, and duration of the wash water will influence the physical properties of the silica, such as surface area (SA) and pore volume (PV). Silica gel washed at 65–90° C. at pH's of 8–9 for 28–36 hours will usually have SA's of 290–350 $m^2/g$ and form aerogels with PV's of 1.4 to 1.7 cc/gm. Silica gel washed at pH's of 3–5 at 50–65° C. for 15–25 hours will have SA's of 700–850 $m^2/g$ and form aerogels with PV's of 0.6–1.3 cc/g When employing a Component-A inorganic oxide containing at least 80 wt. % silica gel, the remaining balance of the inorganic oxide Component-A can comprise various additional components. These additional components may be of two types, namely (1) those which are intimately incorporated into the gel structure upon formation, e.g., by cogelling silica gel with one or more other gel forming inorganic oxide materials, and (2) those materials which are admixed with silica gel particles prior to milling or after milling in slurry form just prior to spray drying. Thus, materials includable in the former category are silica-alumina, silica-titania, silica-titania-alumina, and silica-alumina phosphate cogels.

In the latter category, components which may be admixed, in slight proportions, with the silica hydrogel particles prior to milling and/or just prior to agglomeration include those prepared separately from inorganic oxides such as magnesium oxide, titanium oxide, thorium oxide, e.g., oxides of Groups 4 and 16, as well as other particulate constituents.

Other particulate constituents which may be present include those constituents having catalytic properties, not adversely affected by water, spray drying or calcination, such as finely divided oxides or chemical compounds, recognizing, however, that these constituents play no part in the agglomeration procedure. Similarly, it is possible to add powders or particles of other constituents to the silica hydrogel particles to impart additional properties to the support-activator obtained. Accordingly, in addition to those powders or particulates having catalytic properties, there may be added materials which possess absorbent properties, such as synthetic zeolites.

Thus, it is possible to obtain complex catalyst supports wherein amorphous silica gel contains crystallizable elements and the like. The skilled artisan will appreciate that the amounts of such additional components must be restricted in order to avoid compromising the desired agglomerate properties described herein.

Also, it is feasible to add constituents to the inorganic oxide which may be eliminated after agglomeration in order to control porosity within a desired range; such agents as sulfur, graphite, wood charcoal, and the like being particularly useful for this purpose.

When non-silica gel components are to be employed with silica gel, they may be added to the slurry to be agglomerated. However, it is preferable that they be present in the silica gel during or prior to milling as described hereinafter, since they will be less likely to disturb the desired agglomerate morphology after spray drying when they are also subjected to milling.

In view of the above, the term "silica gel", when used to describe the process steps up to and including agglomeration, is intended to include the optional inclusion of the aforementioned non-silica gel constituents permitted to be present in Component-A of the support-activator.

Component-B of the support-activator is a layered material having a three-dimensional structure which exhibits the strongest chemical bonds in only two dimensions. More specifically, the strongest chemical bonds are formed in and within two dimensional planes which are stacked on top of each other to form a three dimensional solid. The two dimensional planes are held together by weaker chemical bonds than those holding an individual plane together and generally arise from Van der Waals forces, electrostatic interactions, and hydrogen bonding. The electrostatic interactions are mediated by ions located between the layers and in addition, hydrogen bonding can occur between complimentary layers or can be mediated by interlamellar bridging molecules.

Representative examples of suitable layered materials includable in layered Component-B can be amorphous or crystalline, preferably amorphous. Suitable layered Component-B materials include clay, and clay minerals.

Clay is typically composed of clay minerals (i.e., crystalline silicate salts) as the main constituent. The clay or clay mineral is usually an inorganic polymeric compound of high molecular complexity constituted by a tetrahedral unit in which a central silicon atom coordinates oxygen atoms and an octahedral unit in which a central aluminum, magnesium or iron atom coordinates oxygen or hydroxide. The skeletal structures of many clays or clay minerals are not electrically neutral and have positive, most typically negative, charges on their surfaces. When possessing a negatively charged surface, they have cations in their interlaminar structures to complement such negative charges. Such interlaminar cations can be ion-exchanged by other cations. A quantification of a clay's ability to exchange interlaminar cations is called its cation exchange capacity (CEC) and is represented by milliequivalents (meq) per 100 g of clay. CEC differs depending upon the type of clay, and Clay Handbook, second edition (compiled by Japanese Clay Association, published by Gihodo Shuppan K.K.) gives the following information. Kaolinite: 3 to 15 meq/100 g, halloysite: 5 to 40 meq/100 g, montmorillonite: 80 to 150 meq/100 g, illite: 10 to 40 meq/100 g, vermiculite: 100 to 150 meq/100 g, chlorite; 10 to 40 meq/100 g, zeolite. attapulgite: 20 to 30 meq/100 g. Thus, layered Component-B to be used in the present invention, is a material, e.g., clay or clay mineral, typically having its surface negatively charged and preferably also having the ability to exchange cations.

Thus, clay minerals generally have the characteristic layer structure described above, containing between the layers, various levels of negative charges. In this respect, the clay mineral is substantially different from metal oxides having a three-dimensional structure such as silica, alumina, and zeolite. The clay minerals are classified according to the levels of the aforementioned negative charge for the chemical formula: (1) biophilite, kaolinite, dickalite, and talc having the negative charge of 0 (zero), (2) smectite having the negative charge of from −0.25 to −0.6, (3) vermiculite having the negative charge of from −0.6 to −0.9, (4) mica having the negative charge of from about −1, and (5) brittle mica having a negative charge of about −2. Each of the above groups includes various minerals. For example, the smectite group includes montmorillonite, beidellite, saponite, nontronite hectorite, teniolite, suconite and related analogues; the mica group includes white mica, palagonite and illite. These clay minerals exist in nature, and also can be synthesized artificially with a higher purity.

Any of the natural and artificial clay minerals having a negative charge below 0 are useful in the present invention. The presently preferred clay is montmorillonite, e.g., sodium montmorillonite.

Further, clays and clay minerals may be used as they are without subjecting them to any treatment prior to formation of the support-activator therefrom, or they may be treated by ball milling, sieving, acid treatment or the like prior to such formation. Further, they may be treated to have water added and adsorbed or may be treated for dehydration under heating before support-activator formation. They may be used alone or in combination as a mixture of two or more of them for support-activation synthesis.

Component-B preferably has a pore volume of pores having a diameter of at least 40 Å (e.g., 40–1000 Å) as measured by a mercury intrusion method employing a mercury porosimeter of at least 0.1 cc/g, more preferably from 0.1 to 1 cc/g. The average particle size of Component-B can vary typically from about 0.01 to about 50, preferably from about 0.1 to about 25, and most preferably from about 0.5 to about 10 microns.

The clays suitable for use as Component-B of the support-activator may be subjected to pretreatment with chemicals prior or subsequent to support-activator formation. Examples of the chemical pretreatment include treatment with an acid or alkali, treatment with a salt, and treatment with an organic or inorganic compound. The last treatment can result in formation of a composite material.

The treatment of the clay mineral with the acid or alkali may not only remove impurities from the mineral, but also may elute part of metallic cations from the crystalline structure of the clay, or may destructively alter the crystalline structure into an amorphous structure.

Examples of the acids used for this purpose are Brønstead acids, such as hydrochloric, sulfuric, nitric, acetic acid and the like.

Sodium hydroxide, potassium hydroxide and calcium hydroxide are preferably used as alkali chemical in the alkali pretreatment of the clay mineral.

In the case where the clay mineral is pretreated with a salt or an inorganic, or organic compound to give a composite material, the crystalline structure may be retained substantially without being broken and, rather a product that has been modified by ion-exchange may be obtained.

Examples of the inorganic salt compounds that may be used in the pretreatment with salts include ionic halide salts, such as sodium chloride, potassium chloride, lithium chloride, magnesium chloride, aluminum chloride, iron chloride and ammonium chloride; sulfate salts, such as sodium sulfate, potassium sulfate, aluminum sulfate and ammonium sulfate; carbonate salts, such as potassium carbonate, sodium carbonate and calcium carbonate; and phosphate salts, such as sodium phosphate, potassium phosphate, aluminum phosphate and ammonium phosphate. Examples of the organic salt compounds include sodium acetate, potassium acetate, potassium oxalate, sodium citrate, sodium tartarate and the like.

In the case where the clay mineral is treated with an organic compound, such compounds will typically comprise a Lewis basic functional group containing an element of the Group 15 or 16 of the Periodic Table, such as organoammonium cation, oxonium cation, sulfonium cation, and phosphonium cation. The organic compound may also preferably comprise a functional group other than the Lewis basic functional group, such as carbonium cation, tropylium cation, and a metal cation. After undergoing such treatment, the exchangeable metallic cations originally present in the clay mineral are exchanged with the enumerated organic cations. Thus, compounds that yield a carbon cation, for example, trityl chloride, tropylium bromide and the like; or a complex compound that yields metallic complex cation, for example a ferrocenium salt and the like; may be used as the organic compound in the pretreatment. In addition to these compounds, onium salts may be used for the same purpose.

As examples of the inorganic compound used for the synthesis of inorganic composite material, metal hydroxides that yield hydroxide anions, for example, aluminum hydroxide, zirconium hydroxide, chromium hydroxide and the like may be mentioned.

Particular examples of guest organic cations that may be introduced for modification of the clay minerals, include: triphenylsulfonium, trimethylsulfonium, tetraphenylphosphonium, alkyl tri(o-tolyl) phosphonium, triphenylcarbonium, cycloheptatrienium, and ferrocenium; ammonium ions, for example aliphatic ammonium cations, such as butyl ammonium, hexyl ammonium, decyl ammonium, dodecyl ammonium, diamyl ammonium, tributyl ammonium, and N,N-dimethyl decyl ammonium; and aromatic ammonium cations such as anilinium, N-methyl anilinium, N,N-dimethyl anilinium, N-ethyl anilinium, N,N-diethyl anilinium, benzyl ammonium, toluidinium, dibenzyl ammonium, tribenzyl ammonium, N,N-2,4,6-pentamethyl anilinium and the like; and also oxonium ions, such as dimethyl oxonium, diethyl oxonium and the like. These examples are not limiting.

Ion exchange of the exchangeable cations in the clay mineral with selected organic cations is typically brought about by contacting the clay with an onium compound (salt) comprising the organic cations.

Particular examples of the onium salts which may be used, include: ammonium compounds; for example aliphatic amine hydrochloride salts, such as propylamine HCl salt, isopropylamine HCl salt, butylamine HCl salt, hexylamine HCl salt, decylamine HCl salt, dodecylamine HCl salt, diamylamine HCl salt, tributylamine HCl salt, triamylamine HCl salt, N,N-dimethyl decylamine HCl salt, N,N-dimethyl undecylamine HCl salt and the like; aromatic amine hydrochloride salts, such as aniline HCl salt, N-methylaniline HCl salt, N,N-dimethylaniline HCl salt, N-ethylaniline HCl salt, N,N-diethylaniline HCl salt, o-toluidine HCl salt, p-toluidine HCl salt, N-methyl-o-toluidine HCl salt, N-methyl-p-toluidine HCl salt, N,N-dimethyl-o-toluidine HCl salt, N,N-dimethyl-p-toluidine HCl salt, benzylamine HCl salt, dibenzylamine HCl salt, N,N-2,4,6-pentamethyl aniline HCl salt and the like; hydrofluoric, hydrobromic and hydroiodic acid salts and sulfate salts of the above-listed aliphatic and aromatic amines; and oxonium compounds, such as hydrochloric acid salts of methyl ether, ethyl ether, phenyl ether and the like. Of the onionium compounds the exemplified ammonium or oxonium compounds, preferably the ammonium compounds and more preferably the aromatic amine salts are employed in the modification of the clay mineral.

The onium compound to be reacted with the clay mineral may be in the isolated form. Alternatively, the onium compound may be formed in situ, for example by contacting the corresponding amine compound, a heteroatom-containing compound, such as an ether or sulfide compound, and a proton acid, such as hydrofluoric, hydrochloric, hydroiodic or sulfuric acid, in the reaction solvent in which the clay mineral is to be pretreated subsequently. The reaction conditions under which the clay mineral can be modified by the onium compound are not critical. Also the relative proportions of the reactants used therein are not critical. Preferably, however, when used the onium compound is employed in a proportion of not less than 0.5 equivalents per equivalent of the cation present in the clay mineral, and more preferably in a proportion of at least equivalent amount. The clay mineral may be used singly or in admixture with other clay mineral or minerals. Also the onium compound may be used singly or in admixture with other onium compounds. The reaction solvent used in the modification pretreatment process may be water or a polar organic solvent. Examples of the organic solvents which may be used suitably, include alcohols, such as methyl alcohol, ethyl alcohol and the like; acetone, tetrahydrofuran, N,N-dimethyl formamide, dimethylsulfoxide, methylene chloride and the like. The solvent may be used singly or as a mixture of two or more solvents. Preferably, water or an alcohol is employed.

What can be viewed as separate and distinct classes of chemical modification treatments to which the clays can be subjected is referred to as pillaring and delamination. Pillaring is a phenomena whereby the platelets of certain clays, such as smectite clays, which are swellable, are separated by intercalation of large guest cations between the negatively charged platelet sheets, which cations function as molecular props or pillars separating the platelets and preventing the layers from collapsing under van der Waals forces.

Pillared clays are typically prepared by reacting a smectite clay, such as montmorillonite, with polyoxymetal cations such as polyoxycations of aluminum and zirconium. The reaction product is normally dried in air and calcined to convert the intercalated cations into metal oxide clusters interposed between the platelets of the clay such that the spacing between the platelets ranges from about 6 to about 10 Angstroms and is maintained at such values when the clay is heated to a temperature between about 500° C. and 700° C. When the reaction product is dried, the clay platelets, which are propped apart by the metal oxide clusters, orient themselves face-to-face, thereby forming a lamellar structure which yields an X-ray diffraction pattern containing distinct first order or (001) reflection. The extent of lamellar ordering is indicated by the X-ray powder diffraction pattern of the pillared clay. A well-ordered, air-dried, pillared montmorillonite may exhibit six or more orders of reflection. Pillared clays and their preparation are described more fully in the article entitled "Intercalated Clay Catalysts," *Science*, Vol. 220, No. 4595 pp. 365–371 (Apr. 22, 1983) and in U.S. Pat. Nos. 4,176,090; 4,216,188; 4,238,364; 4,248,739; 4,271,043; 4,367,163; 4,629,712; 4,637,992; 4,761,391; 4,859,648; and 4,995,964. The disclosures of the aforementioned articles and patents are incorporated herein by reference in their entireties.

In contrast to pillared clays, having platelets which are ordered in a face-to-face arrangement, delaminated clays also contain large cations but the platelets are oriented edge-to-edge and edge-to-face in what can be described as a "house-of-cards" structure containing macropores of a size typically found in amorphous aluminosilicates in addition to the micropores found in pillared clays. (See U.S. Pat. No. 4,761,391 for a further discussion.)

Accordingly, it is contemplated that such pillared and delaminated clays are includable as further embodiments of modified clays which may be employed as Component-B in the support activator.

While it is possible and permissible to modify Component-B with guest cations as described above, such procedures add process steps to the overall preparation, and from a process point of view, are preferably not employed.

However, when Component-B is modified by exchanging originally present cations for guest cations, the goal sought to be achieved by such exchange is to render the support-activator capable of activating either the pre-catalyst or the pre-activated catalyst as described above. It is believed that the indigenous cations typically present in the aforementioned clays are already capable of accomplishing this goal.

The support-activator is made from an intimate admixture of Components-A and -B, which admixture is shaped in the form of an agglomerate.

The weight ratio of Components-A:-B in the agglomerate can vary typically from about 0.25:1 to about 99:1, preferably from about 0.5:1 to about 20:1, most preferably from about 1:1 to about 10:1 (e.g., 4:1).

The term "agglomerate" refers to a product that combines particles which are held together by a variety of physical-chemical forces.

More specifically, each agglomerate is preferably composed of a plurality of contiguous, constituent primary particles derived primarily from Component-A and much smaller secondary constituent particles derived from both Component-A and Component-B preferably joined and connected at their points of contact.

The agglomerates of the present invention preferably will exhibit a higher macropore content than the constituent primary or secondary particles as a result of the interparticle voids between the constituent particles. However, such interparticle voids may be almost completely filled with the smaller secondary particles in other embodiments of the spray dried agglomerates.

The agglomeration of Components-A and -B may be carried out in accordance with the methods well known to the art, in particular, by such methods as pelletizing, extrusion, shaping into beads in a rotating coating drum, and the like. The nodulizing technique whereby composite particles having a diameter of not greater than about 0.1 mm are agglomerated to particles with a diameter of at least about 1 mm by means of a granulation liquid may also be employed.

However, the preferred agglomerates are made by drying, preferably spray drying a slurry of Components-A and -B.

More specifically, in this embodiment, the support-activator is made by admixing Components-A and -B to form a slurry, preferably an aqueous slurry, comprising typically at least 50, preferably at least 75 (e.g., at least 80), and most preferably at least 85 (e.g., at least 90), wt. % water based on the slurry weight. However, organic solvents, such as $C_5$ to $C_{12}$ alkanes, alcohols (e.g. isopropyl alcohol), may also be employed although they represent a fire hazard relative to water and often make agglomerates too fragile for use as polymerization catalysts.

To render Component-A suitable for agglomerate formation, e.g. drying or spray drying, various milling procedures are typically employed. The goal of the milling procedure is to ultimately provide Component-A, when intended to be spray dried, with an average particle size of typically from about 2 to about 10 (e.g. 3 to about 7) preferably from about 4 to about 9, and most preferably from 4 to 7 microns. Desirably the milling procedures will also impart a particle size Distribution Span to the particles in the slurry of typically from 0.5 to about 3.0, and preferably from about 0.5 to about 2.0. The particle size Distribution Span is determined in accordance with the following equation.

$$\text{Distribution Span} = \frac{D_{90} - D_{10}}{D_{50}} \qquad \text{Equation 1a}$$

wherein $D_{10}$, $D_{50}$, and $D_{90}$ represent the $10^{th}$, $50^{th}$, and $90^{th}$ percentile, respectively, of the particle size (diameter) distribution, i.e. a $D_{90}$ of 100 microns means that 90 volume % of the particles have diameters less than or equal to 100 microns. Still more preferably, the milling is conducted to impart a particle size distribution to the Component-A inorganic oxides in the slurry to be spray dried such that the Component-A colloidal content is typically from about 2 to about 60 (e.g. 2 to about 40), preferably from about 3 to about 25, and most preferably from about 4 to about 20 wt. %.

The colloidal content of Component-A to be spray dried is determined by centrifuging a sample for 30 minutes at 3600 RPM. The liquid (supernatant) which remains on top of the test tube is decanted, and analyzed for % solids. The % of colloidal material is then determined by the following equation:

$$\% \text{ colloid} = \left[ \frac{\left(\frac{1-B}{B}\right) - 2.2}{\left(\frac{1-A}{A}\right) - 2.2} \right] * 100 \qquad \text{Equation 1b}$$

wherein
  A=wt. % solids in supernatant/100, and
  B=wt. % solids of original slurry/100
The colloidal content will possess a particle diameter in the colloidal range of typically less than about 1, preferably less than about 0.5, and typically from about 0.4 to about 1 micron.

All particle size and particle size distribution measurements described herein are determined by a Mastersizer unit from Malvern, which operates on the principle of laser light diffraction and is known to all familiar in the art of small particle analysis.

As the colloidal content of the dry solids content of the Component-A slurry exceeds about 60 wt. %, the constituent particles of the agglomerate can become bound too tightly together.

Conversely, while the presence of at least some colloidal content of the slurry is desired, a slurry containing no colloidal content (e.g. dry milled powder alone) will typically produce agglomerates of the support-activator which have extremely low physical integrity to an undesirable degree and typically will be undesirable as a support for a polymerization catalyst without some alternative source of binder.

One milling procedure which has been found to impart the aforedescribed properties, as well as the desired morphology, involves a wet milling procedure and optionally a dry milling procedure.

A wet milling procedure is characterized by the presence of liquid, e.g. water, during the milling procedure. Thus, wet milling is typically performed on a slurry of the inorganic oxide particles having a solids content of typically from about 15 to about 25 weight % based on the slurry weight.

More specifically, with wet milling, Component-A is slurried in a media (usually water) and the mixture then subjected to intense mechanical action, such as the high speed blades of a hammer mill or rapidly churning media of a sand mill. Wet milling reduces particle size and produces colloidal silica as well.

A dry milling procedure is characterized by the substantial absence of the presence of free flowing liquid, e.g. water or solvent. Thus, while the final dry milled material may contain some absorbed moisture, it is essentially in powder form, not a suspension or solution of particles in liquid.

The dry milling referred to typically takes particulate inorganic oxide and reduces it in size either by mechanical action, impingement onto a metal surface, or collision with other particles after entrainment into a high-velocity air stream.

Accordingly, the inorganic oxide (typically while still wet) is then subjected to a milling operation as described below to prepare it for spray drying.

In the wet milling procedure, the washed inorganic oxide is typically subjected to a milling procedure well known in the art that is necessary to produce slurries with the particle sizes specified above. Suitable mills include hammer mills, impact mills (where particle size reduction/control) is achieved by impact of the oxide with metal blades and retained by an appropriately sized screen), and sand mills (where particle size control/reduction is achieved by contact of the oxide with hard media such as sand or zirconia beads).

The colloidal particles within the wet milled material are the primary source of the colloid content in the slurry to be spray dried as described above, and are believed to act as a binder upon spray drying.

In the dry milling procedure, Component-A is typically milled in a manner sufficient to reduce its average particle size to typically from about 2 to about 10, preferably from about 3 to about 7, and most preferably from about 3 to 6 microns, and its moisture content to typically less that about 50, preferably less than about 25, and most preferably less that about 15 weight %. In order to attain the dry milling particle size targets at the higher moisture contents, it may be necessary to conduct dry milling while the particles are frozen.

The dry milling is also conducted to preferably impart a particle size distribution such that the Distribution Span is typically from about 0.5 to about 3.0, preferably from about 0.5 to about 2.0, and most preferably from about 0.7 to about 1.3.

Thus, the resulting dry milled material exists in the form of a powder prior to being slurried for spray drying.

The dry milling is preferably conducted in a mill capable of flash drying the inorganic oxide while milling. Flash drying is a standard industrial process where the material to be dried is quickly dispersed into a hot air chamber and exposed to an air stream of 370–537° C. The rate of air and material input is balanced such that the temperature of the outgoing air and the material entrained in it is generally 121–176° C. The whole process of drying usually takes place in less than 10 seconds, reducing the moisture content to less than about 10%. Alternatively, the inorganic oxide can be separately flash dried to the aforedescribed moisture content in a flash dryer and then placed in a dry mill and milled. Suitable dry mills include an ABB Raymond™ impact mill or an ALJET™ FLUID ENERGY MILL. Ball mills can also be used. Suitable flash drying equipment includes Bowen™ flash dryer. Other similar equipment is well known in the chemical processing industry.

Flash drying is typically accomplished by exposing the inorganic oxide to conditions of temperature and pressure sufficient to reduce the moisture content thereof to levels as described above over a period of time of typically less than about 60, preferably less than about 30, and most preferably less than about 5 seconds.

Dry milling typically does not produce colloidal silica.

In accordance with one embodiment of the agglomerate formation by spray drying, at least a portion of the material constituting Component-A is derived from wet milling, and optionally but preferably at least a portion is derived from dry milling. Thus, prior to agglomeration, Component-A will typically comprise a mixture of previously wet milled inorganic oxide, e.g. silica gel, and dry milled inorganic oxide, e.g. silica gel powder. More specifically, the weight ratio (on a dry solids content basis as defined hereinafter) of the wet milled:dry milled inorganic oxide solids in the slurry can vary typically from about 9:0 to about 0.1:1 (e.g., 9:1), preferably from about 1.5:1 to about 0.1:1, and most preferably from about 0.6:1 to about 0.25:1.

The particular wet milled:dry milled solids ratio of Component-A employed will be selected to achieve the target properties in the final slurry to be used in agglomerate formation.

In an alternative embodiment, a sequential milling procedure can be employed to impart the target properties of average particle size and particle size distribution. The sequential milling procedure involves dry milling a sample of the Component-A inorganic oxide and then wet milling the previously dry milled sample.

It has been observed that drying of inorganic oxide starting material during dry milling and then using the dry milled product for wet milling tends to produce a lower colloidal content relative to mixing a separately prepared dry milled product and a separately prepared wet milled product. The reason for this phenomenon is not entirely understood. However, sufficient colloidal content is produced to bind the agglomerate together in a desirable manner.

Once the target average particle size and preferably the particle size Distribution Span is imparted to Component-A, a slurry, preferably aqueous slurry, is prepared for agglomeration, preferably by spray drying.

The Component-B layered material, e.g. clay, is typically comprised of fine particles having an average particle size of typically less than 10, preferably less than 5, and most preferably less than 1 micron, such particle sizes ranging typically from about 0.1 to about 10, preferably from about 0.1 to about 5, and most preferably from about 0.1 to about 1 microns.

Other preferable physical properties of the clay include a total nitrogen pore volume of typically greater than 0.005 (e.g., 0.005 to 1.50), preferably greater than about 0.1 (e.g., 0.1 to 2) cc/g; a nitrogen surface area of typically greater than 10, preferably greater than 30 (e.g., 10 to 100) m²/g; and an Apparent Bulk Density (ABD) of typically greater than 0.10, preferably greater than 0.25 (e.g., 0.10 to 0.75) g/cc.

Milling procedures can be employed to achieve these target properties, if necessary.

To agglomerate by spray drying, Components-A and -B are admixed, typically in a suitable diluent, to form a slurry of the same. The diluent can be aqueous or organic. The preferred liquid slurry medium for spray drying is aqueous, typically greater than 75, preferably greater than 80, and most preferably greater than 95 wt. % water (e.g. entirely water).

The weight ratio of Component-A:Component-B in the slurry, can vary typically from about 0.25:1 to about 99:1, preferably from about 0.5:1 to about 20:1, and most preferably from about 1:1 to about 10:1 (e.g., 4:1). The solids content of the slurry containing the mixture of Components-A and -B can vary typically from about 5 to about 25, preferably from about 10 to about 20, and most preferably from about 15 to about 20 wt. % based on the slurry weight.

Accordingly, agglomerate formation is controlled to impart preferably the following properties to the support-activator:

(1) A surface area of typically at least about 20, preferably at least about 30, and most preferably from at least about 50 m$^2$/g, which surface area can range typically from about 20 to about 800, preferably from about 30 to about 700, and most preferably from about 50 to about 600 m$^2$/g;

(2) A bulk density of the support-activator particles of typically at least about 0.15, preferably at least about 0.20, and most preferably at least about 0.25 g/ml, which bulk density can range typically from about 0.15 to about 1, preferably from about 0.20 to about 0.75, and most preferably from about 0.25 to about 0.45 g/ml;

(3) An average pore diameter of typically from about 30 to about 300, and most preferably from about 60 to about 150 Angstroms; and (4) A total pore volume of typically from about 0.10 to about 2.0, preferably from about 0.5 to about 1.8, and most preferably from about 0.8 to about 1.6 cc/g.

The particle size and particle size distribution sought to be imparted to the agglomerate support-activator particles is dictated and controlled by the type of polymerization reaction in which the ultimate supported catalyst will be employed. For example, a solution polymerization process typically can employ an average particle size of from about 1 to about 10 microns; a continuous stirred tank reactor (CSTR) slurry polymerization process of from about 8 to 50 microns; a loop slurry polymerization process of from about 10 to about 150 microns; and a gas phase polymerization process of from about 20 to about 120 microns. Moreover, each polymer manufacturer has its own preferences based on the particular reactor configuration.

Once the desired average particle size is determined for the agglomerates based on the targeted polymerization process, the particle size distribution will desirably be such that the Distribution Span is typically from about 0.5 to about 4, preferably from about 0.5 to about 3, and most preferably from about 0.5 to 2.

Accordingly, as a generalization, the average particle size of the agglomerates will range typically from about 4 to about 250 (e.g. about 8 to about 200), and preferably from about 8 to about 100 (e.g. about 30 to about 60) microns.

When the agglomerates are formed by spray drying, they can be further characterized in that typically at least 80, preferably at least 90, and most preferably at least 95 volume % of that fraction of the support agglomerate particles smaller that the D$_{90}$ of the entire agglomerate particle size distribution possesses microspheroidal shape (i.e., morphology). Evaluation of the microspheroidal morphology is performed on that fraction of the particle size distribution of the support agglomerates which is smaller than the D$_{90}$ to avoid distortion of the results by a few large particle chunks which because of their large volume, would constitute a non-representative sample of the agglomerate volume. The term "spheroidal" as used herein means small particles of a generally rounded, but not necessarily spherical shape. This term is intended to distinguish from irregular jagged chunks and leaf or rod like configurations. "Spheroidal" is also intended to include polylobed configurations wherein the lobes are also generally rounded, although polylobed structures are uncommon when the agglomerate is made as described herein.

Each microspheroid is preferably composed of a loosely to densely packed composite of Components-A and -B typically with some, to substantially no, interstitial void spaces, and typically substantially no visible boundaries, in an electron micrograph, between particles originally derived from Components-A and -B.

However, microprobe image and elemental analysis of a cross-sectioned view of preferred agglomerate particles reveals that the Fe and Al ions associated with Component-B are distributed in clusters of varying density around discrete sub-particles of material-bearing no iron or aluminum. This leads to the conclusion that, in the most preferred agglomerate particles, Component-B is intimately admixed with Component-A such that islands of inorganic oxide (e.g., silica) are surrounded by a matrix of inorganic oxide (most likely derived from the colloidal constituents of the inorganic oxide) and layered material (e.g., clay). It is believed that the varying intensity (concentration) of Al and Fe, in the matrix is indicative of varying ratios of Component-A to Component-B in the matrix.

The microspherodial shape of the support-activator significantly enhances the desired morphology of the polymers derived therefrom. Thus, one is able to simultaneously significantly enhance catalyst activity and desired polymer morphology by utilizing the 2 components of support-activator.

The terms "surface area" and "pore volume" refer herein to the specific surface area and pore volume determined by nitrogen adsorption using the B.E.T. technique as described by S. Brunauer, P. Emmett, and E. Teller in Journal of American Chemical society, 60, pp. 209–319 (1939).

Bulk density is measured by quickly transferring (in 10 seconds) the sample powder into a graduated cylinder which overflows when exactly 100 cc is reached. No further powder is added at this point. The rate of powder addition prevents settling within the cylinder. The weight of the powder is divided by 100 cc to give the density.

Spray drying conditions are typically controlled in order to impart the desired target properties described above to the agglomerate. The most influential spray drying conditions are the pH of the aqueous slurry to be spray dried, as well as its dry solids content. By "dry solids content" as used herein is meant the weight of solids in the slurry after such solids have been dried at 175° C. for 3 hours, and then at 955° C. for 1 hour. Thus, dry solids content is used to quantify the weight of solid ingredients which exist in the slurry and to avoid inclusion of adsorbed water in such weight.

Typically, the pH of the slurry will be controlled or adjusted to be from about 5 to about 10 (e.g., 8 to 9), preferably from about 7 to about 9, and the dry solids content will be controlled or adjusted to be typically from about 12 to 30, preferably from about 15 to about 25, and most preferably from about 18 to about 22 (e.g. 20) weight % based on the weight of the slurry and the dry weight of the gel.

Control of the remaining variables in the spray drying process, such as the viscosity and temperature of the feed, surface tension of the feed, feed rate, the selection and operation of the atomizer (preferably an air atomizer is employed and preferably without the use of a pressure nozzle), the atomization energy applied, the manner in which air and spray are contacted, and the rate of drying, are well within the skill of the spray dry artisan once directed by the target properties sought to be imparted to the product produced by the spray drying. (See for example U.S. Pat. No. 4,131,452.)

Product separation from the drying air follows completion of the spray drying stage when the dried product remains suspended in the air. Any convenient collection method can be employed, such as removal from the base of the spray dryer by the use of separation equipment.

To provide uniformity to the catalyst as well as the resulting polymer, it is desirable to calcine the support-activator to control any residual moisture present in the support.

When calcination is employed, it will typically be conducted at sufficient temperature and time to reduce the total volatiles to between about 0.1 and 8 wt. % where the total volatiles are determined by measuring the weight loss upon destructive calcination of the sample at 1000° C. However, the calcination temperature will also affect the interrelationship between the desired silica:clay ratio and the orgnao aluminum compound amount, and the activity of the catalyst as described hereinafter in more detail. Accordingly, calcination, when employed, will typically be conducted by heating the support-activator to temperatures of typically from about 100 to about 800, preferably from about 150 to about 600, and most preferably from about 200 to about 300° C. for periods of typically from about 1 to about 600 (e.g., 50 to 600), and preferably from about 50 to about 300 minutes. The atmosphere of calcination can be air or an inert gas. Calcination should be conducted to avoid sintering.

After formation, the support-activator is preferably sized prior to calcination since the agglomerates will pick up moisture if sized after calcination. This can be conveniently accomplished by screening or air classifying as is well known in the art.

The particle size and particle size distribution selected will depend on the catalyst type and polymerization process to be applied, as would be well known in the art.

The preferred manner in which the support-activator is combined with the pre-catalyst will depend in part on the polymerization technique to be employed.

More specifically, the catalyst system components described herein are useful to produce polymers using high pressure polymerization, solution polymerization, slurry polymerization, or gas phase polymerization techniques. As used herein, the term polymerization includes copolymerization and terpolymerization, and the terms olefins and olefinic monomers include olefins, alpha-olefins, diolefins, styrenic monomers, acetylenically unsaturated monomers, cyclic olefins, and mixtures thereof.

For example, polymerization of olefin monomers can be carried out in the gas phase by fluidizing, under polymerization conditions, a bed comprising the target polyolefin powder and particulates of the catalyst composition using a fluidizing gas stream comprising gaseous monomer. In a solution process the (co)polymerization is typically conducted by introducing the monomer into a solution or suspension of the catalyst composition in a liquid hydrocarbon under conditions of temperature and pressure such that the produced polyolefin forms as a solution in the hydrocarbon diluent. In the slurry process, the temperature, pressure and choice of diluent are such that the produced polymer forms as a suspension in a liquid hydrocarbon diluent.

It will be apparent from the above discussion, that deployment of the catalyst system can vary depending on the polymerization process employed with a preference for permitting the formation in-situ of the activated system in the presence of the polymerizable monomer.

Thus, for gas phase polymerizations, the pre-catalyst and optionally an organometallic compound can be impregnated into the support-activator with a solvent and the solvent optionally evaporated, whereas for polymerizations which occur in the liquid state the catalyst system components can be simply mixed in a hydrocarbon media for addition to the polymerization zone, or to a media used as the liquid in which the polymerizations are conducted.

As indicated above, an organometallic compound can be employed for pre-activation of the pre-catalyst, e.g., where L of the pre-catalyst is chlorine. It can also be employed as a scavenger for poisons in the polymerization zone.

The mixing of pre-catalyst (referred to in the following discussion as Component I), support-activator (referred to in the following discussion as Component II), and optionally organometallic compound (referred to in the following discussion as Component III) can be readily accomplished by introducing the components into a substantially inert (to chemical reaction with Components I, II and III) liquid, which can serve as a diluent or solvent for one or more of the catalyst components.

More specifically, the inert liquid preferably is a non-solvent for the Component II support-activator at contact temperatures to assure that the same will be suspended or dispersed in the liquid during contact with Component I. The inert liquid can be a solvent for the Component I transition metal compound.

Suitable inert liquids include hydrocarbon liquids, preferably $C_5$–$C_{10}$ aliphatic or cycloaliphatic hydrocarbons, or $C_6$–$C_{12}$ aromatic or alkyl substituted aromatic hydrocarbons and mixtures thereof.

The components are introduced into the liquid and maintained therein under agitation and at low temperature and pressure conditions. Particularly suitable hydrocarbons include, for example, 1,2-dichloroethane, dichloromethane, pentane, isopentane, hexane, heptane, octane, isooctane, nonane, isononane, decane, cyclohexane, methylcyclohexane, toluene, and combinations of two or more of such diluents. Ethers such as diethylether and tetrahydrofuran can also be used.

The Components I, II and III can be introduced into the inert liquid in any order or substantially simultaneously. It is preferred that, when the components are introduced sequentially, they are introduced in rapid order; that is, without a substantial period of delay between each components introduction. When sequential introduction is conducted, it is preferred that the components be added in the sequence of Component III if employed, then Component II followed by Component I.

The temperature may range typically from about 0 to about 80, preferably from about 5 to about 60, and most preferably from about 10 to about 40° C. (e.g., 15 to about 25° C.). The Components can be contacted at reduced, atmospheric or elevated pressure. Ambient conditions are preferred. The atmospheric condition of the mixing zone should preferably be substantially anaerobic and anhydrous.

The components are mixed for a period, preferably from 0.5 minute to 1440 minutes (more preferably from 1 to 600 minutes), to provide a substantially uniform mixed catalyst composition.

The formed mixture can be separated from the inert liquid, by filtration, vacuum distillation or the like to provide a solid preformed catalyst composition.

The solid preformed catalyst is preferably stored under anaerobic conditions until being introduced into a polymerization reaction zone for use in forming polyolefin products. The resultant catalyst composition is storage stable for about 3 to 6 months or longer.

Alternatively, the mixture of Components I, II and III in the inert liquid hydrocarbon, can remain without separation or purification as a slurry and be used directly as a polymerization catalyst composition. Thus, the present catalyst composition can be formed by the single-step of mixing the readily available components in an inert liquid and then either directly transferring the formed liquid dispersion to the polymerization reaction zone or placing it in storage under anerobic conditions. In this embodiment, the inert liquid used to form the dispersion preferably is chosen from those liquids which (a) are miscible with the liquids used in the polymerization reaction zone, (b) are inert with respect to the solvents, monomer(s) and polymer products contemplated and (c) are capable of suspending or dispersing Component II (e.g., is a non-solvent for the support-activator).

The present polymerization catalyst composition can be formed in-situ in a liquid phase polymerization reaction zone. The organometallic compound (if employed) can be introduced neat or as a solution in an inert liquid, which may be the same liquid as that of the polymerization media. The other components may be introduced into the polymerization zone either as solids or as slurries in inert liquids. In all cases, the liquid(s) used to introduce the components forming the present catalyst composition preferably is miscible with the liquid used as the polymerization media.

A slurry of Components I, II and II can even be injected into a gas phase polymerization zone under conditions where the liquid slurry medium desirably would be sprayed into the reaction zone whereby it would desirably evaporate leaving the catalyst in a fluidized solid form.

In batch polymerization processes, the components forming the present catalyst composition may be introduced prior to, concurrently with or subsequent to the introduction of the olefinic monomer feed. It has been found that the present catalyst composition forms rapidly under normal polymerization conditions to exhibit high catalytic activity and provide a high molecular weight polymer product.

The amount of Components I and II in the inert liquid hydrocarbon is controlled to be such as to provide a ratio of micromoles of Component I (pre-catalyst) to grams of Component II (support-activator) of typically from about 5:1 to about 500:1, preferably from about 10:1 to about 250:1, and most preferably from about 30:1 to about 100:1 (e.g., 60:1).

The amount of optional organometallic compound in the inert liquid hydrocarbon depends on whether it is intended to be employed for pre-activation of the pre-catalyst or as a scavenger in the polymerization zone. When employed for pre-activation it is controlled to be such as to provide a molar ratio of Component III (organometallic compound to Component I (pre-catalyst) of typically from about 0.001:1 to about 250:1, preferably from about 0.01:1 to about 125:1, and most preferably from about 0.1:1 to about 10:1. When employed as a scavenger by addition directly to the polymerization zone the molar ratio can vary typically from about 1:1 to about 1000:1, preferably from about 2:1 to about 500:1, most preferably from about 10:1 to about 250:1.

Alternatively, one can express the amount of the organometallic compound, when employed, as a function of the weight of the support-activator. More specifically, the ratio of millimoles (mmol) of organometallic compound: grams of support-activator employed can vary typically from about 0.001:1 to about 2:1 (e.g., 0.05:1 to about 1:1), preferably from about 0.01:1 to about 1:1 (e.g., 0.01:1 to about 0.6:1), and most preferably from about 0.1:1 to about 0.8:1 (e.g., 0.1;1 to about 0.5:1).

The amount of liquid hydrocarbon can vary typically from about 50 to about 98, preferably from about 60 to about 98, and most preferably from about 75 to about 90 wt. % based on the combined weight of liquid hydrocarbon and Components I and II.

Without wishing to be bound to any particular theory, it is believed that even without separation of the catalyst system from the inert liquid, the pre-catalyst and optional organometallic compound are very quickly adsorbed (adhere to the surface of the support-activator agglomerate) and/or absorbed (penetrate into the inner structure of the support-activator agglomerate particles) by the support-activator. It is believed that the pre-catalyst slowly reacts with the support-activator thereby promoting the solubility of the pre-catalyst into the solution phase and resulting in effective immobilization of the pre-catalyst onto the support-activator matrix via mesoporous channels. This is believed to result in improved dispersion of pre-catalyst throughout the particles.

More specifically, x-ray powder diffraction analysis of the support-activator impregnated with pre-catalyst displays an amorphous x-ray diffraction pattern wherein a sharp distinct peak originally present and attributable to pre-catalyst, has disappeared. Moreover, resolubilization of pre-catalyst was not observed when the catalyst system was washed with $CH_2Cl_2$ (a known solvent which can dissolve pre-catalyst). When a blue solution of pre-catalyst in $CH_2Cl_2$ was mixed with a tan slurry of support-activator in toluene, the color of the support-activator solid turned light blue while the supernatant $CH_2Cl_2$ solution turned clear, further supporting the conclusion that some type of reaction has taken place between the support-activator and pre-catalyst.

The organometallic compound, when employed during in-situ catalyst formation, pre-activates the pre-catalyst which is then believed to be fully activated by the Lewis acidity of the support-activator.

While the above discussion provides direction for controlling the support-activator calcination temperature, the Component-A (inorganic oxide):Component-B (layered material) wt. ratio, and the Component III (organometallic compound) content relative to either the support-activator weight or Component I pre-catalyst molar ratio, it will be understood that it is desired to control such variables to improve the catalyst activity relative to the activity of a corresponding catalyst system employing either Component-A alone or Component-B alone.

The catalyst composition of the present invention can be used for polymerization, typically addition polymerization, processes wherein one or more monomers are contacted with the coordination catalyst system (either in its original inert liquid or as separated solid product, as described above) by introduction into the polymerization zone under polymerization conditions.

Suitable polymerizable monomers include ethylenically unsaturated monomers, acetylenic compounds, conjugated or non-conjugated dienes, and polyenes. Preferred monomers include olefins, for example alpha-olefins having from 2 to 20,000, preferably from 2 to 20, and more preferably from 2 to 8 carbon atoms and combinations of two or more of such alpha-olefins. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene or combinations thereof, as well as long chain vinyl terminated oligomeric or polymeric reaction products formed during the polymerization and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1,1-hexene, 1-octene, and combinations of ethylene and/or propene with one or more of such other alpha-olefins. The most preferred is ethylene alone or with other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

In addition, the polymerization monomers may include functionalized ethylenically unsaturated monomers wherein the functional group is selected from hydroxyl, carboxylic acid, carboxylic acid esters, acetates, ethers, amides, amines and the like.

The present coordination catalyst system (composition) can be advantageously employed in a high pressure, solution, slurry or gas phase polymerization process.

Methods and apparatus for effecting such polymerization reactions are well known. The catalyst system according to the present invention can be used in similar amounts and under similar conditions known for olefin polymerization catalysts. Typically for the slurry process, the temperature is from approximately 0° C. to just below the temperature at which the polymer becomes soluble in the polymerization medium. For the gas phase process, the temperature is from approximately 0° C. to just below the melting point of the polymer. For the solution process, the temperature is typically the temperature from which the polymer is soluble in the reaction medium, up to approximately 275° C.

The pressure used can be selected from a relatively wide range of suitable pressures, e.g., from subatmospheric to about 20,000 psi. Preferred pressures can range from atmospheric to about 1000 psi, and most preferred from 50 to 550 psi. In the slurry or particle form process, the process is suitably performed with a liquid inert diluent such as a saturated aliphatic hydrocarbon. The hydrocarbon is typically a $C_3$ to $C_{10}$ hydrocarbon, e.g., propane, isobutane or an aromatic hydrocarbon liquid such as benzene, toluene or xylene. The polymer can be recovered directly from the gas phase process, by filtration or evaporation of the slurry from the slurry process, or evaporation of solvent in the solution process.

All references herein to elements or metals belonging to a certain Group refer to the Periodic Table of the Elements in Hawley's Condensed Chemical Dictionary, $12^{th}$ Edition. Also, any references to the Group or Groups shall be to the Group or Groups as reflected in this Periodic Table of Elements using the new notation system for numbering groups.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLE 1
Preparation of Support-Activator
Part A
Preparation of Base Silica Hydrogel Silica gel is prepared by mixing an aqueous solution of sodium silicate and sulfuric acid under suitable agitation and temperature to form a silica sol that sets to a gel in about 8 minutes. The resulting gel is base washed with dilute (about 2 wt. %) ammonia ($NH_3$) solution at 65.5° C. (150° F.) for 18 to 36 hours. During this time, the silica gel is cleansed of salt by-products and the surface area is modified. The base wash is followed by a fresh water wash wherein the gel is placed in a recirculating bath at 82° C.

The base washed gel was aged at 65–82° C. for about 36 hours and a pH of 6 to 7 for one sample designated 1A, and a pH of 7.5 to 9 for another sample designated 1B. The surface area of the gel is thereby reduced to about 600 $m^2/g$ for Sample 1A and to 300 $m^2/g$ for Sample 1B. The resulting water washed gel of Samples 1A and 1B have a $SiO_2$ content of about 35 wt. % with the balance being water, and an Average Particle Size (APS) of Samples 1A and 1B from 0.5 to 2.0 cm.

Part B(i)
Preparation of Wet Milled Hydrogel Sample 2A (SA 600 $m^2/g$)

A Sample 1A silica gel prepared in accordance with Part A was subjected to wet milling in a sand mill. Sufficient water was then added thereto to make a slurry of 20 wt. % solids. The bulk sample particle size was reduced with a blade mill and further processed through a wet sand mill to reduce the average particle size (APS) to <100 microns. The sample was then sand milled. The slurry was pumped through the sand mill at 1 liter per minute with a media load of 80% (4 liters) zirconia silicate 1.2 mm beads. The average particle size was reduced to 8 and 10 microns and the particle size distribution was 4/8/15 microns for D10, D50 and D90. The surface area was 600 $m^2/g$. The resulting wet milled sample was designated Sample 2A. Sample 2A had a colloidal content between 20 and 25 wt. % as determined by centrifugation.

Part B(ii)
Preparation of Wet Milled Hydrogel Sample 2B (SA 300 $m^2/g$)

Example 1, Part B(i) was repeated using base silica gel Sample 1B. The resulting wet milled sample was designated Sample 2B and had a colloidal content between 15 and 30 wt. % as determined by centrifugation and a SA of 300 $m^2/g$. The resulting material was designated Sample 2B.

Part C
Preparation of Dry Milled Sample 3B (SA 300 $m^2/g$)

A base silica gel Sample 1B prepared in accordance with Part A was subjected to dry milling procedure as follows:

The sample was flash or spray dried to a moisture content below 10 wt. %. The dried powder sample was then milled to an average particle size (APS) of about 5 microns, a surface area (SA) of still about 300 $m^2/g$, and a $N_2$ pore volume of 1.5 cc/g. The resulting sample was designated Sample 3B.

Part D
Preparations of Dry Milled Sample 3A (600 $m^2/g$)

Part C was repeated except that the base silica gel was Sample 1A prepared in accordance with Example 1, Part A. The resulting dry milled sample had a moisture content of less than 10 wt. %, an APS of 5 microns and a SA of 600 $m^2/g$. The resulting sample was designated Sample 3A.

Part E
Preparation of Silica Slurry

Seven different blends (designated Runs 1 to 6 and Run 9) of Sample 2B and Sample 3B were prepared at weight ratios of Sample 3B (dry milled):Sample 2B (wet milled) as reported in Table IV. Before blending, Sample 3B was slurried in water to a 20 wt. % solids content using a mixer. The Sample 3B slurry was then added to the 20 wt. % solids content aqueous slurry of Sample 2B at amounts sufficient to achieve the ratios reported in Table IV.

TABLE IV

Silica Support Slurries
Sample 3B (Dry Milled):Sample 2B (Wet Milled)

| Run Number | Ex or Comp Ex No. | Weight % Ratio | Weight Ratio |
|---|---|---|---|
| 1 | Ex 1 Part E | 79/21 | 3.75:1 |
| 2 | Ex 1 Part E | 78/22 | 3.50:1 |
| 3 | Ex 1 Part E | 75/25 | 3.00:1 |
| 4 | Ex 1 Part E | 70/30 | 2.25:1 |
| 5 | Ex 1 Part E | 60/40 | 1.50:1 |
| 6 | Ex 1 Part E | 0/100 | 0:1 |
| 7* | Ex 2 | 70/30 | 0.43:1 |
| 8* | Ex 3 | 100/0 | 0:1 |
| 9 | Ex. 1, Part E | 80/20 | 0.25:1 |

*= tray dried

Part F
Preparation of Alternate Silica Support Slurries

Part E was repeated except that Sample 3B (300 m²/g) was replaced with Sample 3A (600 m²/g) and Sample 2B (300 m²/g) was replaced with Sample 2A (600 m²/g). The dry milled/wet milled ratios employed are summarized at Table V and the slurries designated Runs 10 to 12.

TABLE V

Sample 3A (Dry Milled):Sample 2A (Wet Milled)

| Run Number | Weight % Ratio | Weight Ratio |
|---|---|---|
| 10 | 75/25 | 3.00:1 |
| 11 | 60/40 | 1.50:1 |
| 12 | 0/100 | 0:1 |

Part G
Preparation of Clay Slurry

A montmorillonite clay available from Southern Clay, under the trade names, Montmorillonite BP Colloidal Clay, was obtained. This clay has the following properties as summarized at Table VI.

TABLE VI

Chemical Composition of Montmorillonite BF Colloidal Clay

| Component | Weight % |
|---|---|
| $S_iO_2$ | 69.5 |
| $FE_2O_3$ | 4.4 |
| $Al_2O_3$ | 19.0 |
| $M_gO$ | 2.3 |
| $C_aO$ | 1.0 |
| $Na_2O$ | 2.7 |
| $SO_4$ | 0.6 |

Physical Properties

| | |
|---|---|
| Appearance | Tan Powder |
| Apparent Bulk Density | 0.45 g/cc |
| Surface Area | 70 m²/g |
| APS | 1.5 microns |
| Average Pore Diameter | 114 Å |
| Total Pore Volume | 0.20 cc/g |

Part H
Preparation of Silica/Clay Slurry for Spray Drying

Each of the silica slurries of Runs 1 to 6 and 10 to 12 was combined with the clay slurry of Part G in a manner sufficient to control the weight ratio of silica:clay dry solids to be as reported at Table VII. Each slurry was adjusted with acid (sulfuric acid) or base (ammonium hydroxide) to achieve a slurry pH of 7–8.5. The APS of the slurry solids was about 4 to 5 microns, the total dry solids content of the slurry was about 15 to 18 wt. %. The resulting slurries are designated Runs 13 to 21.

Part I
Spray Drying of Silica/Clay Slurry

Each pH adjusted slurry of Runs 13 to 21 was then pumped to a spray dryer to dry the mixture and to form microspheroidal agglomerates. All spray drying is conducted by using a Bowen 3-ft. diameter spray dryer with inlet-outlet temperatures of 350/150° C. and a two-fluid spray nozzle using air at 10–30 psi to atomize the slurry. The air through-put of the Niro is dampened to keep the spray chamber under 7" water vacuum and the slurry is fed at 250–300 cc/min. The product is then collected in the chamber collection pot, located directly under the drying chamber, where the coarsest fraction drops out from air entrainment. Other, smaller fractions go to a cyclone collection pot and the smallest to a baghouse. The chamber material is then screened through 200 to 250 mesh to give the desired APS of 40–55 microns. The Total Volatiles (TV %) at 954.4° C. (1750° F.) of the spray dried product is in the range of 2–20 wt. %, so further drying in a static bed oven at 150–800° C. is then used to lower the total volatiles down to 0.5–5%.

The total yield of material from the spray dryer chamber collection pot and from screening the same is about 15–20 wt. %.

Table VIII below reports silica/clay morphological properties of the resulting agglomerates. The resulting Agglomerate Samples are designated Runs 27 to 35.

EXAMPLE 2
(Tray Dried-Silica/Clay Support-Activator)

65 parts by weight of a silica sample (designated Run 7) prepared in accordance with Example 1, Part E, but containing 30 wt. % wet milled silica hydrogel Sample 2B (prepared in accordance with Example 1, Part B(ii) 300 m²/g) and 70 wt. % dry milled silica powder Sample 3B (prepared in accordance with Example 1, Part C (SA=300 m²/g)), were mixed with 35 parts by weight montmorillonite clay available under the tradename Mineral Colloidal BP from Southern Clay Company.

The mixture (designated Run 22) was made by adding the clay powder to a 10% dry solids content slurry of the silica to bring the total solids content of clay plus silica to 15 wt. %. The slurry was then mixed.

At the solids content employed, the slurry existed as a paste which was spread out on a tray to dry. The paste was then tray dried in a vacuum oven at 204.4° C. (400° F.) for 16 hours. The tray dried sample was crushed and sieved through 200 U.S. mesh screen to yield an average particle size of about 50 microns. A portion of the sieved sample was tested for BET Surface Area and Nitrogen Pore Volume and found to be 215 m²/g and 0.85 cc/g respectively. The resulting tray dried agglomerate sample was designated Run 36.

EXAMPLE 3
(Tray Dried Silica/Clay Support-Activator)

Example 2 was repeated except that the silica sample (designated Run 8) employed was entirely dry milled silica powder (no wet milled silica gel) prepared in accordance with Example 1, Part C.

The surface area and pore volume was analyzed and found to be 224 m²/g. and 0.82 cc/g respectively. The resulting tray dried sample was designated Run 23.

Comparative Example 1
(Spray Dried 100% Clay)

5 parts-by-weight montmorillonite clay available from Southern Clay Company under the tradename Mineral Colloidal BP was mixed with 28 parts-by-weight water. The slurry (designated Run 24C) was the then fed to a Niro Spray Dryer in accordance with Example 1, Part I to make clay microspheres. The resulting product never agglomerated into microspheroids. A very small quantity of material accumulated in the spray dryer chamber collection pot (<5% yield) and the remainder was observed as dust and build-up on the spray dryer wall. After screening, <1 wt. % of the collected sample was in the form of microspheroids with most of the clay being carried over to the cyclone or baghouse as dust. The resulting spray dried clay, designated Run 38C, was unusable and discarded.

Comparative Example 2
(Spray Dried 100% Clay)

Comparative Example 1 was repeated except that the clay employed was montmorillonite available under the tradename Gel White from Southern Clay Products. The slurry to be spray dried is designated Run 25C. Only 1.3 wt. % of the starting clay was recovered as agglomerates that accumulated in the spray dryer chamber collection pot.

The crude agglomerated product was screen through 200 mesh screen to remove large agglomerates and give an APS of 40–55 microns (based on Malvern particle size analysis). This product has a pore volume of 0.21 cc/g and the surface area is 72 m$^2$/g.

The resulting spray dried clay powder was designated Run 39C.

Comparative Example 3
(100% Spray Dried Silica)

Example 1, Part I was repeated except that the slurry (designated Run 26C) that was spray dried contained only silica, and the silica was derived from Run 9, i.e., a mixture containing: 80 wt. % dry milled silica powder Sample 3B and 20 wt. % wet milled silica hydrogel Sample 2B. No clay was employed. The resulting spray dried product was a microspheroidal agglomerate with a pore volume of 1.69 cc/g, a surface area of 277 m$^2$/g and an average particle size (APS) of 47 microns. The resulting spray dried product was designated Run 40C.

EXAMPLE 4
Preparation of Tridentate Catalyst System

The support-activators of Runs 27 to 34 were subjected to various calcination temperatures and times as indicated at Table IX to control the total volatiles thereof. Each designated calcined support-activator was then added to 25 ml of toluene along with sufficient tridentate transition metal pre-catalyst, i.e., 2,6 bis (2,4,6-trimethylarylimino) pyridyl iron dichloride, to provide the ratio of micromoles of pre-catalyst per gram of support-activator reported at Table IX Runs 41 to 93 and 101 to 104. Triisobutyl aluminum (1M in toluene solution) was also added to the toluene in amounts sufficient to give the reported micromoles of triisobutylaluminum per gram of support-activator when employed.

Comparative Example 4

Example 4 was repeated two additional times and designated Runs 94C and 95C except that the silica/clay support activator was replaced with colloidal (<1 micron particle size) undehydrated and non-spray dried montmorillonite available from Aldrich under the tradename K10 Montmorillonite (Run 95C) and undehydrated non-spray dried Mineral Colloidal BP (Run 94C) (as described in Example 1, Part G). The ratios of triisobutylaluminum and Fe-pre-catalyst are summarized at Table IX at Runs 95C and 94C respectively.

Comparative Example 5

Example 4 was repeated except that the silica-clay agglomerate was replaced with an unagglomerated physical blend of Mineral Colloidal (<1 micron particle size) BP montmorillonite clay and silica hydrogel powder (Sample 4) prepared by the following procedure: A base silica hydrogel Sample 1B (SA 300 m$^2$/g) was wet milled to an APS of 15–25 microns to form a 20 wt. % solids slurry in water. The silica hydrogel was then spray dried and the fraction of fines contained therein was collected by air classification and designated Sample 4. Sample 4 had an APS of 10 microns, a Nitrogen pore volume of 1.6 cc/g and a surface area of 300 m$^2$/g. Pre-catalyst was then added in accordance with Example 4 and the resulting mixtures tested in accordance with Example 6 as Runs 96C and 97C. The amounts of triisobutylaluminum and Fe-pre-catalyst ratios are reported at Table IX.

Comparative Example 6

Example 4 was repeated except that the Silica/Clay support activator was replaced with the silica agglomerate prepared in accordance with Run 40C. The amounts of triisobutylaluminum and Fe-pre-catalyst are reported at Runs 98C, 99C and 100C.

EXAMPLE 5

Example 4 was repeated except that the Silica/Clay support-activator was replaced with the tray dried samples of Runs 36 and 37 respectively. The amounts and ratios of triisobutylaluminum and Fe-pre-catalyst employed are summarized at Table IX Runs 105 and 106.

EXAMPLE 6
Polymerization Method

In the slurry polymerization experiments of this Example, unless otherwise indicated, a 2-liter Zipperclave (Autoclave Engineers, Inc.) reactor was rendered inert by heating under vacuum at 70° C. for 90 minutes. A reactor charge consisting of a mixture of 350 ml of dry, degassed heptane and 200 micromoles of triisobutyl aluminum scavenger dissolved in toluene and, separately, 0.3 to 0.5 ml liters (depending on catalyst activity) of a slurry of triisobutylaluminum, pre-catalyst and support-activator derived from one of Runs 41 to 106 of Table IX were injected into the reactor. While the reactor contents were stirred at 500 rpm, ethylene and hydrogen were quickly admitted to the reactor until a final reactor pressure of 200 psig was attained. This pressure comprised a hydrogen/ethylene partial pressure ratio of 0.05. The polymerization temperature was 70° C. which was maintained by a circulating water bath. Ethylene was supplied on demand via a mass flow controller to maintain the reactor pressure of 200 psig. After 60 minutes, the ethylene feed was stopped and the reactor cooled to room temperature and vented. The polymer was filtered and washed with methanol and acetone to deactivate any residual catalyst, filtered and dried in a vacuum oven for at least three hours to constant weight. After drying, the polymer was weighed to calculate catalyst activity and a sample of dried polymer was used to determine apparent bulk density according to the procedure of ASTM 1895.

The results of each polymerization are summarized at Table IX Runs 41 to 106. Column 7 depicts the amount (mmole) of triisobutylaluminum (AlBu$_3$) used with respect to the amount (grams) of support-activator material during the active catalyst preparation. Column 8 depicts the amount of Fe pre-catalyst and the amount (grams) of support-activator used during the active catalyst preparation. Column 11 depicts the bulk density of the resulting polyethylene (PE) product (determined by ASTM 1895 method). The catalyst performance data include: (i) catalyst activity data (Column 9) (KgPE/gCat-h) which is based on the total amount (grams) of polyethylene product produced per gram of total catalyst used per hour; and (ii) activity as a function of Fe concentration. Thus, Column 10 represents gPE×10$^{-6}$/gFe-h which is related to the total amount (gram) of polyethylene product produced per gram of Fe metal present in the pre-catalyst per hour. More specifically, a reported value of 1 in Column 9 indicates 1,000,000 g of PE is produced per gram of Fe per hour. The particle size distributions of the resulting polymer particles produced by Runs 45, 56, 67 (spray dried support-activator), 105 and 106 (tray dried support-activator), 94C (100% clay) and 96C (non-agglomerated physical mixture of silica and clay) are provided at Table X.

Discussion of Results

Comparing Runs 105 and 106 (tray dried) to Runs 62 to 65 (spray dried), it can be seen that spray dried agglomerates exhibit an activity between 6.5 and 8 at AlBu$_3$ contents below 1 and between 5.5 and 8 for tray dried. However, it is believed that because the tray dried support-agglomerates of Runs 105 and 106 are non-uniform in shape and size, they produce a wide distribution in the polymer particle sizes (see Table X). In contrast, spray dried Runs 45, 56 and 67 produce no polymer particles between 0 and 250 micron diameters. This reduces polymer fines and increases the ease with which the polymer can be handled. Similar considerations apply to the polymer of Run 94C which employs no silica and consequently was not spray dried because the product disintegrates into fines (see Run 38C). The resulting morphology of this comparative clay-only support is believed to be responsible for the poor polymer morphology.

Comparing Run 96C (80:20 silica:clay physical admixture) with Run 102 (80:20 spray dried agglomerate), it can be seen that the activity of Run 102 is almost 4 times greater than that of Run 96C. Thus, the configuration as an agglomerate is considered critical to the present invention relative to merely mixing silica particles with clay particles in the polymerization zone or during activation. The physical blend of support-activator components of Run 96C also yields a poor polymer morphology (see Table X Run 96C).

Comparing Runs 94C and 95C (100% clay) with Runs 41 to 45 (80:20 silica:clay), it can be seen that very low activities (2.92 and 0 respectively) are associated with a clay-only support versus activities of 5 to 10.3 for silica-clay support-activators.

Similar results are obtained by silica only support-activators. For example compare Runs 98C, 99C and 100C to Runs 101 to 104 wherein the activities of the later are more than double those of the comparative runs.

EXAMPLE 7

Cross Section Scanning Electron Micrograph (SEM)

A small portion of the sample from Run 30 was dispersed into an apoxy resin and allowed to cure overnight in a glove box containing Argon. Once the epoxy cured, the mounted sample was polished until the internal matrix of several particles was exposed and a 0.05 um smooth surface was achieved.

Figure 2:
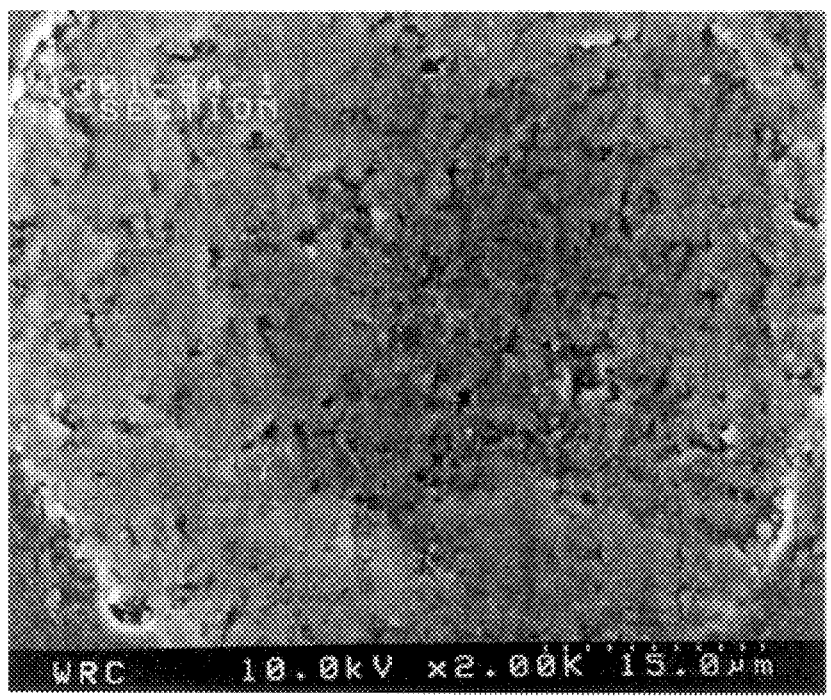
FIG. 2 is a scanning electron micrograph of a cross-section of an agglomerate particle prepared in accordance with Example 1, Run No. 4. The photograph was taken with a scanning electron microscope and represents 2000-fold magnification of the actual agglomerate particle.
Figure 3:
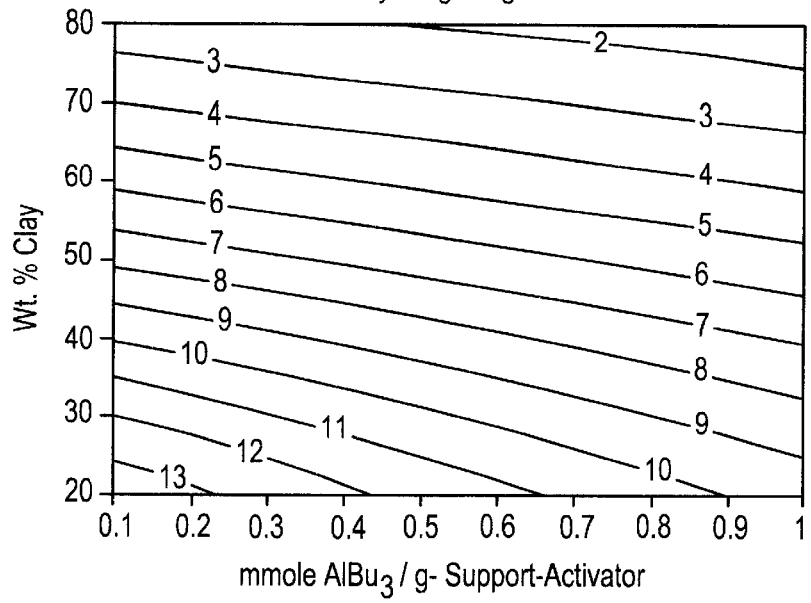
Figure 4:
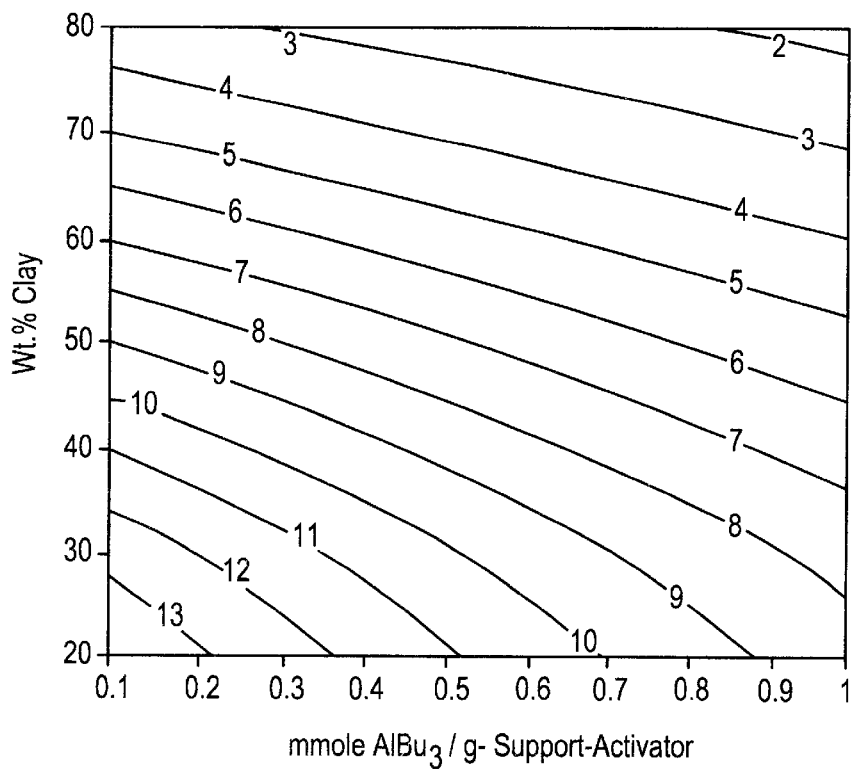
Figure 5:
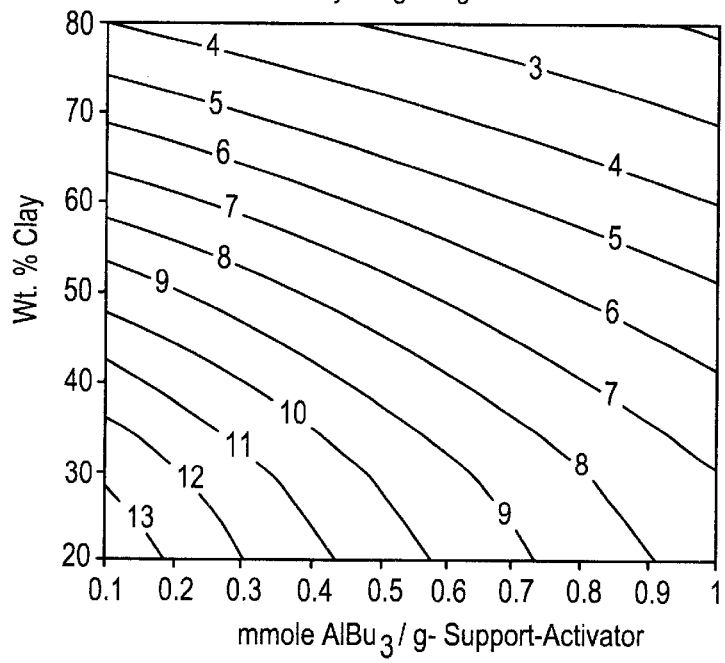
Figure 6:
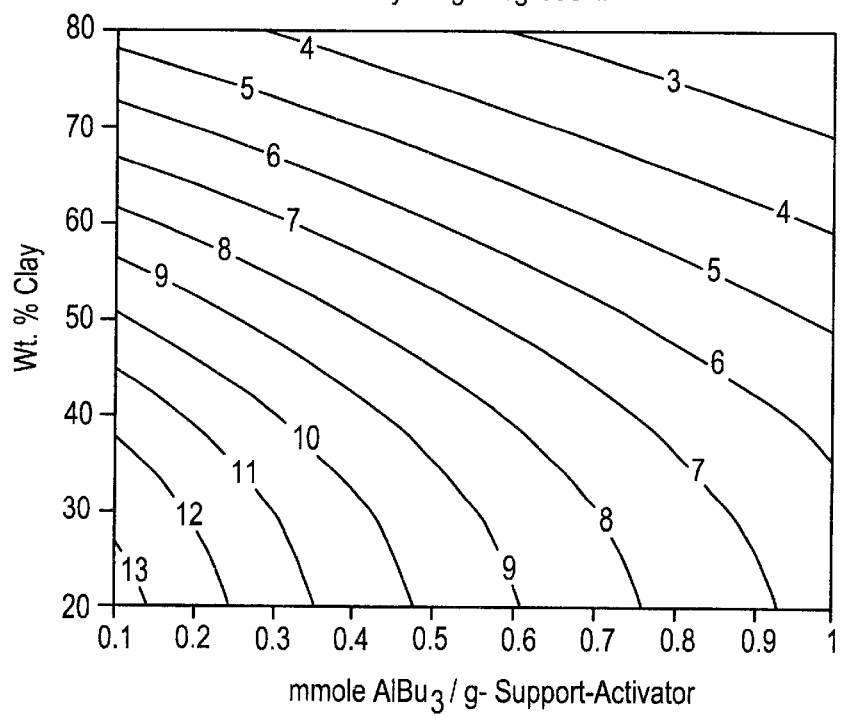
Figure 7:
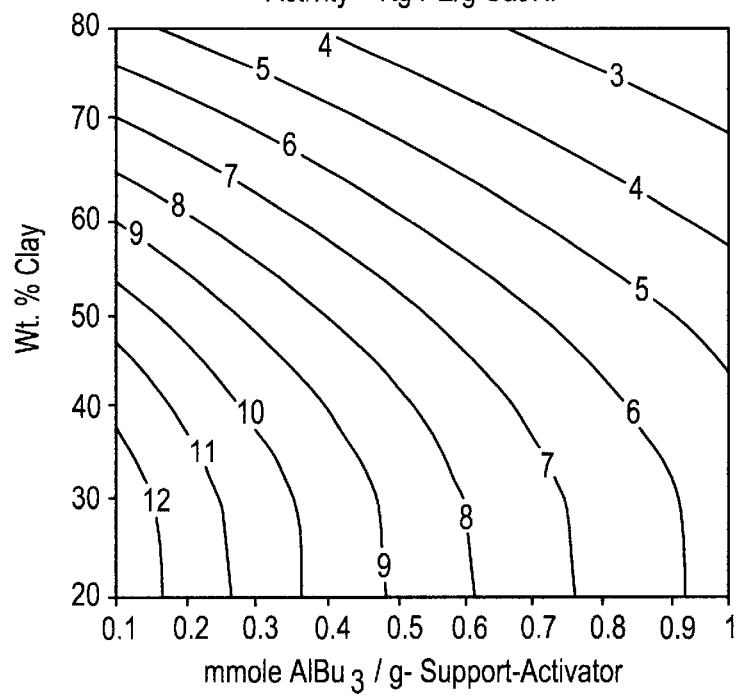
Figure 8:
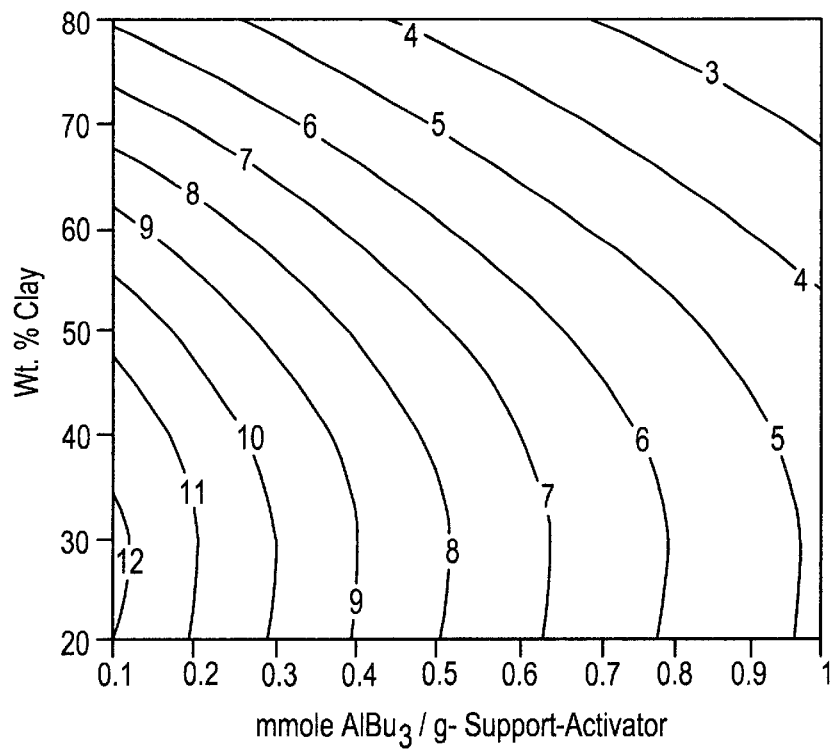
Figure 9:
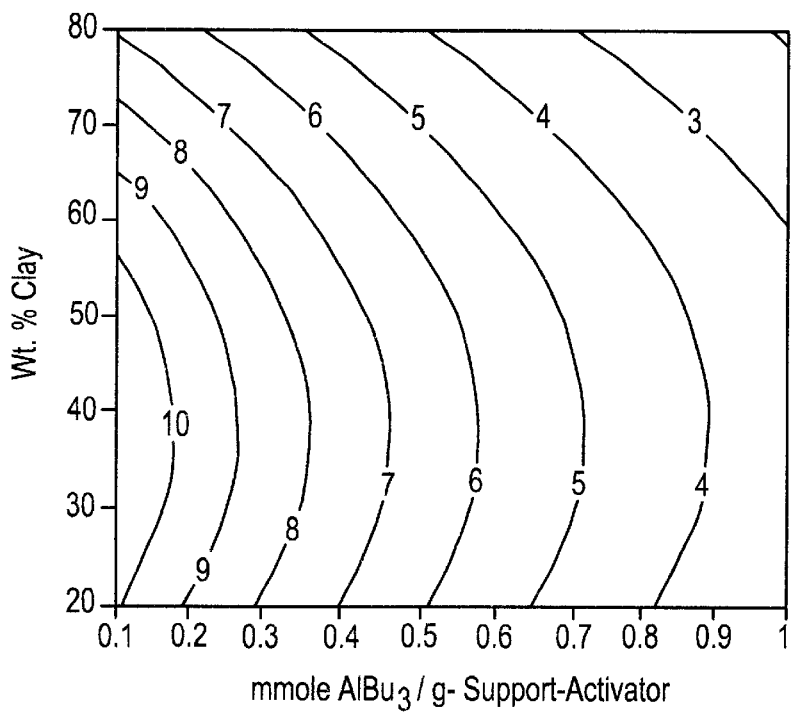
Figure 10:
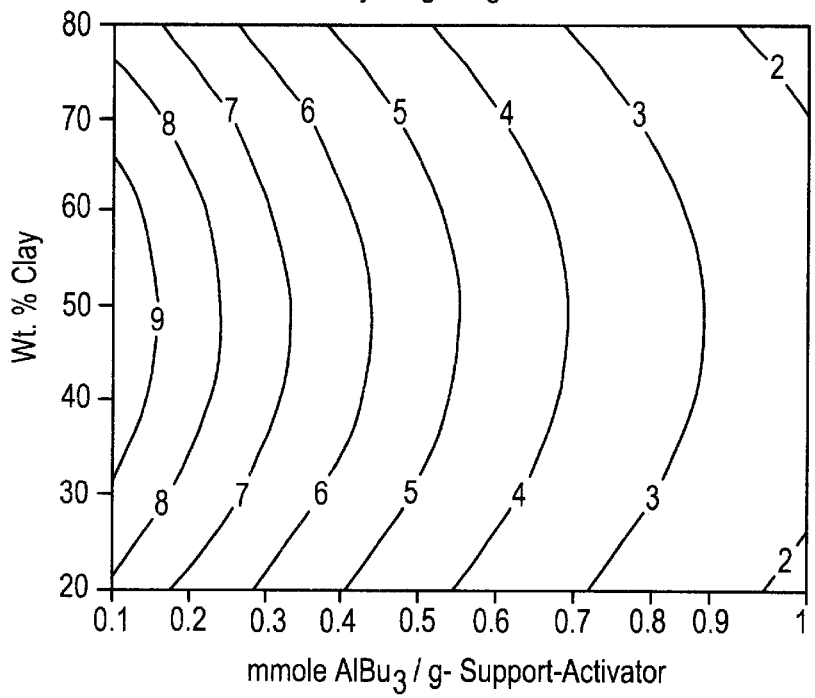
Figure 11:
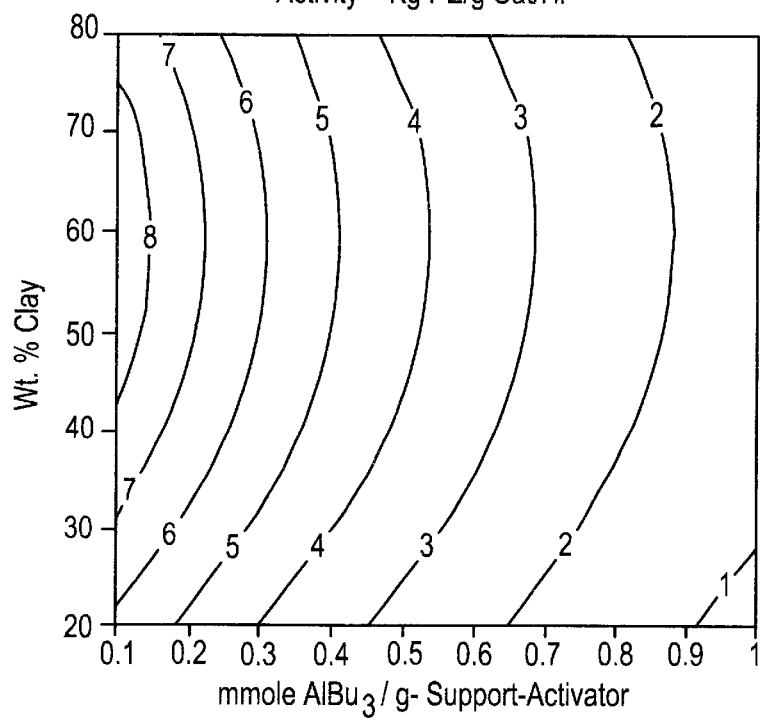
Figure 12:
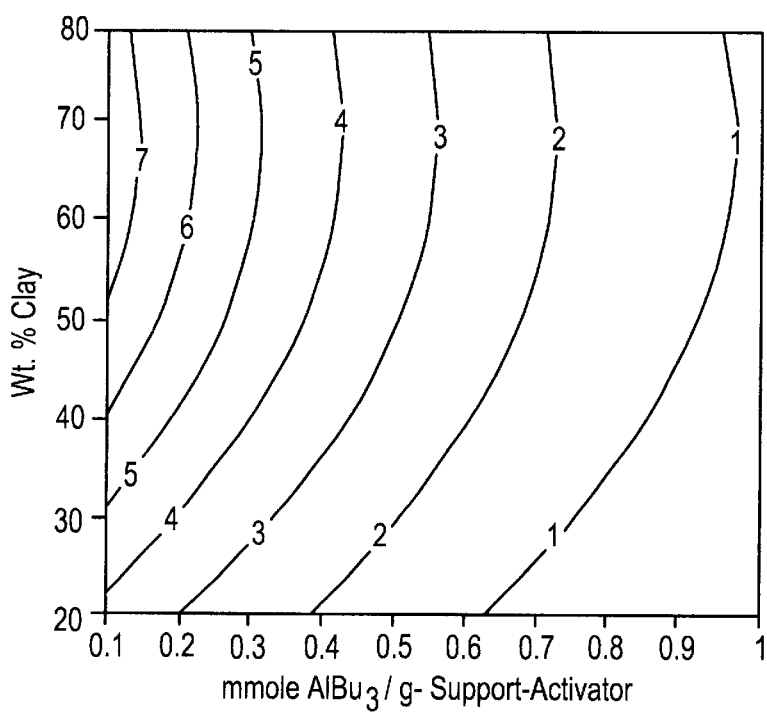
Figure 13:
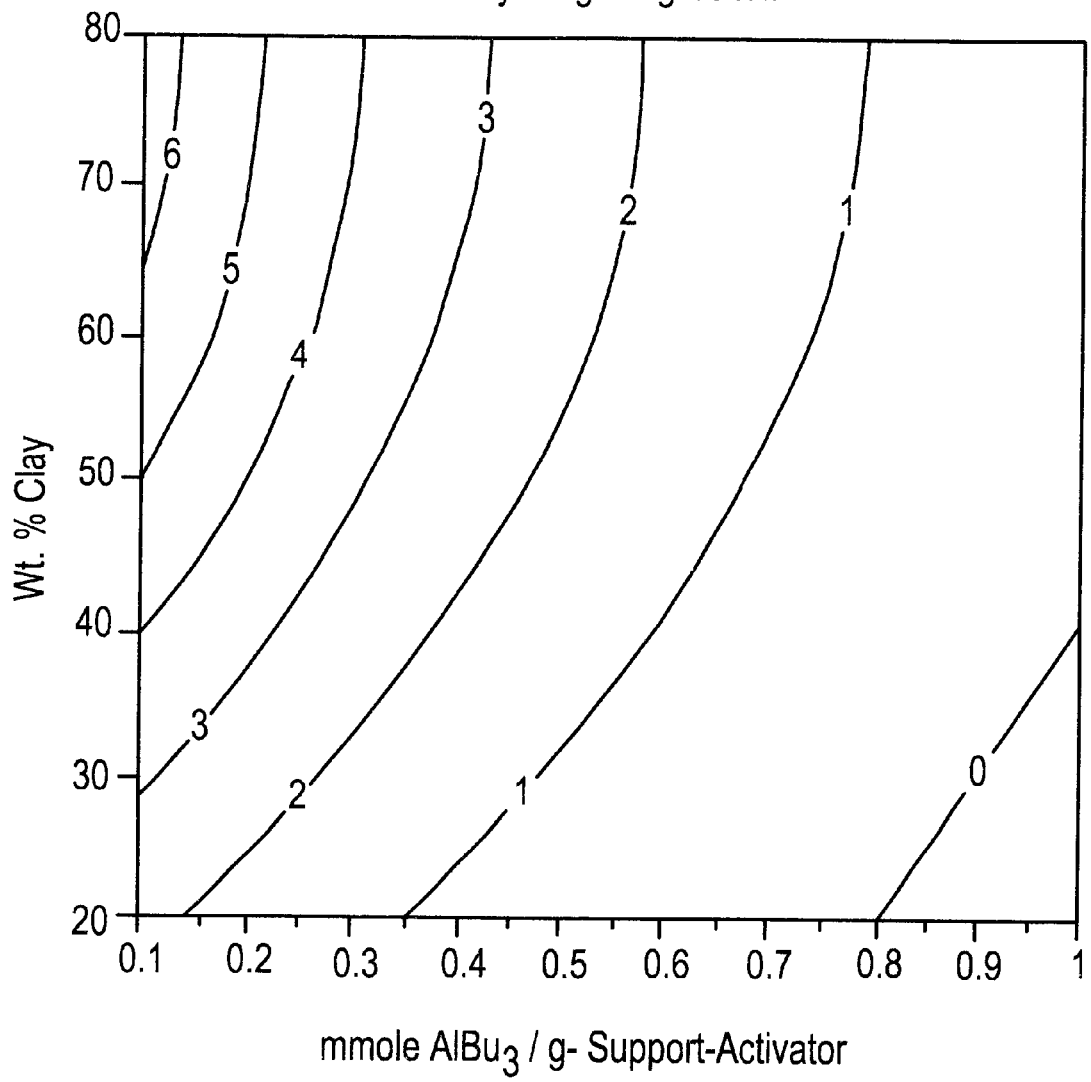

A small portion of the polished sample block was placed on a SEM stub in a glove box under Argon. Once the sample is mounted, it is placed into a jar in the glove box. The sealed jar containing the sample was then placed in a glove bag that has been placed over the opening of the SEM and is purged with Argon. Once the bag has been flushed with Argon three times, the sample jar is opened and the sample is placed into the SEM for analysis. Images are obtained on the dry uncoated sample using a Hitachi S4500 scanning electron microscope using a beam accelerating voltage of 1.0 kV. The results are shown at FIGS. 1 and 2.

EXAMPLE 8

Activity Response Contour Map

The data based on the 300 m$^2$/g SA support-activator Samples 2B and 3B from Table IX conducted in accordance with Example 6, were categorized by their 4 hour calcination temperatures and subjected to a Hyper-Greco-Latin Square (HGLS) experimental design algorithm. Four variables were examined, namely, (1) triisobutylaluminum loading, (2) wt. % clay in support-activator, (3) pre-catalyst loading, and (4) calcination temperature of support-activator. For each of these variables, a four-factor, four-level HGLS Design as shown by Table XI was created. From the 34 available data points (16 from the design and 18 extra data points, all reported at Table IX) and a 92% model coefficient, the average catalyst activities were then calculated in accordance with the following equations:

$$\text{Ln. (CA)}=1.97260-1.03944*(\text{AlBu}_3-0.6)-0.00472*(\text{Clay}-45)-0.0014556*(\text{Dry}-370)-0.00023776*(\text{Clay}-45)*(\text{Clay}-45)-0.000003075*(\text{Dry}-370)*(\text{Dry}-370)-0.0019575*(\text{AlBu}_3-0.6)*(\text{Dry}-370)=0.00004975*(\text{Clay}-45)*(\text{Dry}-370) \quad \text{Eq. 2}$$

and $$\text{Ln. Cat Activity}=(e^{Ln.(CA)})-1 \quad \text{Eq. 3}$$

wherein:
Ln.=natural log
Dry=4 hour support-activator Calcination Temperature ° C.
Clay=wt. % clay in support-activator
AlBu$_3$=m moles/g support-activator employed These calculated activities were then employed to make the activity contour maps of FIGS. 3 to 13.

The number on each line of each plot represents the catalyst activity, in units as described above, that would be expected at the illustrated combination of wt. % clay and triisobutyl aluminum content.

Comparing FIGS. 3 to 14, it can be seen that catalyst activities as high as 13 can be achieved at very low AlBu$_3$ contents between 0.1 and 0.2 and clay contents in the support-activator between 20 and 30 wt. % when the support-activator is uncalcined or calcined up to 200° C. As the calcination temperature increases from 250 to 800° C., the highest activities drop below 13 and the clay content of the support-activator can be progressively increased in association with decreases in the AlBu$_3$ content and vice-versa to maintain a given activity. It will be further observed that the activity consistently decreases as the AlBu$_3$ content increases up to 1.

As a general proposition therefore, clay content in the support-activator and calcination temperature thereof are believed to be directly proportional to catalyst activity at increasingly higher calcination temperatures. However, the relationship between clay content and activity becomes inversely proportional at a given calcination temperature. Also the AlBu$_3$ content is inversely proportional to catalyst activity at all tested calcination temperatures at least up to a AlBu$_3$ content of 1. Moreover, clay content and AlBu$_3$ are generally inversely proportional over a segment of a plot; e.g., at high. clay contents and directly proportional over another segment of the same activity plot. This transition from direct to inverse proportionality to maintain a given activity occurs at higher clay contents for higher calcination temperatures.

EXAMPLE 9

Example 4 was repeated using the support-activator of Run 33 except that the reaction mixture of support-activator pre-catalyst and toluene was agitated with an orbital shaker for 24 hours. The slurry was then filtered, washed two times with 20 ml toluene, two times with 20 ml of heptane and dried in vacuo. The resulting powdered catalyst system was then employed for polymerization of ethylene in accordance with Example 6 by reslurry of the powder into toluene prior to injection into the polymerization reactor. The results are summarized at Run 107. The polymer product had a Mw of 358,100 an Mn of 37,600 and an Mw/Mn of 9.5.

TABLE VII

Spray Drying or Tray Drying Slurry and Conditions

| Run No. | Ex. No. or Comp. Ex No. | Source of Silica (Run Nos.) | Silica:Clay Dry Solids Ratio (w/w) |
|---|---|---|---|
| 13 | Ex 1 Pt H | 1 | 95:5 |
| 14 | Ex 1 Pt H | 2 | 90:10 |
| 15 | Ex 1 Pt H | 3 | 80:20 |
| 16 | Ex 1 Pt H | 4 | 65:35 |
| 17 | Ex 1 Pt H | 5 | 50:50 |
| 18 | Ex 1 Pt H | 6 | 25:75 |
| 19 | Ex 1 Pt H | 10 | 80:20 |
| 20 | Ex 1 Pt H | 11 | 50:50 |
| 21 | Ex 1 Pt H | 12 | 25:75 |
| 22 | Ex 2 | 7 | 65:35 |
| 23 | Ex 3 | 8 | 65:35 |
| 24C | Comp Ex 1 | none | 0:1 |
| 25C | Comp Ex 2 | none | 0:1 |
| 26C | Comp Ex 3 | 9 | 1:0 |

TABLE VIII

Spray Dried Silica/Clay Support-Activator Product Properties

| | 1 | 2 Slurry Source | 3 | 4 Agglomerate Properties | 5 | 6 | 7 |
|---|---|---|---|---|---|---|---|
| Run No. | Ex. No. or Comp Ex. | from Table VII (Run No.) | Silica/Clay (Weight Ratio) | APS (microns) | SA ($m^2/g$) | Pore Vol. (cc/g) | Drying Procedure |
| 27 | Ex 1 | 13 | 95:5 | 45 | 275 | 1.65 | Spray |
| 28 | Ex 1 | 14 | 90:10 | 45 | 268 | 1.61 | Spray |
| 29 | Ex 1 | 15 | 80:20 | 45 | 251 | 1.48 | Spray |
| 30 | Ex 1 | 16 | 65:35 | 45 | 213 | 1.28 | Spray |
| 31 | Ex 1 | 17 | 50:50 | 45 | 185 | 1.04 | Spray |
| 32 | Ex 1 | 18 | 25:75 | 45 | 160 | 0.64 | Spray |
| *33 | Ex 1 | 19 | 80:20 | 45 | 494 | 1.16 | Spray |
| *34 | Ex 1 | 20 | 50:50 | 45 | 322 | 0.83 | Spray |
| *35 | Ex 1 | 21 | 25:75 | 45 | 192 | 0.54 | Spray |
| 36 | Ex 2 | 22 | 65:35 | 45 | 215 | 0.85 | Tray |
| 37 | Ex 3 | 23 | 65:35 | 45 | 224 | 0.82 | Tray |
| **38C | Comp Ex 1 | 24C | 0:1 | N/A | N/A | N/A | Spray |
| 39C | Comp Ex 2 | 25C | 0:1 | 40–55 | 72 | 0.21 | Spray |
| 40C | Comp Ex 3 | 26C | 1:0 | 47 | 277 | 1.68 | Spray |

*= Made from 600 $m^2/g$ silica  
**= Discarded  
APS = Average Particle Size  
PSD = Particle Size Distribution based on D10, D50, D90 percentile

TABLE IX

| 1 Run No. | 2 Support-Activator Source (Run No.) | 3 Corresponding Ex or Comp Ex No. | 4 Silica:Clay (Weight Ratio) | 5 Calcination Temp °C. | 6 Calcination Time (hr) | 7 AlBu$_3$ mmol/g-Support-Activator | 8 Fe Pre-Cat $\mu$mol/g Support-Activator | 9 Cat Activity KgPE/gCat-h | 10 Fe Activity gPE × $10^{-6}$/gFe-h | 11 B. D. g/cc |
|---|---|---|---|---|---|---|---|---|---|---|
| 41 | 27 | Ex 4 | 95:5 | UC | N/A | 1 | 57.3 | 5.13 | 1.60 | 0.37 |
| 42 | 28 | Ex 4 | 90:10 | UC | N/A | 1 | 57.3 | 7.75 | 2.42 | 0.34 |
| 43 | 29 | Ex 4 | 80:20 | UC | N/A | 1 | 73.8 | 10.11 | 2.37 | 0.41 |
| 44 | 29 | Ex 4 | 80:20 | UC | N/A | 1 | 57.3 | 10.26 | 3.20 | 0.41 |
| 45 | 29 | Ex 4 | 80:20 | UC | N/A | 1.2 | 38.2 | 8.87 | 4.29 | 0.46 |
| 46 | 29 | Ex 4 | 80:20 | 150 | 4 | 0.4 | 76.3 | 7.86 | 1.84 | 0.42 |
| 47 | 29 | Ex 4 | 80:20 | 250 | 4 | 1 | 57.3 | 0 | 0.00 | NA |

TABLE IX-continued

| Run No. | 2 Support-Activator Source (Run No.) | 3 Corresponding Ex or Comp Ex No. | 4 Silica:Clay (Weight Ratio) | 5 Calcination Temp °C. | 6 Calcination Time (hr) | 7 AlBu$_3$ mmol/g-Support-Activator | 8 Fe Pre-Cat μmol/g-Support-Activator | 9 Cat Activity KgPE/gCat-h | 10 Fe Activity gPE × 10$^{-6}$/gFe-h | 11 B. D. g/cc |
|---|---|---|---|---|---|---|---|---|---|---|
| 48 | 29 | Ex 4 | 80:20 | 250 | 4 | 0.7 | 57.3 | 9.93 | 3.11 | 0.40 |
| 49 | 29 | Ex 4 | 80:20 | 250 | 4 | 0.6 | 57.3 | 9.85 | 3.09 | 0.39 |
| 50 | 29 | Ex 4 | 80:20 | 250 | 4 | 0.4 | 57.3 | 8.78 | 2.74 | 0.42 |
| 51 | 29 | Ex 4 | 80:20 | 250 | 4 | 0.3 | 57.3 | 9.6 | 3.00 | 0.43 |
| 52 | 29 | Ex 4 | 80:20 | 250 | 4 | 0.3 | 38.1 | 7.14 | 3.35 | 0.42 |
| 53 | 29 | Ex 4 | 80:20 | 250 | 4 | 0.2 | 57.3 | 9.28 | 3.00 | 0.44 |
| 54 | 29 | Ex 4 | 80:20 | 250 | 4 | 0.1 | 57.3 | 7 | 2.19 | 0.44 |
| 55 | 29 | Ex 4 | 80:20 | 500 | 4 | 0.1 | 95.4 | 7.52 | 1.41 | 0.46 |
| 56 | 29 | Ex 4 | 80:20 | 500 | 4 | 0.3 | 57.3 | 8.68 | 2.71 | 0.44 |
| 57 | 29 | Ex 4 | 80:20 | 800 | 4 | 0.1 | 57.3 | 1.72 | 0.54 | NA |
| 58 | 29 | Ex 4 | 80:20 | 800 | 4 | 0.12 | 57.3 | 2.35 | 0.73 | 0.29 |
| 59 | 29 | Ex 4 | 80:20 | 800 | 4 | 0.8 | 57.3 | 0.04 | 0.01 | NA |
| 60 | 30 | Ex 4 | 65:35 | UC | N/A | 0.5 | 57.3 | 9.7 | 3.03 | 0.34 |
| 61 | 30 | Ex 4 | 65:35 | UC | N/A | 0.4 | 95.4 | 8.54 | 1.60 | 0.38 |
| 62 | 30 | Ex 4 | 65:35 | 450 | 4 | 1.2 | 57.3 | 1.66 | 0.78 | NA |
| 63 | 30 | Ex 4 | 65:35 | 150 | 4 | 0.6 | 57.3 | 6.7 | 2.10 | 0.38 |
| 64 | 30 | Ex 4 | 65:35 | 450 | 4 | 0.3 | 57.3 | 7.1 | 2.22 | 0.41 |
| 65 | 30 | Ex 4 | 65:35 | 150 | 4 | 0.12 | 57.3 | 7.73 | 2.42 | 0.43 |
| 66 | 30 | Ex 4 | 65:35 | 500 | 4 | 0.30 | 57.3 | 9.38 | 2.93 | 0.41 |
| 67 | 30 | Ex 4 | 65:35 | 500 | 4 | 0.12 | 57.3 | 11.4 | 3.57 | 0.42 |
| 68 | 30 | Ex 4 | 65:35 | 500 | 4 | 0.10 | 57.3 | 8.87 | 2.78 | 0.43 |
| 69 | 30 | Ex 4 | 65:35 | 500 | 4 | 0.08 | 57.3 | 5.27 | 1.65 | 0.41 |
| 70 | 30 | Ex 4 | 65:35 | 500 | 4 | 0.80 | 38.2 | 2.18 | 0.68 | 0.38 |
| 71 | 30 | Ex 4 | 65:35 | 800 | 4 | 0.10 | 76.3 | 3.02 | 0.71 | 0.35 |
| 72 | 31 | Ex 4 | 50:50 | UC | N/A | 0.1 | 57.3 | 8.51 | 2.66 | 0.37 |
| 73 | 31 | Ex 4 | 50:50 | 150 | 4 | 0.2 | 57.3 | 6.48 | 2.00 | 0.40 |
| 74 | 31 | Ex 4 | 50:50 | 150 | 4 | 0.3 | 57.3 | 7.52 | 2.35 | 0.38 |
| 75 | 31 | Ex 4 | 50:50 | 150 | 4 | 0.4 | 57.3 | 41.04 | 3.45 | 0.41 |
| 76 | 31 | Ex 4 | 50:50 | 450 | 4 | 0.8 | 95.4 | 6.54 | 1.23 | 0.44 |
| 77 | 31 | Ex 4 | 50:50 | 500 | 4 | 0.12 | 57.3 | 10.58 | 3.31 | 0.4 |
| 78 | 31 | Ex 4 | 50:50 | 500 | 4 | 0.1 | 57.3 | 6.53 | 2.04 | 0.38 |
| 79 | 31 | Ex 4 | 50:50 | 500 | 4 | 1.2 | 76.3 | 1.44 | 0.27 | NA |
| 80 | 31 | Ex 4 | 50:50 | 800 | 4 | 0.1 | 57.3 | 2.35 | 0.73 | 0.29 |
| 81 | 31 | Ex 4 | 50:50 | 800 | 4 | 0.4 | 38.2 | 2.06 | 0.97 | 0.31 |
| 82 | 32 | Ex 4 | 25:75 | UC | N/A | 0.8 | 57.3 | 1.45 | 0.45 | NA |
| 83 | 32 | Ex 4 | 25:75 | UC | N/A | 0.8 | 76.3 | 1.77 | 0.42 | 0.27 |
| 84 | 32 | Ex 4 | 25:75 | UC | N/A | 1.2 | 57.3 | 2.77 | 0.87 | 0.34 |
| 85 | 32 | Ex 4 | 25:75 | UC | N/A | 1.4 | 57.3 | 2.77 | 0.87 | 0.32 |
| 86 | 32 | Ex 4 | 25:75 | UC | N/A | 0.5 | 57.3 | 1.22 | 0.38 | NA |
| 87 | 32 | Ex 4 | 25:75 | 150 | 4 | 0.1 | 38.2 | 6.11 | 2.87 | 0.38 |
| 88 | 32 | Ex 4 | 25:75 | 250 | 4 | 0.4 | 57.3 | 2.67 | 0.83 | 0.32 |
| 89 | 32 | Ex 4 | 25:75 | 250 | 4 | 0.3 | 57.3 | 2.1 | 0.65 | NA |
| 90 | 32 | Ex 4 | 25:75 | 250 | 4 | 0.2 | 57.3 | 5.5 | 1.70 | 0.38 |
| 91 | 32 | Ex 4 | 25:75 | 250 | 4 | 0.1 | 57.3 | 6.84 | 2.10 | 0.40 |
| 92 | 32 | Ex 4 | 25:75 | 500 | 4 | 0.4 | 57.3 | 5.97 | 1.87 | 0.35 |
| 93 | 32 | Ex 3 | 25:75 | 800 | 4 | 1.2 | 95.4 | 0 | 0.00 | NA |
| 94C | Ex 1, PtG | Comp Ex 4 | 0:1 | UC | N/A | 0.5 | 57.3 | 2.92 | 0.91 | 0.31 |
| 95C | Comp Ex 4 | Comp Ex 4 | 0:1 | UC | N/A | 1.2 | 57.3 | 0 | 0 | NA |
| **96C | Comp Ex 5 | Comp Ex 5 | 80:20 | UC | N/A | 0.8 | 57.3 | 3.94 | 1.20 | 0.36 |
| **97C | 39C | Comp Ex 2 | 0:1 | 250 | 4 | 0 | 57.3 | 0.26 | 0.08 | NA |
| 98C | 40C | Comp Ex 6 | 1:0 | UC | N/A | 1 | 57.3 | 3.62 | 1.13 | 0.30 |
| 99C | 40C | Comp Ex 6 | 1:0 | 250 | 4 | 0.5 | 57.3 | 4.21 | 1.32 | 0.37 |
| 100C | 40C | Comp Ex 6 | 1:0 | 250 | 4 | 0.3 | 57.3 | 3.55 | 1.11 | 0.38 |
| 101 | 33 | Ex 3 | 80:20 | 250 | 4 | 0 | 57.3 | 9.98 | 3.12 | 0.43 |
| 102 | 33 | Ex 3 | 80:20 | 250 | 4 | 0.3 | 57.3 | 11.05 | 3.45 | 0.41 |
| 103 | 34 | Ex 3 | 50:50 | 250 | 4 | 0 | 57.3 | 14.69 | 4.59 | 0.41 |
| 104 | 34 | Ex 3 | 50:50 | 250 | 4 | 0 | 38.2 | 8.11 | 3.81 | 0.37 |
| 105* | 36 | Ex 5 | 65:35 | 250 | 4 | 0 | 57.3 | 5.89 | 1.84 | .37 |
| 106* | 37 | Ex 5 | 65:35 | 250 | 4 | 0 | 57.3 | 7.74 | 2.44 | .37 |
| 107 | 33 | Ex 9 | 80:20 | 250 | 4 | 0 | 57.3 | 9.47 | 2.98 | .43 |

UC = uncalcined
N/A - not applicable
*= Tray Dried
**= Non-Agglomerated physical blend

TABLE X

| Run No. | Clay (Wt. % in Support-Activator) | Polymer Particle Size Distribution (Microns) | | | | | | |
|---|---|---|---|---|---|---|---|---|
| | | 0–75 (Wt. %) | 75–150 (Wt. %) | 150–250 (Wt. %) | 250–500 (Wt. %) | 500–850 (Wt. %) | 850–2000 (Wt. %) | >2000 (Wt. %) |
| +45* | 20 | 0 | 0 | 0 | 12.3 | 70 | 17.2 | 0.1 |
| 56* | 20 | 0 | 0 | 0 | 14.4 | 80 | 4.2 | 0 |
| 67* | 35 | 0 | 0 | 0 | 2.6 | 29 | 68.9 | 0 |
| 94C | 100 | 7.0 | 19.6 | 23.4 | 31.2 | 11.4 | 3.8 | 7.2 |
| 96C*** | 20 | 7.7 | 32.3 | 34 | 15 | 7.3 | 4.5 | 2 |
| 105** | 35 | 3.2 | 4.8 | 8 | 24.2 | 41.5 | 18.2 | 0 |
| 106** | 35 | 4.5 | 5.8 | 8.7 | 23.5 | 37.2 | 20.4 | 0 |

\* = Spray Dried
\*\* = Tray Dried
\*\*\* = Physical Mixture
+= Polymer has Mw = 348,200, Mn = 34,700 and Mw/Mn = 10.0

TABLE XI

| AlBu$_3$ (mmol/g) | | | | |
|---|---|---|---|---|
| 1.2 | Fe = 38.2 μmol RT | Fe = 52.3 μmol 150° C. | Fe = 76.3 μmol 500° C. | Fe = 95.4 μmol 800° C. |
| 0.8 | Fe = 52.3 μmol 800° C. | Fe = 38.2 μmol 500° C. | Fe = 95.4 μmol 150° C. | Fe = 76.3 μmol RT |
| 0.4 | Fe = 76.3 μmol 150° C. | Fe = 95.4 μmol RT | Fe = 38.2 μmol 800° C. | Fe = 52.3 μmol 500° C. |
| 0.1 | Fe = 95.4 μmol 500° C. | Fe = 76.3 μmol 800° C. | Fe = 52.3 μmol RT | Fe = 38.2 μmol 150° C. |
| | 20% Clay | 35% Clay | 50% Clay | 75% Clay |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

What is claimed is:

1. A coordinating catalyst system capable of polymerizing olefins comprising:
   (I) as a pre-catalyst, at least one non-metallocene, non-constrained geometry, bidentate ligand containing transition metal compound or tridentate ligand containing transition metal compound capable of (A) being activated upon contact with the catalyst support-activator agglomerate of (II) or (B) being converted, upon contact with an organometallic compound, to an intermediate capable of being activated upon contact with the catalyst support-activator agglomerate of (II), wherein the transition metal is at least one member selected from Groups 3 to 10 of the Periodic table; in intimate contact with
   (II) catalyst support-activator agglomerate comprising a composite of (A) at least one inorganic oxide component selected from SiO$_2$, Al$_2$O$_3$, MgO, AlPO$_4$, TiO$_2$, ZrO$_2$, and Cr$_2$O$_3$ and (B) at least one ion containing layered material having interspaces between the layers and sufficient Lewis acidity, when present within the catalyst support-activator agglomerate, to activate the pre-catalyst when the pre-catalyst is in contact with the catalyst support-activator agglomerate, said layered material having a cationic component and an anionic component, wherein said cationic component is present within the interspaces of the layered material, said layered material being intimately associated with said inorganic oxide component within the agglomerate in an amount sufficient to improve the activity of the coordinating catalyst system for polymerizing ethylene monomer, expressed as Kg of polyethylene per gram of catalyst system per hour, relative to the activity of a corresponding catalyst system employing the same pre-catalyst but in the absence of either Component A or B of the catalyst support-activator agglomerate; wherein the amounts of the pre-catalyst and catalyst support-activator agglomerate which are in intimate contact are sufficient to provide a ratio of micromoles of pre-catalyst to grams of catalyst support-activator agglomerate of from about 5:1 to about 500:1.

2. The catalyst system of claim 1 which additionally comprises as a third component, at least one organometallic compound represented by the formula:

$$M(R^{12})_s$$

wherein M represents at least one element of Group 1, 2, or 13 of the Periodic Table, tin or zinc, and each $R^{12}$ independently represents at least one of hydrogen, halogen, or hydrocarbon-based group, and "s" is a number corresponding to the oxidation number of M; said organometallic compound being in intimate contact with said pre-catalyst in an amount sufficient to provide a molar ratio of organometallic compound to pre-catalyst from about 0.001:1 to about 10,000:1.

3. The catalyst system of claim 1 wherein the pre-catalyst is a bidentate ligand containing transition metal compound

represented by the formula:
   wherein:
   (I) each A independently represents oxygen, sulfur, phosphorus or nitrogen;
   (II) Z represents a transition metal selected from at least one of the group of Fe, Co, Ni, Ru, Rh, Pd, Os, Ir and Pt in the +2 oxidation state, and Ti, V, Cr, Mn, Zr, and Hf in the +2, +3 or +4 oxidation state;
   (III) each L and L' independently represents a ligand group selected from at least one of hydrogen, halogen, hydrocarbon based radical, or two L groups, together represent a hydrocarbon based radical, which, together with Z, constitute a heterocyclic ring structure; and (IV) "a" is an integer of 0 or 1 and represents the number of L' groups bound to Z, the line joining A to the other A represents hydrocarbon based radicals joined to A by a double or single bond, and the lines joining each A to Z represent a covalent or dative bond.

4. The catalyst system of claim 1 wherein the transition metal compound is a tridentate ligand containing transition metal compound represented by the formula:

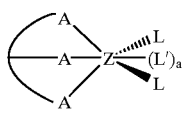

II wherein:
(V) each A independently represents oxygen, sulfur, phosphorous or nitrogen;
(VI) Z represents a transition metal selected from at least one of the group of Fe, Co, Ni, Ru, Rh, Pd, Os, Ir and Pt in the +2 oxidation state and Ti, V, Cr, Mn, Zr, and Hf in the +2, +3 or +4 oxidation state;
(VII) each L and L' independently represents a ligand group selected from at least one of hydrogen, halogen and hydrocarbon based radical, or two L groups together represent a hydrocarbon based radical, which together with Z, constitute a heterocyclic ring structure; and
(VIII) "a" is an integer of 0, 1, or 2 and represents the number of L' groups bound to Z, the lines joining each A to each other A represent hydrocarbon based radicals joined to A by a double or single bond, and the lines joining each A to Z represent a covalent or dative bond.

5. The catalyst system of any one of claims 3 and 4 wherein each A represents a nitrogen atom, each L and L' is independently selected from halogen, hydrocarbyl and mixtures thereof, or two L groups together represent hydrocarbylene which together with Z constitute a 3 to 7 membered heterocyclic ring structure.

6. The catalyst system of any one of claims 3 and 4 wherein at least one L of the pre-catalyst is hydrocarbyl.

7. The catalyst system of claim 6 wherein Z is at least one of Ni, Pd, Fe or Co.

8. The catalyst system of claim 3 wherein Z is at least one of Ni or Pd and each L is independently at least one of chlorine, bromine, iodine, or $C_1$–$C_8$ alkyl.

9. The catalyst system of claim 4 wherein Z is at least one of iron or cobalt and each L is independently at least one of chlorine, bromine, iodine, or $C_1$–$C_8$ alkyl.

10. The catalyst system of any one of claims 3 and 4 wherein L is at least one of halogen or hydrogen, and the catalyst system further comprises at least one organometallic compound represented by the formula:

M(R$^{12}$)$_s$ wherein M is aluminum, $R^{12}$ is a hydrocarbon based group, and "s" is 3, intimately associated with the pre-catalyst in an amount sufficient to provide a molar ratio of organometallic compound to transition metal in the pre-catalyst of from about 0.001:1 to about 250:1.

11. The catalyst system of claim 1 wherein the layered material of the catalyst support-activator agglomerate is at least one of clay or clay minerals having a negative charge of below 0.

12. The catalyst system of claim 11 wherein the layered material is a smectite clay, the weight ratio of inorganic oxide to clay in the catalyst support-activator agglomerate is from about 0.25:1 to about 99:1, and the ratio of micromoles of pre-catalyst to grams of catalyst support-activator agglomerate is from about 10:1 to about 250:1.

13. The catalyst system of claim 12 wherein the smectite clay is at least one of montmorillonite and hectorite, the weight ratio of inorganic oxide to clay in the catalyst support-activator agglomerate is from about 0.5:1 to about 20:1, and the ratio of micromoles of pre-catalyst to grams of catalyst support-activator agglomerate is from about 30:1 to about 100:1.

14. The catalyst system of claim 1 wherein the inorganic oxide component is $SiO_2$, the weight ratio of $SiO_2$ to layered material in the catalyst support-activator agglomerate is from about 1:1 to about 10:1, and the ratio of micromoles of pre-catalyst to grams of catalyst support-activator agglomerate is from about 80:1 to about 100:1.

15. The catalyst system of anyone of claims 1 and 2 wherein the catalyst support-activator agglomerate comprises spray dried agglomerate particles comprising constituent particles of at least one of said inorganic oxides and at least one of said layered materials wherein:
(I) at least 80% of the volume of the agglomerated particles smaller than $D_{90}$ of the entire agglomerate particle size distribution possesses a microspheroidal morphology;
(II) the catalyst support-activator agglomerate particles possess:
(A) an average particle size of from about 4 to about 250 microns, and
(B) a surface area of from 20 to about 800 m$^2$/gm; and
(III) the constituent inorganic oxide particles from which the agglomerate particles are derived have an average particle size, prior to spray drying, of from about 2 to about 10 microns, and the constituent layered material particles have an average particle size, prior to spray drying, of from about 0.01 to about 50 microns.

16. The catalyst system of claim 15 wherein the constituent inorganic oxide particles from which the agglomerate particles are derived, prior to spray drying, have:
(I) an average particle size of from about 4 to about 9 microns,
(II) a particle size Distribution Span of from about 0.5 to about 3.0 microns, and
(III) a colloidal particle size content of from about 2 to about 60 wt. %, based on the constituent inorganic oxide particle weight.

17. A coordinating catalyst system formed by the process comprising:
(I) agglomerating to form a catalyst support-activator agglomerate:
(A) at least one inorganic oxide component comprising $SiO_2$, $Al_2O_3$, MgO, $AlPO_4$, $TiO_2$, $ZrO_2$, or $Cr_2O_3$ with
(B) at least one ion containing layered material having interspaces between the layers and sufficient Lewis acidity, when present within the catalyst support-activator agglomerate, to activate the transition metal of the pre-catalyst of 11 when the pre-catalyst is in contact with the catalyst support-activator agglomerate, said layered material having a cationic component and an anionic component, wherein said cationic component is present within the interspaces of the layered material, said layered material being intimately associated with said inorganic oxide component within said catalyst support-activator agglomerate in an amount sufficient to improve the activity of the coordinating catalyst system for polymerizing ethylene monomer, expressed as Kg of polyethylene per gram of catalyst system per hour, relative to the activity of a corresponding catalyst system employing the same pre-catalyst but in the absence of either Component A or B of the catalyst support-activator agglomerate;

(II) providing as a pre-catalyst, at least one non-metallocene, non-constrained geometry, transition metal compound selected from bidentate ligand containing transition metal compound, and tridentate ligand containing transition metal compound capable of (A) being activated upon contact with the catalyst support-activator agglomerate of (I), or (B) being converted, upon contact with an organometallic compound, to an intermediate capable of being activated upon contact with the catalyst support-activator agglomerate of I, wherein the transition metal is at least one element selected from Groups 3 to 10 of the Periodic Table;

(III) contacting the catalyst support-activator agglomerate and pre-catalyst in the presence of at least one inert liquid hydrocarbon in a manner sufficient to provide a ratio of micromoles of pre-catalyst to grams of support-activator of from about 5:1 to about 500:1.

18. The catalyst system of claim 17 prepared by the additional step of including at least one organometallic compound in the liquid hydrocarbon of step III, said organometallic compound being represented by the formula:

$$M(R^{12})_s$$

wherein M represents at least one element of Groups 1, 2, or 13 of the Periodic Table, tin or zinc, and each $R^{12}$ independently represents at least one of hydrogen, halogen, or hydrocarbon-based group, and "s" is a number corresponding to the oxidation number of M, said organometallic compound being in intimate contact with said pre-catalyst, wherein the amount of organometallic compound present is sufficient to provide a molar ratio of organometallic compound to pre-catalyst of from about 0.001:1 to about 250:1.

19. The catalyst system of claim 17 wherein the transition metal compound is a bidentate ligand containing transition metal compound represented by the formula:

I wherein:
(I) each A independently represents oxygen, sulfur, phosphorus or nitrogen;
(II) Z represents a transition metal selected from at least one of the group of Fe, Co, Ni, Ru, Rh, Pd, Os, Ir and Pt in the +2 oxidation state, and Ti, V, Cr, Mn, Zr, and Hf in the +2, +3 or +4 oxidation state;
(III) each L and L' independently represents a ligand group selected from at least one of hydrogen, halogen, and hydrocarbon based radical, or two L groups together represent a hydrocarbon based radical which, together with Z, constitute a heterocyclic ring structure; and
(IV) "a" is an integer of 0 or 1 and represents the number of L' groups bound to Z, the line joining A to the other A represents hydrocarbon based radicals joined to A by a double or single bond, and the lines joining each A to Z represent a covalent or dative bond.

20. The catalyst system of claim 17 wherein the transition metal compound is a tridentate ligand containing transition metal compound represented by the formula:

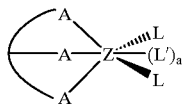

II wherein:
(I) each A independently represents oxygen, sulfur, phosphorous or nitrogen;
(II) Z represents a transition metal selected from at least one member of the group of Fe, Co, Ni, Ru, Rh, Pd, Os, Ir and Pt in the +2 oxidation state and Ti, V, Cr, Mn, Zr, and Hf in the +2, +3 or +4 oxidation state;
(III) each L and L' independently represents a ligand group selected from at least one of hydrogen, halogen, and hydrocarbon based radical, or two L groups together represent a hydrocarbon based radical which, together with Z, constitute a heterocyclic ring structure; and
(IV) "a" is an integer of 0, 1 or 2 and represents the number of L' groups bound to Z, the lines joining each A to each other A represent hydrocarbon based radicals joined to A by a double or single bond, and the lines joining each A to Z represent a covalent or dative bond.

21. The catalyst system of any one of claims 19 and 20 wherein each A represents nitrogen, each L and L' is independently halogen, hydrocarbyl, or mixtures thereof, or two of said L groups together represent a hydrocarbylene group which, together with Z, constitute a 3 to 7 membered heterocyclic ring structure.

22. The catalyst system of claim 21 wherein M is aluminum, "s" is 3, and $R^{12}$ is $C_1$ to $C_{24}$ alkyl, and each L of the pre-catalyst is halogen.

23. The catalyst composition of any one of claims 19 and 20 wherein at least one L of the pre-catalyst is hydrocarbyl.

24. The catalyst system of any one of claims 19 and 20 wherein Z is at least one of Ni, Pd, Fe, or Co.

25. The catalyst system of claim 19 wherein Z is at least one of Ni or Pd and each L is independently selected from chlorine, bromine, iodine, or $C_1$-$C_8$ alkyl.

26. The catalyst system of claim 20 wherein Z is at least one of iron or cobalt and each L is independently selected from chlorine, bromine, iodine, or $C_1$-$C_8$ alkyl.

27. The catalyst system of claim 19 prepared by the additional step of including in the inert hydrocarbon liquid of step III, at least one organometallic compound represented by the formula:

$$M(R^{12})_s$$

wherein M represents at least one element of Group 1, 2, or 13 of the Periodic Table, tin or zinc, and each $R^{12}$ independently represents at least one of hydrogen, halogen, or hydrocarbyl group, and "s" is the oxidation number of M; said organometallic compound being in intimate contact with said pre-catalyst in an amount sufficient to provide a molar ratio of organometallic compound to pre-catalyst of from about 0.01:1 to about 125:1.

28. The catalyst system of claim 20 prepared by the additional steps of including in the inert hydrocarbon liquid of step III, at least one organometallic compound represented by the formula:

M (R$^{12}$)$_s$ wherein M represents at least one element of Group 1, 2, or 13 of the Periodic Table, tin or zinc, and each R$^{12}$ independently represents at least one of hydrogen, halogen, or hydrocarbyl group, and "s" is the oxidation number of M; said organometallic compound being in intimate contact with said pre-catalyst in an amount sufficient to provide a molar ratio of organometallic compound to pre-catalyst of from about 0.1:1 to about 10:1.

29. The catalyst system of claim 27 wherein M is aluminum, R$^{12}$ is alkyl or alkoxy, "s" is 3, Z is at least one of Ni or Pd, and L is halogen.

30. The catalyst system of claim 28 wherein M is aluminum, R$^{12}$ is alkyl or alkoxy, "s" is 3, Z is selected from at least one of Fe or Co, and L is halogen.

31. The catalyst system of claim 17 wherein the ion containing layered material is at least one of clay or clay mineral having a negative charge below 0.

32. The catalyst system of claim 31 wherein the layered material is a smectite clay, the weight ratio of inorganic oxide to clay in the catalyst support-activator agglomerate is from about 0.25:1 to about 99:1, and the ratio of micromoles of pre-catalyst to grams of catalyst support-activator agglomerate is from about 10:1 to about 250:1.

33. The catalyst system of claim 32 wherein the smectite clay is at least one of montmorillonite or hectorite, the weight ratio of inorganic oxide to clay in the catalyst support-activator agglomerate is from about 0.5:1 to about 20:1, and the ratio of micromoles of pre-catalyst to grams of catalyst support-activator agglomerate is from about 30:1 to about 100:1.

34. The catalyst system of claim 17 wherein the inorganic oxide component is SiO$_2$, the weight ratio of SiO$_2$ to layered material in the catalyst support-activator agglomerate is from about 1:1 to about 10:1, and the ratio of micromoles of pre-catalyst to grams of catalyst support-activator agglomerate is from about 80:1 to about 100:1.

35. The catalyst system of any one of claims 17 and 18 wherein the catalyst support-activator agglomerate comprises spray dried agglomerate particles comprising constituent particles of at least one of said inorganic oxides and at least one of said layered materials wherein:
 (I) at least 80% of the volume of the agglomerated particles smaller than D$_{90}$ of the entire agglomerate particle size distribution possesses a microspheroidal morphology;
 (II) the catalyst support-activator agglomerate particles possess:
  (A) an average particle size of from about 4 to about 250 microns, and
  (B) a surface area of from 20 to about 800 m$^2$/gm;
 (III) the constituent inorganic oxide particles from which the agglomerate particles are derived have an average particle size, prior to spray drying, of from about 2 to about 10 microns, and the constituent layered material particles have an average particle size, prior to spray drying, of from about 0.01 to about 50 microns.

36. The catalyst system of claim 35 wherein the constituent inorganic oxide particles from which the agglomerate particles are derived, prior to spray drying, have:
 (I) an average particle size of from about 4 to about 9 microns,
 (II) a particle size Distribution Span of from about 0.5 to about 3.0 microns, and
 (III) and a colloidal particle size content of from about 2 to about 60 wt. %, based on the constituent inorganic oxide particle weight.

37. A process for preparing a catalyst system for polymerizing olefins, said process comprising:
 (I) agglomerating to form a catalyst support-activator agglomerate:
  (A) at least one inorganic oxide component comprising SiO$_2$, Al$_2$O$_3$, MgO, AlPO$_4$, TiO$_2$, ZrO$_2$, or Cr$_2$O$_3$ with
  (B) at least one ion containing layered material having interspaces between the layers and sufficient Lewis acidity, when present within the catalyst support-activator agglomerate, to activate the pre-catalyst compound of (II) when the pre-catalyst is in contact with the catalyst support-activator agglomerate, said layered material having a cationic component and an anionic component, wherein said cationic component is present within the interspaces of the layered material, said layered material being intimately associated with said inorganic oxide component within the agglomerate in amounts sufficient to improve the activity of the coordinating catalyst system for polymerizing ethylene monomer, expressed as Kg of polyethylene per gram of catalyst system per hour, relative to the activity of a corresponding catalyst system employing the same pre-catalyst but in the absence of either Component A or B of the catalyst support-activator agglomerate;
 (II) providing as a pre-catalyst, at least one non-metallocene, non-constrained geometry transition metal compound selected from bidentate ligand containing transition metal compound and tridentate ligand containing transition metal compound capable of (A) being activated upon contact with the catalyst support-activator agglomerate, or (B) being converted, upon contact with an organometallic compound, to an intermediate capable of being activated upon contact with the catalyst support-activator agglomerate, wherein the transition metal is at least one member selected from Groups 3 to 10 of the Periodic Table;
 (III) contacting the catalyst support-activator agglomerate and pre-catalyst in the presence of at least one inert liquid hydrocarbon in a manner sufficient to provide in the liquid hydrocarbon, a ratio of micromoles of pre-catalyst to grams of catalyst support-activator agglomerate of from about 5:1 or to about 500:1, and to cause at least one of absorption and adsorption of the pre-catalyst by the catalyst support-activator agglomerate.

38. The process of claim 37 further comprising including at least one organometallic compound in the inert liquid hydrocarbon of step III represented by the formula:

M (R$^{12}$)$_s$ wherein M represents at least one element of Groups 1, 2, or 13 of the Periodic Table, tin or zinc, and each R$^{12}$ independently represents at least one of hydrogen, halogen, or hydrocarbon-based group, and "s" is the oxidation number of M, said organometallic compound being in intimate contact with said pre-catalyst, wherein the amount of organometallic compound present in the liquid hydrocarbon is sufficient to provide a molar ratio of organometallic compound to pre-catalyst of from about 0.001:1 to about 250:1.

39. The process of claim 37 wherein the transition metal compound is a bidentate ligand containing transition metal

compound represented by the formula:

wherein:
(I) each A independently represents oxygen, sulfur, phosphorus, or nitrogen;
(II) Z represents a transition metal selected from at least one of the group of Fe, Co, Ni, Ru, Rh, Pd, Os, Ir and Pt in the +2 oxidation state, and Ti, V, Cr, Mn, Zr, and Hf in the +2, +3 or +4 oxidation state;
(III) each L and L' independently represents a ligand group selected from at least one of hydrogen, halogen, and hydrocarbon based radical, or two L groups together represent a hydrocarbon based radical, which together with Z, constitute a heterocyclic ring structure; and
(IV) "a" is an integer of 0 or 1 and represents the number of L' groups bound to Z, the line joining A to the other A represents hydrocarbon based radicals joined to A by a double or single bond, and the lines joining each A to Z represent a covalent or dative bond.

40. The process of claim 37 wherein the transition metal compound is a tridentate ligand containing transition metal compound represented by the formula:

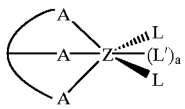

wherein:
(I) each A independently represents oxygen, sulfur, phosphorous or nitrogen;
(II) Z represents a transition metal selected from at least one of the group of Fe, Co, Ni, Ru, Rh, Pd, Os, Ir and Pt in the +2 oxidation state and Ti, V, Cr, Mn, Zr, and Hf in the +2, +3 or +4 oxidation state;
(III) each L and L' independently represents a ligand group selected from at least one of hydrogen, halogen, and hydrocarbon based radical, or two L groups together represent a hydrocarbon based radical which, together with Z, constitute a heterocyclic ring structure; and
(IV) "a" is an integer of 0, 1 or 2 and represents the number of L' groups bound to Z, the lines joining each A to each other A represent hydrocarbon based radicals joined to A by a double or single bond, and the lines joining each A to Z represent a covalent or dative bond.

41. The process of any one of claims 39 and 40 wherein each A represents nitrogen, each L and L' is independently selected from halogen, hydrocarbyl and mixtures thereof, or two of said L groups together represent a hydrocarbylene group which, together with Z, constitute a 3 to 7 membered heterocyclic ring structure.

42. The process of claim 38 wherein M is aluminum, "s" is 3, and $R^{12}$ is $C_1$ to $C_{24}$ alkyl, and each L of the pre-catalyst is halogen.

43. The process of claims 39 and 40 wherein at least one L of the pre-catalyst is hydrocarbyl.

44. The process of any one of claims 39 and 40 wherein Z is at least one of Ni, Pd, Fe, or Co.

45. The process of claim 39 wherein Z is selected from at least one of Ni or Pd and each L is independently selected from chlorine, bromine, iodine, and $C_1$–$C_8$ alkyl.

46. The process of claim 40 wherein Z is at least one of iron or cobalt and each L is independently selected from chlorine, bromine, iodine, or $C_1$–$C_8$ alkyl.

47. The process of claim 39 comprising the additional step of including in the inert liquid hydrocarbon of step III, at least one organometallic compound represented by the formula:

$$M\ (R^{12})_s$$

wherein M represents at least one element of Group 1, 2, or 13 of the Periodic Table, tin or zinc, and each $R^{12}$ independently represents at least one of hydrogen, halogen, and hydrocarbon based group, and "s" is the oxidation number of M; said organometallic compound being in intimate contact with said pre-catalyst in an amount sufficient to provide a molar ratio of pre-catalyst to organometallic compound from about 0.01:1 to about 125:1.

48. The process of claim 40 comprising the additional step of including at least one organometallic compound in the inert liquid hydrocarbon of step III represented by the formula:

$$M\ (R^{12})_s$$

wherein M represents at least one element of Group 1, 2, or 13 of the Periodic Table, tin or zinc, and each $R^{12}$ independently represents at least one of hydrogen, halogen and hydrocarbon based group, and "s" is the oxidation number of M; said organometallic compound being in intimate contact with said pre-catalyst in an amount sufficient to provide a molar ratio of pre-catalyst to organometallic compound in the hydrocarbon liquid from about 0.1:1 to about 10:1.

49. The process of claim 47 wherein M is aluminum, $R^{12}$ is alkyl or alkoxy, "s" is 3, Z is selected from at least one of Ni or Pd, and L is halogen.

50. The process of claim 48 wherein M is aluminum, $R^{12}$ is alkyl or alkoxy, "s" is 3, Z is selected from at least one of Fe or Co, and L is halogen.

51. The process of claim 37 wherein the ion containing layered material is at least one of clay or clay mineral having a negative charge below 0.

52. The process of claim 51 wherein the layered material is a smectite clay, the weight ratio of inorganic oxide to clay in the catalyst support activator agglomerate is from about 0.25:1 to about 99:1, and the ratio of micromoles of pre-catalyst to grams of catalyst support-activator agglomerate is from about 10:1 to about 250:1.

53. The process of claim 52 wherein the smectite clay is at least one of montmorillonite and hectorite, the weight ratio of inorganic oxide to clay in the catalyst support-activator agglomerate is from about 0.5:1 to about 20:1, and the ratio of micromoles of transition metal in the pre-catalyst to grams of catalyst support-activator agglomerate is from about 30:1 to about 100:1.

54. The process of claim 37 wherein the inorganic oxide is $SiO_2$, the weight ratio of $SiO_2$ to layered material in the catalyst support-activator agglomerate is from about 1:1 to about 10:1, and the ratio of micromoles of pre-catalyst to grams of catalyst support-activator agglomerate is from about 30:1 to about 100:1.

55. The process of any one of claims 37 and 38 wherein the catalyst support-activator agglomerate comprises spray dried agglomerate particles comprising constituent particles of at least one of said inorganic oxides and at least one of said layered materials wherein:
(I) at least 80% of the volume of the agglomerated particles smaller than $D_{90}$ of the entire agglomerate particle size distribution possesses a microspheroidal morphology;

(II) the catalyst support-activator agglomerate particles possess
  (A) an average particle size of from about 5 to about 250 microns, and
  (B) a surface area of from 20 to about 800 m²/gm;
(III) the constituent inorganic oxide particles from which the agglomerate particles are derived have an average particle size, prior to spray drying, of from about 2 to about 10 microns and the constituent layered material particles have an average particle size, prior to spray drying, of from about 0.01 to about 50 microns.

56. The process of claim 55 wherein the constituent inorganic oxide particles from which the catalyst support-activator agglomerate particles are derived, prior to spray drying, have:
(I) an average particle size of from about 4 to about 9 microns;
(II) a particle size Distribution Span of from about 0.5 to about 3.0 microns; and
(III) a colloidal particle size content of from about 2 to about 60 wt. %, based on the constituent inorganic oxide weight.

57. The process of claim 37 wherein the catalyst support-activator agglomerate and pre-catalyst are agitated in the liquid hydrocarbon at a temperature of from about 0 to about 80° C. for a period of from about 0.5 to about 1440 minutes.

58. The process of claim 37 wherein the liquid hydrocarbon of step III is separated from the mixture of catalyst support-activator agglomerate and pre-catalyst.

59. The process of claim 38 wherein the liquid hydrocarbon of step III is separated from the mixture of catalyst support-activator agglomerate, pre-catalyst and organometallic compound.

60. The process of claim 38 wherein the organometallic compound is contacted with pre-catalyst prior to contract with the catalyst support-activator agglomerate.

61. The process of claim 37 further comprising including in the inert liquid hydrocarbon of step III, at least one organometallic compound represented by the formula:

$$M (R^{12})_s$$

wherein M represents at least one element of Groups 1, 2, or 13 of the Periodic Table, tin or zinc, and each $R^{12}$ independently represents at least one of hydrogen, halogen, and hydrocarbyl group, and "s" is the oxidation number of M, said organometallic compound being in intimate contact with said pre-catalyst, wherein the amount of organometallic compound present is sufficient to provide a ratio of millimoles of organometallic compound to grams of catalyst support-activator agglomerate of from about 0.001:1 to about 2:1.

62. The process of claim 61 wherein said ratio of organometallic compound to support activator is from about 0.1:1 to about 0.8:1.

63. The process of claim 37 further comprising calcining the catalyst support-activator agglomerate formed in step I at a temperature of from about 100 to about 800° C. for a period of from about 1 to about 600 minutes prior to step III.

64. The process of claim 37 further comprising recovering the support-activator having the pre-catalyst impregnated therein from the liquid hydrocarbon.

* * * * *

UNITED STATES PATENT AND TRADEMARK OFFICE
CERTIFICATE OF CORRECTION

PATENT NO. : 6,399,535 B1
DATED : June 4, 2002
INVENTOR(S) : Shih et al.

It is certified that error appears in the above-identified patent and that said Letters Patent is hereby corrected as shown below:

Column 61,
Line 22, "(V)" should be -- (I) --
Line 24, "(VI)" should be -- (II) --
Line 28, "(VII)" should be -- (III) --
Line 34, "(VIII)" should be -- (IV) --

Column 62,
Line 60, "11" should be -- II --

Column 67,
Line 64, "The process of claims" should be -- The process of any one of claims --

Signed and Sealed this

Twenty-fourth Day of December, 2002

JAMES E. ROGAN
*Director of the United States Patent and Trademark Office*